(12) United States Patent
Shinmura et al.

(10) Patent No.: US 6,694,824 B2
(45) Date of Patent: Feb. 24, 2004

(54) FLOW MEASURING DEVICE

(75) Inventors: Norio Shinmura, Shiki-gun (JP);
Shigeru Iwanaga, Nara (JP); Yukio Nagaoka, Soraku-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 104 days.

(21) Appl. No.: 10/149,100

(22) PCT Filed: Oct. 9, 2001

(86) PCT No.: PCT/JP01/08870
§ 371 (c)(1),
(2), (4) Date: Jun. 5, 2002

(87) PCT Pub. No.: WO02/31446
PCT Pub. Date: Apr. 18, 2002

(65) Prior Publication Data
US 2002/0178836 A1 Dec. 5, 2002

(30) Foreign Application Priority Data

Oct. 10, 2000 (JP) ........................................ 2000-308747
Oct. 13, 2000 (JP) ........................................ 2000-313149
Nov. 15, 2000 (JP) ........................................ 2000-347791

(51) Int. Cl.[7] ................................................. G01F 1/66
(52) U.S. Cl. .................................................. 73/861.29
(58) Field of Search ........................ 73/861.29, 861.28, 73/861.27, 861.31; 702/48, 54

(56) References Cited

U.S. PATENT DOCUMENTS 2,912,856 A * 11/1959 Kritz ........................ 73/861.29
4,475,406 A * 10/1984 Ansaldi et al. .......... 73/861.29
4,545,259 A    10/1985 Jensen et al.
5,115,670 A *  5/1992 Shen ......................... 73/61.41
6,634,239 B2 * 10/2003 Gomm et al. ............ 73/861.27

FOREIGN PATENT DOCUMENTS

EP     0 913 670 A1    5/1999
JP      3-259718       11/1991
JP       10-9913        1/1998

* cited by examiner

Primary Examiner—Edward Lefkowitz
Assistant Examiner—Jewel V. Thompson
(74) Attorney, Agent, or Firm—Snell & Wilmer, LLP

(57) ABSTRACT

A flow meter includes a flow path through which a fluid flows; a pair of transceivers for sending and receiving an ultrasonic wave propagating across the flow path; and a flow calculation section for calculating a flow rate of the fluid flowing through the flow path based on a result of the ultrasonic wave being sent and received by the pair of transceivers. The flow path has an equal flow speed area in which the fluid flows at a substantially equal flow speed over an entire flow rate area ranging from a high flow rate area to a low flow rate area. The pair of transceivers send and receive the ultrasonic wave so that the ultrasonic wave propagates in the equal flow speed area.

29 Claims, 28 Drawing Sheets

FIG. 6
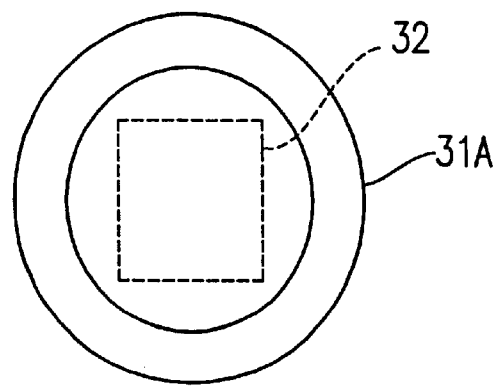
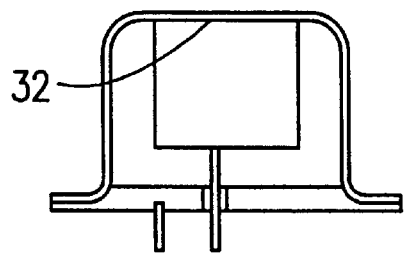
FIG. 7
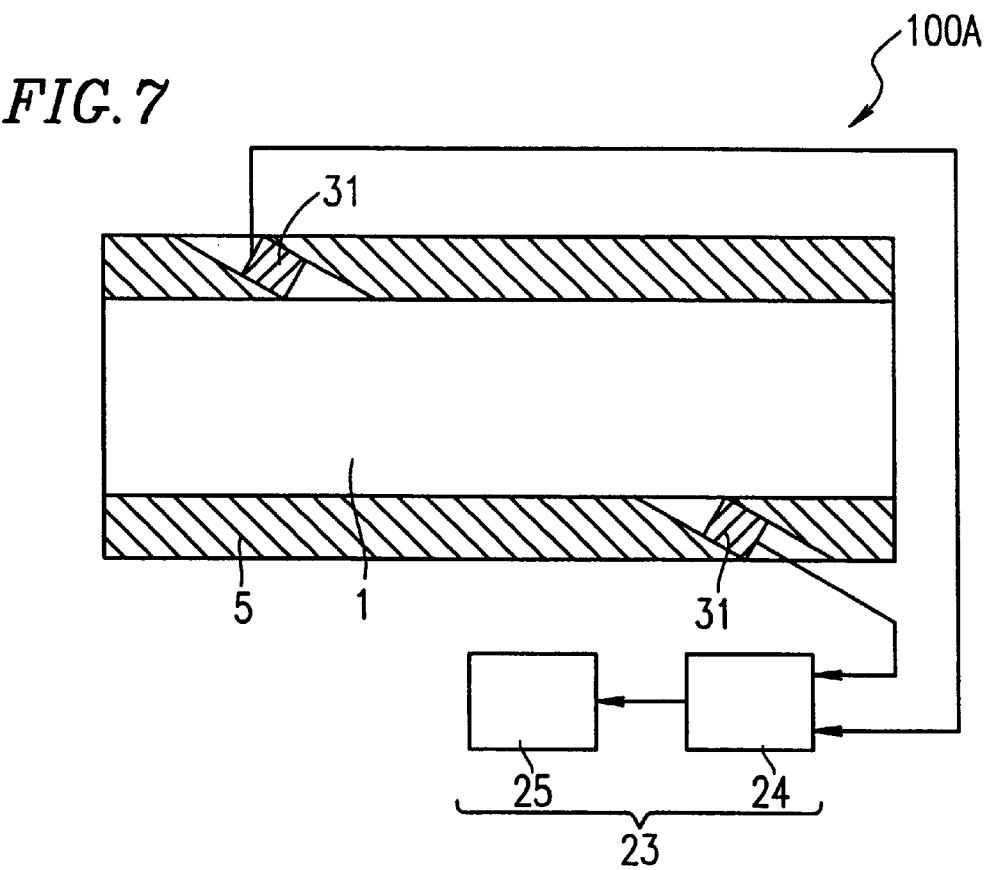

FLOW MEASURING DEVICE

The present invention relates to a flow meter, and specifically to a flow meter for measuring a flow rate of a fluid utilizing ultrasonic waves.

BACKGROUND ART

Flow meters utilizing ultrasonic waves are in wide use in order to measure flow rates of town gas and LPG (liquefied petroleum gas). Japanese Laid-Open Publication No. 9-189589 discloses a conventional flow meter for measuring a flow rate utilizing ultrasonic waves. FIG. 40 is a longitudinal and vertical cross-sectional view of a conventional flow meter 900, and FIG. 41 is a height direction cross-sectional view of the conventional flow meter 900. FIG. 41 shows a flow path structure of the flow meter 900. FIG. 42 is a cross-sectional view of the flow meter 900 seen in the direction of arrow A shown in FIG. 40. FIG. 42 shows a flow path structure of the flow meter 900 when the flow rate is high. The flow meter 900 includes a flow path wall 105 defining a flow path 101, through which a fluid as a measuring target flows. As shown in FIG. 41, the flow path wall 105 defines a quadrangular flow path cross-section 108 having a pair of longer sides 108A and a pair of shorter sides 108B. A pair of generally quadrangular parallelepiped transceivers 131 for sending and receiving ultrasonic waves propagating across the flow path 101 are provided in the flow path wall 105. One of the transceivers 131 is provided in an upstream part of the flow path wall 105, and the other of the transceivers 131 is provided in a downstream part of the flow path wall 105. Each transceiver 131 has a quadrangular transceiving surface 132 for sending and receiving ultrasonic waves propagating across the flow path 101. The length of the transceiving surface 132 along the shorter sides 108B of the flow path wall 105 is substantially the same as the length of the shorter side 108B of the flow path wall 105. Each transceiver 131 is provided so as to be aligned with the shorter sides 108B.

The flow meter 900 includes a flow rate calculation section 123 for calculating a flow rate of a fluid flowing through the flow path 101 based on a result of the sent and received ultrasonic waves obtained by the pair of transceivers 131. The flow rate calculation section 123 includes a measurement control section 124 connected to each of the pair of transceivers 131, and a calculation section 125 connected to the measurement control section 124.

The flow meter 900 having the above-described structure operates as follows. When a fluid as a measuring target flows through the flow path 101, an ultrasonic wave sent from the upstream transceiver 131 propagates so as to cross the flow path 101 obliquely with respect to a fluid flow direction, and reaches the downstream transceiver 131. An ultrasonic wave sent from the downstream transceiver 131 oppositely propagates so as to cross the flow path 101 obliquely with respect to the fluid flow direction, and reaches the upstream transceiver 131. The measuring control section 124 measures a first propagation time period required for the ultrasonic wave sent from the upstream transceiver 131 to reach the downstream transceiver 131 and a second propagation time period required for the ultrasonic wave sent from the downstream transceiver 131 to reach the upstream transceiver 131. When the fluid flows through the flow path 101, the first propagation time period and the second propagation time period are different from each other. The calculation section 125 calculates the flow rate of the fluid flowing through the flow path 101 based on the first propagation time period and the second propagation time period measured by the measuring control section 124.

When a fluid flows through the flow path 101 at a high flow rate, a high flow rate flow speed distribution R along the flow path cross-section 108 shown in FIG. 42 is obtained. As shown in FIG. 42, the flow rate is substantially uniform along the flow path cross-section 108. When a fluid flows through the flow path 101 at a low flow rate, a low flow rate flow speed distribution S along the flow path cross-section 108 shown in FIG. 40 is obtained. As shown in FIG. 40, the flow rate is lower as it is closer to the flow path wall 105, and the flow rate is maximum at the center. Thus, the flow rate exhibits a parabolic curve distribution. The length of the transceiving surface 132 of each transceiver 131 along the shorter sides 108B of the flow path wall 105 is substantially the same as the length of the shorter side 108B of the flow path wall 105. Each transceiver 131 is provided so as to be aligned with the shorter sides 108B. Therefore, two sides of the surface of each transceiver 131 which receives the ultrasonic wave corresponds to the shorter sides 108B of the flow path 1, and each transceiver 131 receives the ultrasonic wave on the entirety of this surface. As a result, the high flow rate flow speed distribution R and the low flow rate flow speed distribution S can entirely be measured.

However, when the fluid flows through the flow path 101 at a higher flow rate as a result of the measurable flow rate range is enlarged, the flow path cross-section 108 needs to be enlarged. The transceiving surface 132 of each transceiver 131 also needs to be enlarged. This requires production of transceivers 131 having a larger transceiving surface 132, which raises the cost.

When the length of the transceiving surface 132 along the shorter sides 108B of the flow path cross-section 108 is smaller the length of the shorter sides 108B, the flow speed of the entirety of the low flow rate flow speed distribution S cannot be measured. In order to obtain a true flow rate measurement (average flow rate) based on the low flow rate flow speed distribution S, the flow rate of the fluid calculated based on the first propagation time period and the second propagation time period needs to be corrected based on a correction coefficient in accordance with the flow rate. Nor can the high flow rate flow speed distribution R entirely be measured. In order to obtain an average flow rate, the calculated flow rate needs to be corrected based on a correction coefficient in accordance with the flow rate. The correction coefficients are significantly different for a high flow rate area and a low flow rate area. The correction coefficient significantly changes in a transition area between the high flow rate area and the low flow rate area. Therefore, in the case where there is even a slight error in the measured value of the flow rate in the transition area, the slight error is magnified by the correction coefficient which significantly changes in the transition area. As a result, the measurement precision of the flow rate in the transition area is deteriorated.

The present invention, for solving this problem, has an objective of providing a flow meter for measuring a wide flow rate range with high precision.

Another objective of the present invention is to provide a flow meter for reducing a change in the correction coefficient in a transition area between a high flow rate area and a low flow rate area.

DISCLOSURE OF THE INVENTION

A flow meter according to the present invention includes a flow path through which a fluid flows; a pair of transceivers for sending and receiving an ultrasonic wave propagating across the flow path; and a flow calculation section for calculating a flow rate of the fluid flowing through the flow path based on a result of the ultrasonic wave being sent and received by the pair of transceivers. The flow path has an equal flow speed area in which the fluid flows at a substantially equal flow speed over an entire flow rate area ranging from a high flow rate area to a low flow rate area. The pair of transceivers send and receive the ultrasonic wave so that the ultrasonic wave propagates in the equal flow speed area. Thus, the above-described objectives are achieved.

The equal flow speed area may be provided at a position deviated from a center of the flow path in a height direction. The pair of transceivers may be each provided at a position deviated from the center of the flow path in the height direction so that the position of each of the pair of transceivers in the height direction substantially matches the position of the equal flow speed area in the height direction.

The flow path may have a cross-section which has a quadrangular shape defined by two shorter sides extending in the height direction and two longer sides extending in a width direction. The pair of transceivers may be respectively provided on the two shorter sides.

The pair of transceivers may send and receive the ultrasonic wave propagating across the flow path in a direction of the two longer sides.

The flow path may have a cross-section which has a quadrangular shape defined by two shorter sides extending in the height direction and two longer sides extending in a width direction. The pair of transceivers may each have a rectangular transceiving surface for sending and receiving the ultrasonic wave. A deviation amount L1 of each of the transceivers from the center of the flow path in the height direction may fulfill the relationship of $(H-W) \times 0.3 \leq L1 \leq (H-W) \times 0.7$, and may preferably fulfill the relationship of $(H-W) \times 0.4 \leq L1 \leq (H-W) \times 0.6$, where H is a length of each of the two shorter sides of the cross-section extending in the height direction, and W is a length of the rectangular transceiving surface of each of the transceivers in the height direction.

The flow path may have a cross-section which has a quadrangular shape defined by two shorter sides extending in the height direction and two longer sides extending in a width direction. The ratio of a length of each of the two longer sides may be 1.1 or more and 5 or less with respect to the length of each of the two shorter sides.

The flow path may have a cross-section which has a quadrangular shape defined by two shorter sides extending in the height direction and two longer sides extending in a width direction. The pair of transceivers may each have a rectangular transceiving surface for sending and receiving the ultrasonic wave. A length W of the transceiving surface of each of the transceivers and a length H of each of the two shorter sides of the flow path extending in the height direction may fulfill the relationship of $0.3 \times H \leq W \leq 0.7 \times H$.

The height direction of the flow path may be a direction in which gravity acts. The pair of transceivers may be deviated in a direction opposite to the direction in which the gravity acts.

The flow meter may further include an asymmetric flow promotion section for deviating the equal slow speed area in the height direction of the flow path, so that the position of each of the transceivers in the height direction of the flow path substantially matches the position of the equal flow speed area in the height direction.

The flow path may include an inlet section upstream with respect to the pair of transceivers, and the asymmetric flow promotion section deviates a measuring flow path with respect to the inlet section.

The asymmetric flow promotion section maybe provided upstream with respect to the pair of transceivers.

The flow path may include an inlet section provided upstream with respect to the pair of transceivers and an outlet section provided downstream with respect to the pair of transceivers. The inlet section and the outlet section may be provided coaxially with or parallel to each other.

The asymmetric flow promotion section may include a curved section provided upstream with respect to the pair of transceivers for curving the flow path so that the flow path rises in the height direction.

The asymmetric flow promotion section may include a step provided on a wall portion of the flow path upstream with respect to the pair of transceivers.

The asymmetric flow promotion section may include a different-shape section provided upstream with respect to the pair of transceivers, the different-shape section including an end provided on a wall portion of the flow path and another end provided on another wall portion of the flow path, the ends having different shapes from each other, and the wall portions facing each other across the height direction.

One of the ends of the different-shape section may be stepped, and the other end may be smoothly curved.

The ends may be deviated from each other in a direction in which the fluid flows.

The asymmetric flow promotion section may include a step provided on a wall portion of the flow path upstream with respect to the pair of transceivers, and a different-shape section provided upstream with respect to the pair of transceivers, the different-shape section including an end provided on a wall portion of the flow path and another end provided on another wall portion of the flow path, the ends having different shapes from each other, and the wall portions facing each other across the height direction.

The asymmetric flow promotion section may include a curved section provided upstream with respect to the pair of transceivers for curving the flow path so that the flow path rises in the height direction, and a step provided on a wall portion of the flow path upstream with respect to the pair of transceivers.

The asymmetric flow promotion section may include a curved section provided upstream with respect to the pair of transceivers for curving the flow path so that the flow path rises in the height direction, a step provided on a wall portion of the flow path upstream with respect to the pair of transceivers, and a different-shape section including an end provided on a wall portion of the flow path and another end provided on another wall portion of the flow path, the ends having different shapes from each other, and the wall portions facing each other across the height direction.

The asymmetric flow promotion section may include a rectifier provided upstream with respect to the pair of transceivers for providing a resistance against a flow, the resistance varying in the height direction of the flow path.

The pair of transceivers may be each provided at a position deviated from the center of the flow path in the height direction.

The pair of transceivers may be each provided at a position deviated from the center of the flow path in the height direction, so that the position of the equal flow speed area deviated in the height direction of the flow path by the asymmetric flow promotion section substantially matches the position of each of the transceivers in the height direction.

The asymmetric flow promotion section may include a curved section provided upstream with respect to the pair of transceivers for curving the flow path so that the flow path rises in the height direction. The pair of transceivers may be each provided at a position deviated toward an outer circumferential surface of the curved section.

The pair of transceivers may each have a rectangular transceiving surface for sending and receiving the ultrasonic wave. The transceiving surface may be smaller than a size of the flow path in the height direction.

The fluid may flow through the flow path both in a forward direction from an upstream position to a downstream position and a rearward direction from a downstream position to an upstream position. The asymmetric flow promotion section may include a forward asymmetric flow promotion section for deviating, in the height direction, the equal flow speed area of the fluid flowing in the forward direction, and a rearward asymmetric flow promotion section for deviating, in the height direction, the equal flow speed area of the fluid flowing in the rearward direction.

The forward asymmetric flow promotion section and the rearward asymmetric flow promotion section may deviate the equal flow speed area in an identical direction.

The asymmetric flow promotion section may include an upstream curved section provided upstream with respect to the pair of transceivers for curving the flow path so that the flow path rises in the height direction, and a downstream curved section provided downstream with respect to the pair of transceivers for curving the flow path so that the flow path rises in the height direction. The upstream curved section and the downstream curved section are curved in an identical direction.

The asymmetric flow promotion section may include a step provided on a wall portion of the flow path upstream with respect to the pair of transceivers and a step provided on a wall portion of the flow path downstream with respect to the pair of transceivers, and a different-shape section provided upstream with respect to the pair of transceivers and a different-shape section provided downstream with respect to the pair of transceivers, each of the different-shape sections including one end provided on one wall portion of the flow path and another end provided on another wall portion of the flow path, the ends having different shapes from each other, and the wall portions facing each other across the height direction. The wall portions having the steps upstream and downstream with respect to the pair of transceivers may be on the same side as each other. The wall portions having the one ends of the different-shape sections upstream and downstream with respect to the pair of transceivers may be on the same side as each other, and the wall portions having the another ends of the different-shape sections upstream and downstream with respect to the pair of transceivers are on the same side as each other.

The flow path may be defined by a wall having a pair of openings respectively for exposing the pair of transceivers to the flow path. The flow path further may include a pair of open-hole rectifiers respectively provided between the pair of openings and the flow path for reducing an amount of the fluid flowing into the pair of openings and for alleviating a disturbance of the flow of the fluid through the flow path.

A flow deviation restriction section including fine passage openings may be provided upstream with respect to the pair of transceivers.

A flow deviation restriction section including fine passage openings may be provided downstream with respect to the pair of transceivers.

The pair of open-hole rectifiers may each have fine ultrasonic openings. The fine ultrasonic openings in the open-hole rectifier provided upstream with respect to the pair of transceivers and the fine ultrasonic openings in the open-hole rectifier provided downstream with respect to the pair of transceivers may have different opening sizes or shapes from each other.

The fine ultrasonic openings in the open-hole rectifier provided upstream with respect to the pair of transceivers may have a larger size than a size of the fine ultrasonic openings in the open-hole rectifier provided downstream with respect to the pair of transceivers.

BRIEF DESCRIPTION OF THE DRAWINGS

FIG. 6 shows a structure of a transceiver usable in the flow meter according to the first example.

FIG. 7 shows a structure of another flow meter according to the first example.

BEST MODE FOR CARRYING OUT THE INVENTION

Figure 1:
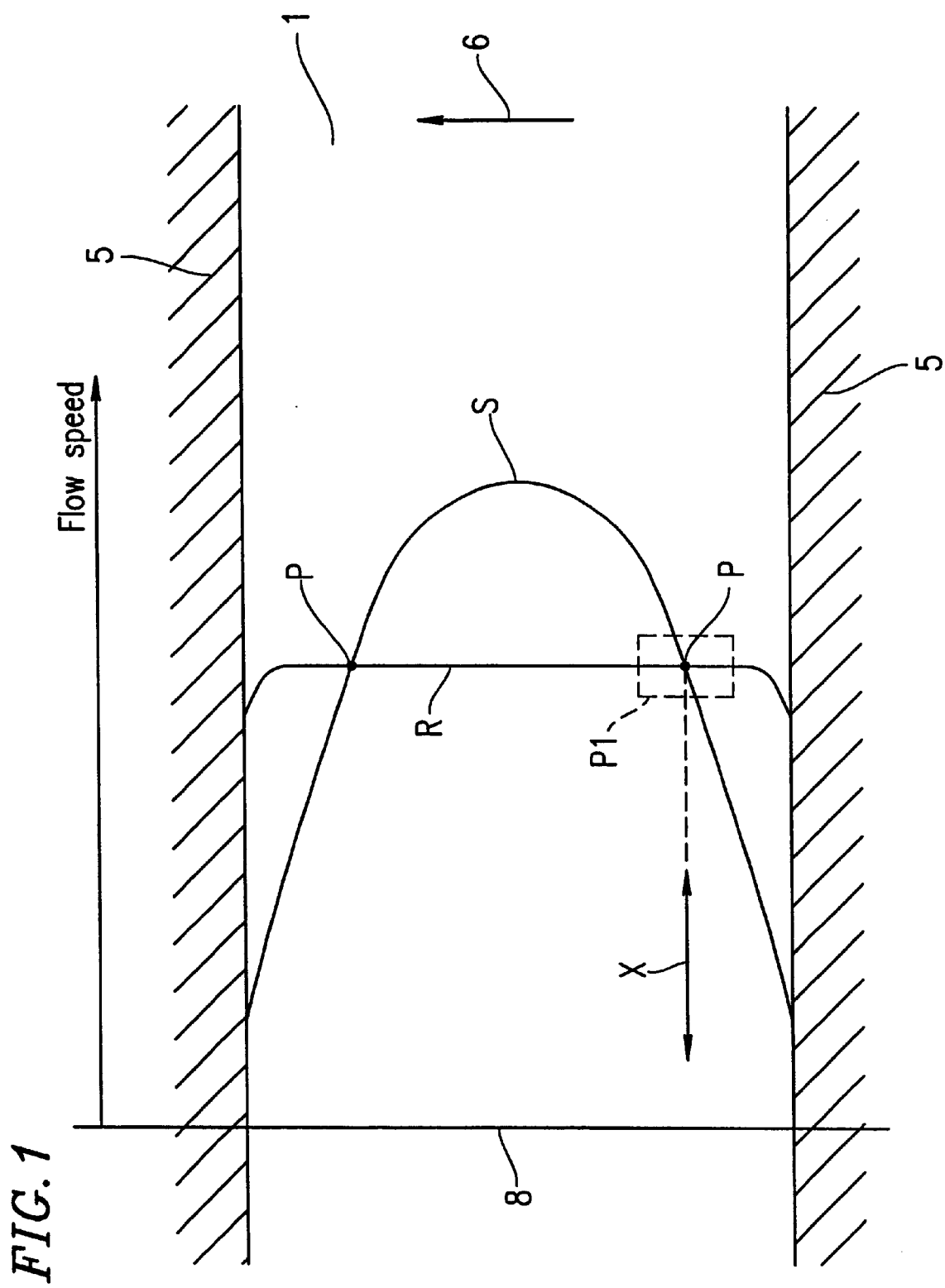
FIG. 1 illustrates a basic principle of the present invention.

First, the basic principle of the present invention will be described. A flow meter according to the present invention measures a fluid, such as, for example, town gas, LPG, air or water, utilizing ultra sonic waves. FIG. 1 shows a basic principle of the present invention. A fluid as a measuring target flows through a flow path 1 defined by a flow path wall 5. When the fluid flows at a low flow rate, the fluid exhibits a low flow rate flow speed distribution S along the flow path cross-section 8. As shown in FIG. 1, in the low flow rate flow speed distribution S, the flow rate reduces as it approaches the flow path wall 5 and the flow rate is maximum at the center. Thus, the low flow rate flow speed distribution S exhibits a parabolic curve. By contrast, when the fluid flows through the flow path 1 at a high flow rate, the fluid exhibits a high flow rate flow speed distribution R along the flow path cross-section 8. As shown in FIG. 1, in the high flow rate flow speed distribution R, the flow rate is substantially uniform.

Accordingly, at intersections P of the low flow rate flow speed distribution S and the high flow rate flow speed distribution R, the flow rate in a low flow rate area, in which the fluid flow through the flow path 1 is at a low rate, is equal to the flow rate in a high flow rate area, in which the fluid flow through the flow path 1 is at a high rate. At the intersections P, the flow rate in the transition area is substantially equal to the flow rate in the low flow rate area and the high flow rate area. Therefore, in equal flow speed areas P1 around points P, the fluid flows at a substantially equal flow rate in the high flow rate flow speed distribution R and in the low flow rate flow speed distribution S.

In a flow meter according to the present invention, ultrasonic waves X sent and received by a pair of transceivers (described below) cross the equal flow speed area P1. Therefore, the change in the correction coefficient in the transition area between the low flow rate area and the high flow rate area can be reduced. In order to allow ultrasonic waves X sent and received by a pair of transceivers to cross the equal flow speed area P1, the present invention provides two means. The first means is to deviate the positions of the pair of transceivers so as to substantially match the positions of the equal flow speed areas P1. The second means is to deviate the positions of the equal flow speed areas P1 so as to match the positions of the pair of transceivers. The first means of deviating the positions of the pair of transceivers will be described in Example 1 in detail, and the second means of deviating the positions of the equal flow speed areas P1 will be described in Examples 2 through 4 in detail.

EXAMPLE 1

Figure 2A:
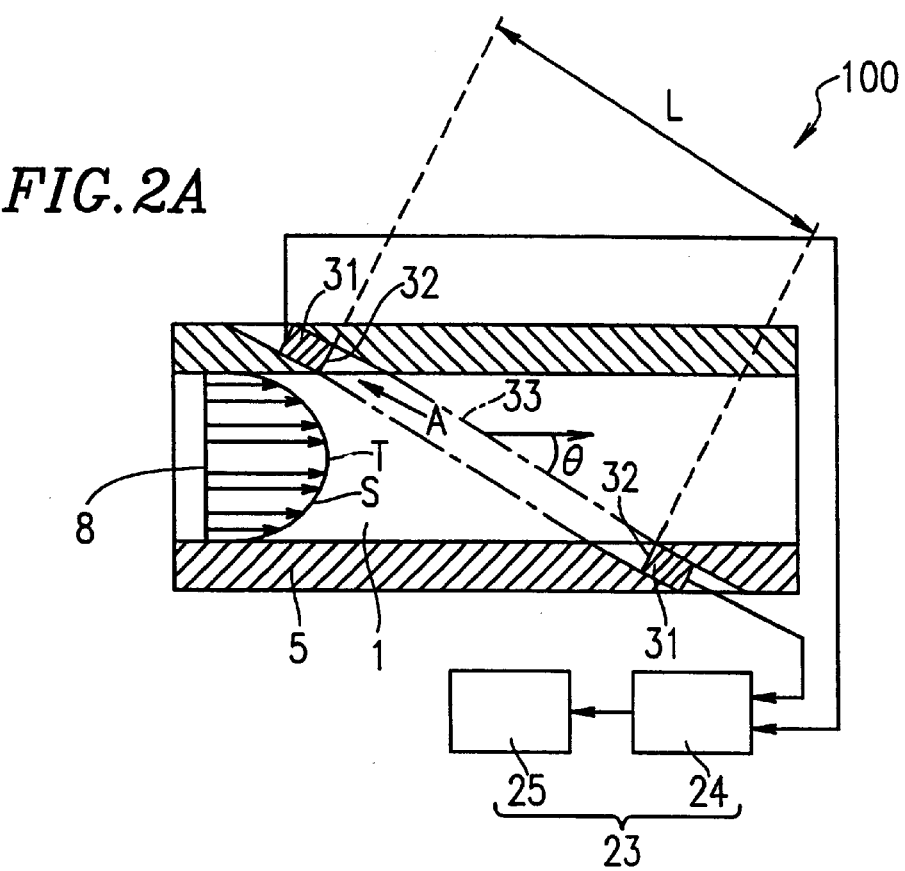
FIG. 2A is a longitudinal and vertical cross-sectional view of a flow meter according to a first example of the present invention.
Figure 2B:
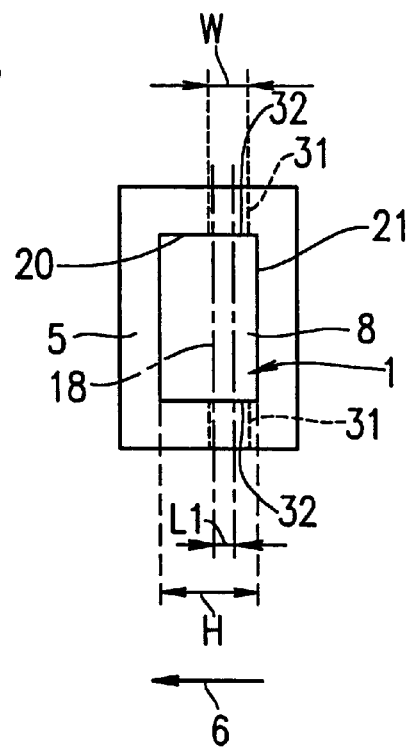
FIG. 2B is a height direction cross-sectional view of the flow meter according to the first example, illustrating a flow path structure of the flow meter.
Figure 3:
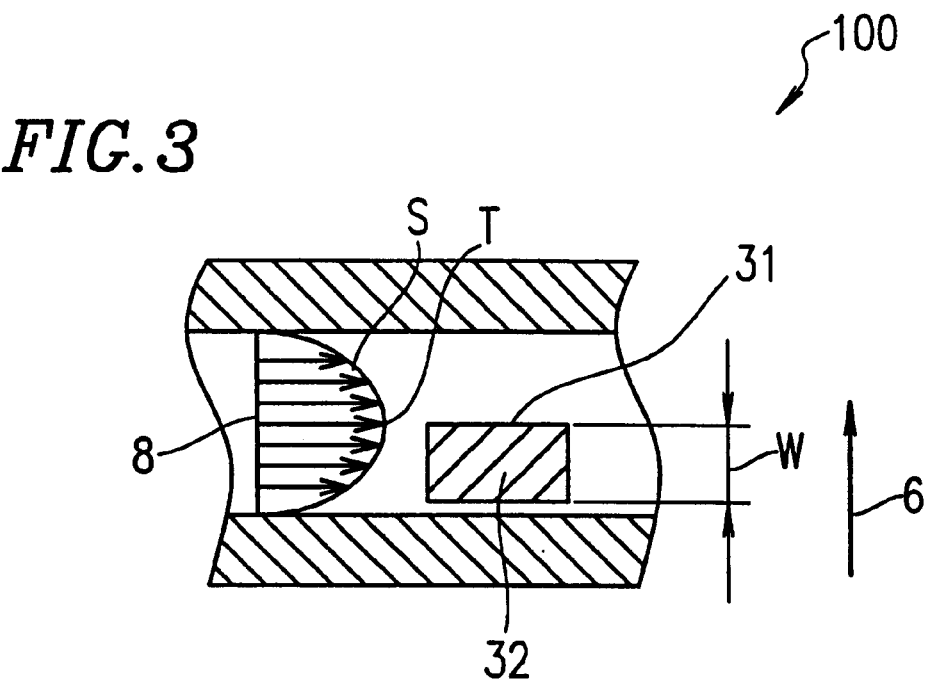
FIG. 3 is a cross-sectional view of a cross-sectional view seen in the direction of arrow A in FIG. 2A, illustrating a flow path structure when the flow rate is low.
Figure 4:
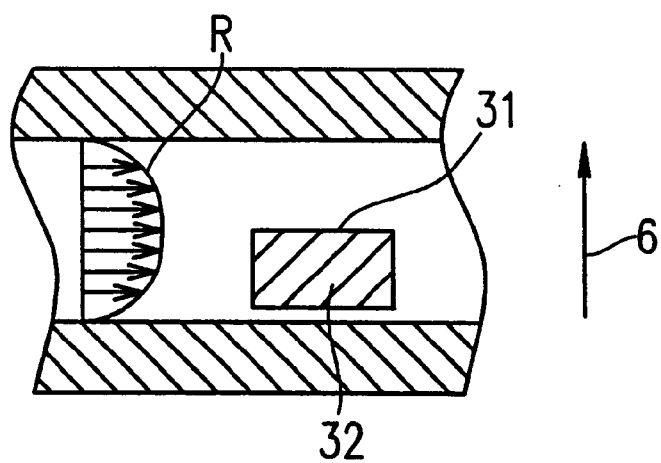
FIG. 4 is a cross-sectional view of a cross-sectional view seen in the direction of arrow A in FIG. 2A, illustrating a flow path structure when the flow rate is high.

FIG. 2A is a longitudinal and vertical cross-sectional view of a flow meter 100 according to a first example of the present invention. FIG. 2B is a longitudinal and horizontal cross-sectional view of the flow meter 100. FIG. 3 is a cross-sectional view of the flow meter 100 seen in the direction represented by arrow A shown in FIG. 2A. FIG. 3 shows a flow path structure of the flow meter 100 when the flow rate is low. FIG. 4 is a cross-sectional view of the flow meter 100 seen in the direction represented by arrow A shown in FIG. 2A. FIG. 4 shows a flow path structure of the flow meter 100 when the flow rate is high.

The flow meter 100 measures a flow rate of a fluid, such as, for example, town gas or LPG, utilizing ultrasonic waves. The flow meter 100 has a flow path wall 5 defining a flow path 1, through which a fluid as a measuring target flows. As shown in FIG. 2B, the flow path wall 5 defines a quadrangular flow path cross-section 8 having a pair of longer sides 21 and a pair of shorter sides 20. A pair of generally quadrangular parallelepiped transceivers 31 for sending and receiving ultrasonic waves propagating across the flow path 1 are provided along the shorter sides 20 of the flow path wall 5. One of the transceivers 31 is provided in an upstream part of the flow path wall 5, and the other of the transceivers 31 is provided in a downstream part of the flow path wall 5. Each transceiver 31 has a quadrangular transceiving surface 32 for sending and receiving ultrasonic waves propagating across the flow path 1.

As shown in FIG. 2B, the pair of transceivers 31 are provided at positions deviated to the right of the sheet of FIG. 2B from a center 18 of the transceivers 31 in a height direction 6 of the flow path 1 by a deviation amount L1. The deviation amount L1 is defined so that the position of the transceivers 31 in the height direction 6 substantially matches the position of the equal flow speed areas P1 (described above with reference to FIG. 1) in the height direction 6, respectively.

The flow meter 100 includes a flow rate calculation section 23 for calculating a flow rate of a fluid flowing through the flow path 1 based on a result of the sent and received ultrasonic waves obtained by the pair of transceivers 31. The flow rate calculation section 23 includes a measurement control section 24 connected to each of the pair of transceivers 31, and a calculation section 25 connected to the measurement control section 24.

The flow meter 100 having the above-described structure operates as follows. When a fluid as a measuring target flows through the flow path 1, an ultrasonic wave sent from the upstream transceiver 31 propagates so as to cross the flow path 1 obliquely with respect to the fluid flow direction, and reaches the downstream transceiver 31. An ultrasonic wave sent from the downstream transceiver 31 oppositely propagates so as to cross the flow path 1 obliquely with respect to the fluid flow direction, and reaches the upstream transceiver 31. The measuring control section 24 measures a first propagation time period required for the ultrasonic wave sent from the upstream transceiver 31 to reach the downstream transceiver 31 and a second propagation time period required for the ultrasonic wave sent from the downstream transceiver 31 to reach the upstream transceiver 31. When the fluid flows through the flow path 1, the first propagation time period and the second propagation time period are different from each other. The calculation section 25 calculates the flow rate of the fluid flowing through the flow path 1 based on the first propagation time period and the second propagation time period measured by the measuring control section 24.

Next, the operation of the calculation section 25 will be described in detail. The propagation speed of the ultrasonic wave in the forward direction is (c+v) where the sonic speed in a still fluid is c and the flow speed of the fluid is v.

Where the distance between the pair of transceivers 31 is L and the angle between an ultrasonic wave propagation axis 33 and the direction in which the fluid flows through the flow path 1 is $\theta$, the first propagation time period t1 required for the ultrasonic wave sent from the upstream transceiver 31 to reach the downstream transceiver 31 is:

$$t1 = L/(c + v \cos \theta)$$ expression (1).

The second propagation time period t2 required for the ultrasonic wave sent from the downstream transceiver 31 to reach the upstream transceiver 31 is:

$$t2 = L/(c - v \cos \theta)$$ expression (2).

By deleting the sonic speed C from the expression of subtracting the reciprocal of t2 from the reciprocal of t1, expression (3) is obtained.

$$v = (L/2 \cos \theta)((1/t1) - (1/t2))$$ expression (3)

Accordingly, when the distance L and the angle $\theta$ are known, the flow speed v is obtained only by measuring the first propagation time period t1 and the second propagation time period t2 by the measuring control section 24.

In the case of measuring the flow rate of the air, where the angle $\theta$=45 degrees, the distance L=70 mm, the sonic speed C=340 m/s, the flow speed v=8 m/s, t1=2.0×10$^{-4}$ second and t2=2.1×10$^{-4}$ seconds. Instantaneous measurement is possible.

However, the flow speed v is along the ultrasonic wave propagation path 33 which crosses the flow path 1. The average flow speed measured along the ultrasonic wave propagation path 33 is different from the average speed obtained from the entirety of the flow path cross-section 8 perpendicular to the fluid flow direction in the flow path 1. The reason for this is because the development state of the flow is different in accordance with the position in the cross-section, and the flow speed is not measured in the entirety of the cross-section in the height direction 6. In addition, the strength distribution of the ultrasonic wave in the ultrasonic wave propagation path 10 has a characteristic that the ultrasonic wave tends to be stronger in the central area of the ultrasonic transceivers 31. Therefore, the measurement is mainly made at the center 18, in the height direction 6, of the ultrasonic wave propagation path 33. Therefore, the flow speed v is corrected based on the correction coefficient.

From the flow speed v, the flow rate Q is obtained by expression (4) by the calculation section 25, where the cross-sectional area of the flow path 1 is S and the correction coefficient is K.

$$Q = KSv$$ expression (4)

The flow of the fluid flowing through the flow path 1 generally has a flow speed distribution along the flow path cross-section 8. The flow speed distribution varies in accordance with the Reynolds number and the disturbance of the upstream flow. The flow speed distribution is two-dimensionally generated. FIG. 2A shows a low flow rate flow speed distribution S, which is generated along the longer sides 21 of the flow path cross-section 8. As shown in FIG. 3, the low flow rate flow speed distribution S is also generated along the shorter sides 20. FIG. 4 shows a high flow rate flow speed distribution R generated when the flow rate is high. Like the low flow rate flow speed distribution S, the high flow rate flow speed distribution R varies in accordance with the Reynolds number and the disturbance of the upstream flow, and is generated two-dimensionally. In the high flow rate flow speed distribution R, the difference between the maximum flow speed and the minimum flow speed is smaller than that in the low flow rate flow speed distribution S. When there is a flow speed distribution, the flow rate calculated based on the propagation time period of the ultrasonic waves corresponds to the average flow speed obtained by integrating the flow speed distribution.

As shown in FIGS. 2B and 3, the length W of the transceiving surface 32 of each of the pair of transceivers 31 along the shorter sides 20 of the flow path cross-section 8 is significantly smaller than a length H of the shorter sides 20. Therefore, the ultrasonic wave sent and received by the transceivers 31 crosses only a part of the flow path 1. When the transceivers 31 are each provided so as to have the center 18 (in the height direction 6 of the flow path 1) as its center, the transceivers 31 measure only the speed of a maximum flow speed generation position T and the vicinity thereof. At the maximum flow speed generation position T, the flow speed is maximum in the low flow rate flow speed distribution S. Therefore, the apparent flow rate measured by the transceivers 31 is higher than the true flow rate (average flow rate). Therefore, the apparent flow rate is calculated using a correction coefficient K which is smaller than one. Since the flow speed is different when the flow rate is high from when the flow rate is low, different correction coefficients need to be used when the flow rate is high from when the flow rate is low.

In the first example, the position of the transceivers 31 in the height direction 6 of the flow path 1 is deviated by the deviation amount L1 so that the ultrasonic wave sent and received by the pair of transceivers 31 cross the equal flow speed area P1. As a result, the ultrasonic wave is transmitted through a portion of the fluid that is flowing through the flow path 1 with the low flow rate flow speed distribution S, the portion having an average flow speed. By deviating the position of the transceivers 31 by the deviation amount L1, the average flow speed of the low flow rate flow speed distribution S can be detected even when the flow rate, type or temperature of the fluid varies.

The transceiving surface 32 of each transceiver 31 usually has a better sensitivity at a central area than at a peripheral area. Therefore, the transceivers 31 are significantly influenced by the flow speed of a portion of the fluid corresponding to the central area of the transceiving surface 32. This also needs to be considered. The deviation amount L1 of the pair of transceivers 31 from the center 18 in the height direction 6 of the flow path 1 preferably fulfills expression (5), and more preferably fulfills expression (6).

$$(H-W) \times 0.3 \leq L1 \leq (H-W) \times 0.7 \quad \text{expression (5)}$$

$$(H-W) \times 0.4 \leq L1 \leq (H-W) \times 0.6 \quad \text{expression (6)}$$

where H is the length of the shorter sides 20 in the height direction 6 of the flow path cross-section 8, and W is the length of the quadrangular transceiving surface 32 of each transceiver 31 in the height direction 6.

The shape of the transceiving surface 32 of each transceiver 31 is preferably quadrangular for detecting the average flow rate. When the size of the transceiving surface 32 is too small, it is difficult to detect the average flow rate. When the size of the transceiving surface 32 is too large, the transceiver 31 becomes large, so as to raise the cost. The length W of the transceiving surface 32 of each transceiver 31 in the height direction 6, is 30% or more and 70% or less of the length H of the shorter sides 20 in the height direction 6 of the flow path 1. When the transceivers 32 are too small with respect to the flow path 1, the correction coefficient is not stable with respect to the fluctuation of the flow rate. When the length W of the transceiving surface 32 is close to the length H of the shorter sides 20, the expanding ultrasonic wave is reflected by the flow path wall 5 defining the flow path 1. Therefore, the reflected wave interferes with the direct ultrasonic wave and thus adversely affects the receiving sensitivity of the transceivers 31.

The shape of the flow path cross-section 8 is preferably quadrangular for detecting the average flow rate. When the ratio of the length of the longer sides 21 of the flow path cross-section 8 is 1.1 or more and 5 or less with respect to the length of the shorter sides 20, the flow is stabilized and thus the average flow rate can be stably calculated. The shape of the flow path cross-section 8 may be circular.

Figure 5:
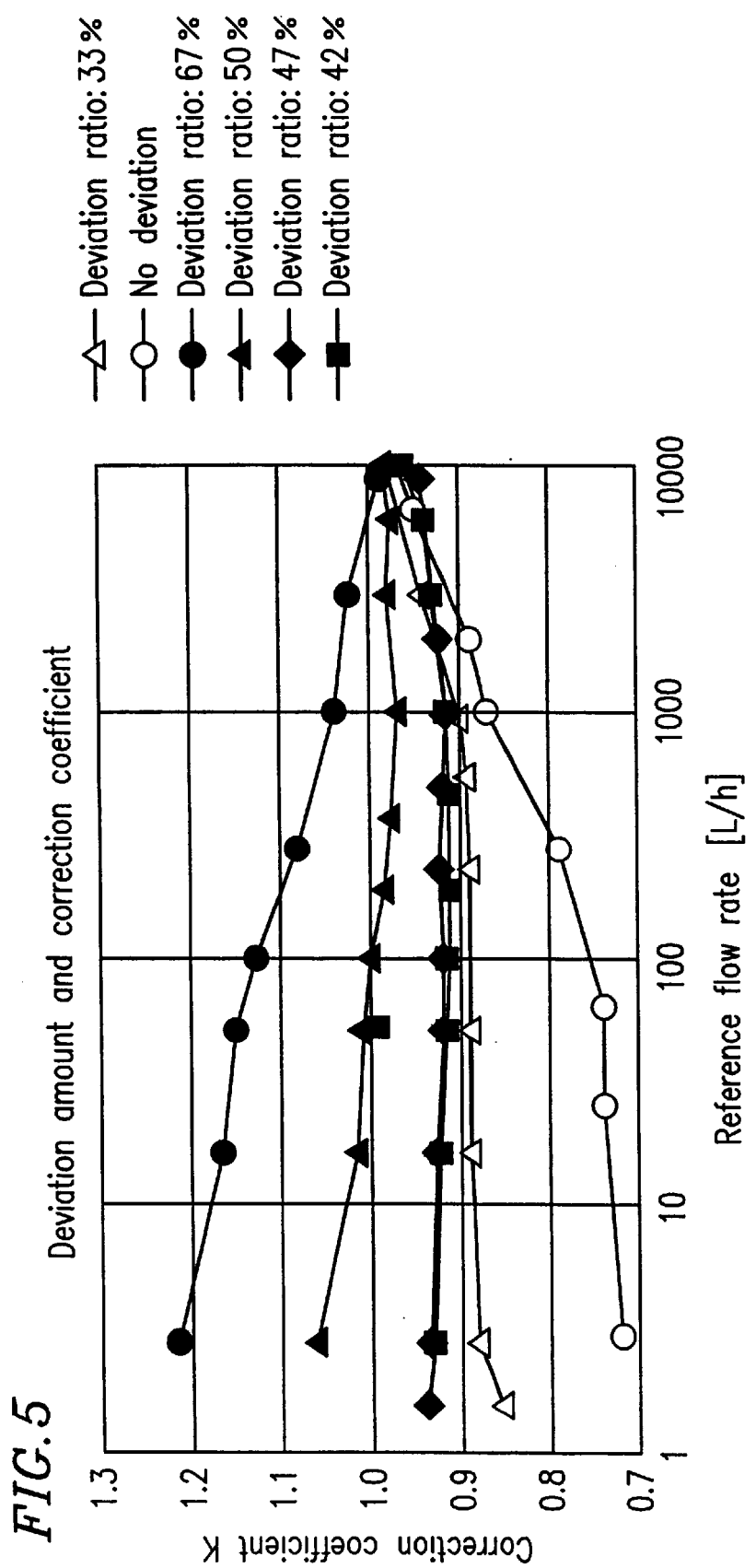
FIG. 5 is a graph illustrating the relationship between the flow rate and the correction coefficient in the flow meter according to the first example.

FIG. 5 is a graph illustrating the relationship between the flow rate and the correction coefficient K in the flow meter 100. The horizontal axis represents the flow rate of the fluid flowing through the flow path 1, and the vertical axis represents the correction coefficient K. FIG. 5 shows the result of plotting the relationship between the flow rate and the correction coefficient K when the deviation ratio is changed. Here, $$\text{deviation ratio} = L1/(H-W).$$

FIG. 5 shows the results when the transceivers 32 are deviated, in a flow path having a curved portion (described below), toward an outer circumferential surface of the curved portion. The ratio of change of the correction coefficient varies in accordance with the shape of the inlet section of the flow path.

It is appreciated that when the deviation ratio is 33%, 42% and 47%, the correction coefficient K is substantially constant regardless of the flow rate. With these deviation ratios, the pair of transceivers 31 are deviated in the height direction 6 so that the positions thereof in the height direction 6 of the flow path 1 substantially match the positions of the equal flow speed areas P1 in the height direction 6. When there is no deviation, the correction coefficient K is smaller in a low flow rate area than in a high flow rate area. The correction coefficient K is about 0.7 in the low flow rate area, whereas the correction coefficient K is about 1 in the high flow rate area. Thus, when there is no deviation, the correction coefficient K significantly differ in the low flow rate area and in the high flow rate area. As the deviation ratio increases to 50% and to 67%, the correction coefficient K becomes larger in the low flow rate area than in the high flow rate area, and the correction coefficient becomes significantly different between in the low flow rate area and in the high flow rate area.

When the correction coefficient K is substantially constant regardless of the flow rate, the correction coefficient K can be very easily set. This can reduce the memory capacity of the microcomputer and facilitate the inspection operation of the correction coefficient K during the production of the flow meter. It is known that the flow speed distribution in the flow path 1 varies with the Reynolds number. The correction coefficient K which is substantially constant regardless of the flow rate indicates that the correction coefficient K does not substantially vary even when the Reynolds number changes. Accordingly, when the pair of transceivers 31 is deviated in the height direction 6 of the flow path 1, the correction coefficient K does not substantially vary even when the Reynolds number changes due to change in the temperature or the type of the fluid flowing through the flow path 1.

As described above, in the first example, the pair of transceivers 31 are deviated from the center of the flow path 1 in the height direction 6 of the flow path 1, so that the positions of the transceivers 31 in the height direction 6 match the positions of the equal flow speed areas P1 in the height direction 6. Therefore, the ultrasonic wave sent and received by the transceivers 31 crosses the equal flow speed areas P1 where the fluid flows at a substantially equal speed in the low flow rate flow speed distribution S and the high flow rate flow speed distribution R. Therefore, the difference in the correction coefficient K between the low flow rate area and the high flow rate area is smaller than that of the conventional flow meter. As a result, a wide flow rate range can be measured with high precision.

Even when the temperature or type of the fluid flowing through the flow path 1 varies, the correction coefficient K does not substantially vary. Therefore, the flow rate of the fluid can be measured with higher precision.

The ultrasonic wave sent and received by the transceivers 31 crosses the flow path 1 in the direction of the longer sides 21 of the flow path cross-section 8. Therefore, the change in the correction coefficient K is further reduced. Thus, the flow rate of the fluid can be measured with still higher precision.

The deviation amount L1 of the transceivers 31 is 30% or more and 70% or less, and preferably 40% or more and 60% or less, with respect to the value obtained by subtracting the length W of the transceiving surface 32 in the height direction 6 from the length H of the shorter sides 20 of the flow path cross-section 8 in the height direction 6. Therefore, the difference in the correction coefficient K between the low flow rate area and the high flow rate area can be reduced by a relatively simple structure. Thus, the flow rate of the fluid can be measured with still higher precision.

The ratio of the length of the longer sides 21 with respect to the shorter sides 20 is 1.1 or more and 5 or less. Therefore, the stability of the correction coefficient K between the low flow rate area and the high flow rate area can be further increased.

The length W of the transceiving surface 32 of each transceiver 31 is 30% or more and 70% or less with respect to the length H of the shorter sides 20 in the height direction 6 of the flow path 1. Therefore, the reflection of the ultrasonic wave by the flow path cross-section 8 is reduced. This can prevent reduction in the ultrasonic wave sending and receiving sensitivity of the transceivers 31. Thus, the flow rate of the fluid can be measured with still higher precision.

FIG. 6 shows a structure of another transceiver 31A usable in the flow meter according to the first example of the present invention. The transceiver 31A has a substantially cylindrical outer shape, and has a quadrangular transceiving surface 32. The transceiver 31A should be airtight so that the fluid flowing through the flow path 1 does not leak to the outside of the flow path 1. In the transceiver 31 described above with reference to FIGS. 2A through 4, it is difficult to ensure that the transceiver 31A remains airtight. The transceiver 31A shown in FIG. 6 has a substantially cylindrical outer shape, and therefore can be made airtight using an O-ring or the like.

Figure 8:
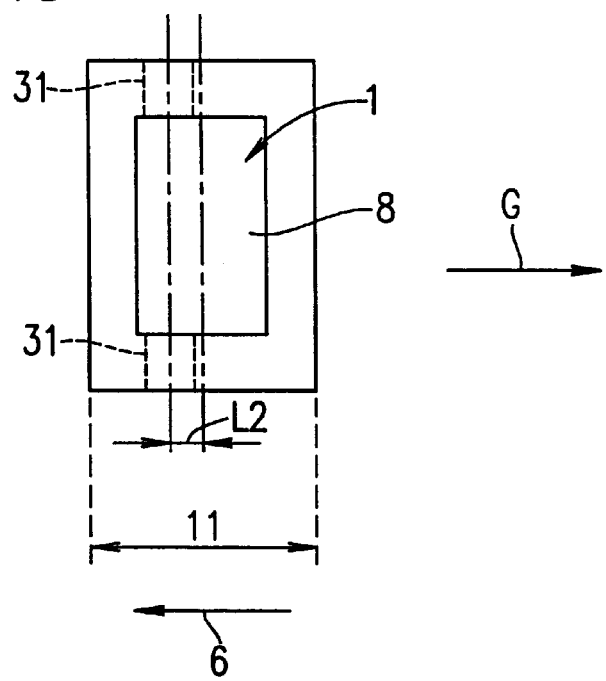
FIG. 8 is a height direction cross-sectional view of the another flow meter according to the first example, illustrating a flow path structure of the flow meter.

FIG. 7 shows a structure of another flow meter 100A according to the first example of the present invention. FIG. 8 shows a height direction cross-sectional view illustrating a flow path structure of the flow meter 100A. Identical elements previously discussed with respect to the flow meter 100 in FIGS. 2A through 4 bear identical reference numerals and will not be described in detail. The flow meter 100A is different from the flow meter 100 in that the height direction 6 of the flow path 1 is parallel to a gravity acting direction G, and the pair of transceivers 31 are deviated in a direction opposite to the gravity acting direction G in the flow meter 100A.

As shown in FIG. 8, the height direction 6 of the flow path 1 is parallel to the gravity acting direction G. A pair of transceivers 31 are deviated in the opposite direction to the gravity acting direction G by a distance L2. In this case, like in the case where the pair of transceivers 31 are deviated in the gravity acting direction G, the change in the correction coefficient K between the low flow rate area and the high flow rate area can be reduced. Therefore, the flow rate of the fluid can be measured with still higher precision.

When a fluid containing a large amount of dust flows through the flow path 1, dust is accumulated at the bottom surface of the flow path 1. In this case, the ultrasonic wave sent and received by the pair of transceivers 31 propagates through an upper portion of the flow path 1, and therefore is unlikely to be influenced by the disturbance of the flow caused by the accumulation of the dust at the bottom of the flow path 1. This is advantageous in measuring the flow rate of the fluid flowing through the flow path 1. When there is a portion in the flow path 1 where dust is expected to be accumulated due to the curved flow of the fluid in the flow path 1, the pair of transceivers 31 are provided at positions selected so as to avoid such a portion.

The pair of transceivers 31 are deviated in the direction opposite to the gravity acting direction G by a distance L2. Therefore, the flow rate of the fluid can be measured with still higher precision without being adversely affected by the accumulation of dust.

Figure 9:
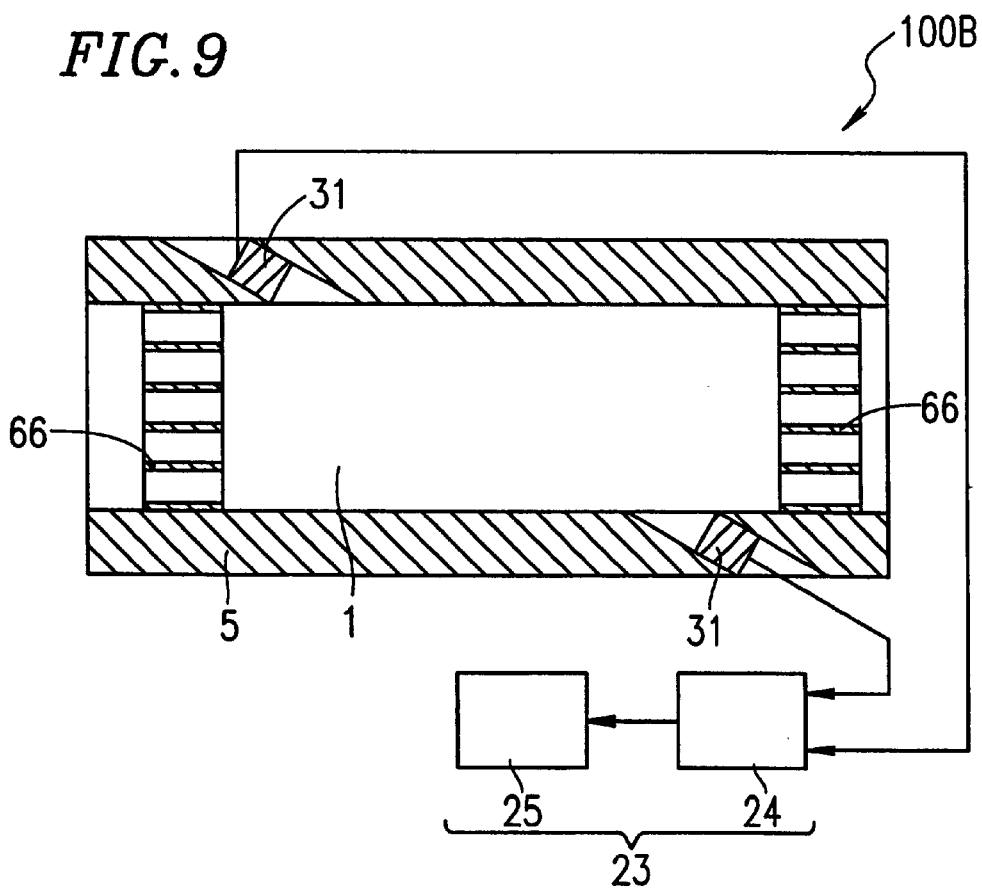
FIG. 9 shows a structure of still another flow meter according to the first example.

FIG. 9 shows a structure of still another flow meter 100B according to the first example of the present invention. Identical elements previously discussed with respect to the flow meter 100 in FIGS. 2A through 4 bear identical reference numerals and will not be described in detail. The flow meter 100B is different from the flow meter 100 in that the flow meter 100B includes a pair of rectifying lattices 66. One of the rectifying lattices 66 is provided upstream with respect to the transceivers 31 and the other rectifying lattice 66 is provided downstream with respect to the transceivers 31. The pair of rectifying lattices 66 rectify the flow in the flow path 1 and thus provide a stable flow. Even the upstream flow rectifier 66 only can effectively provide a stable flow. Considering that the fluid may flow from a downstream position to an upstream position of the flow path 1 as well as from the upstream position to the downstream position, it is preferable to provide the flow rectifier 66 downstream with respect to the transceivers 31.

EXAMPLE 2

Figure 10:
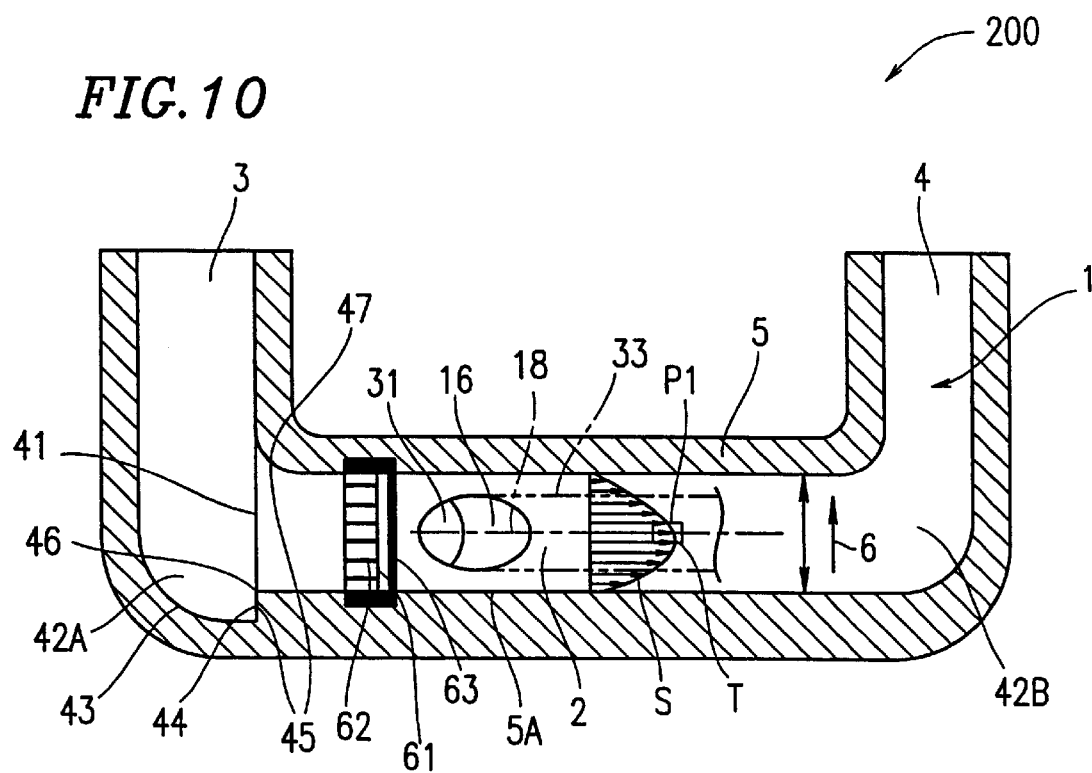
FIG. 10 is a longitudinal and vertical cross-sectional view of a flow meter according to a second example of the present invention.
Figure 11:
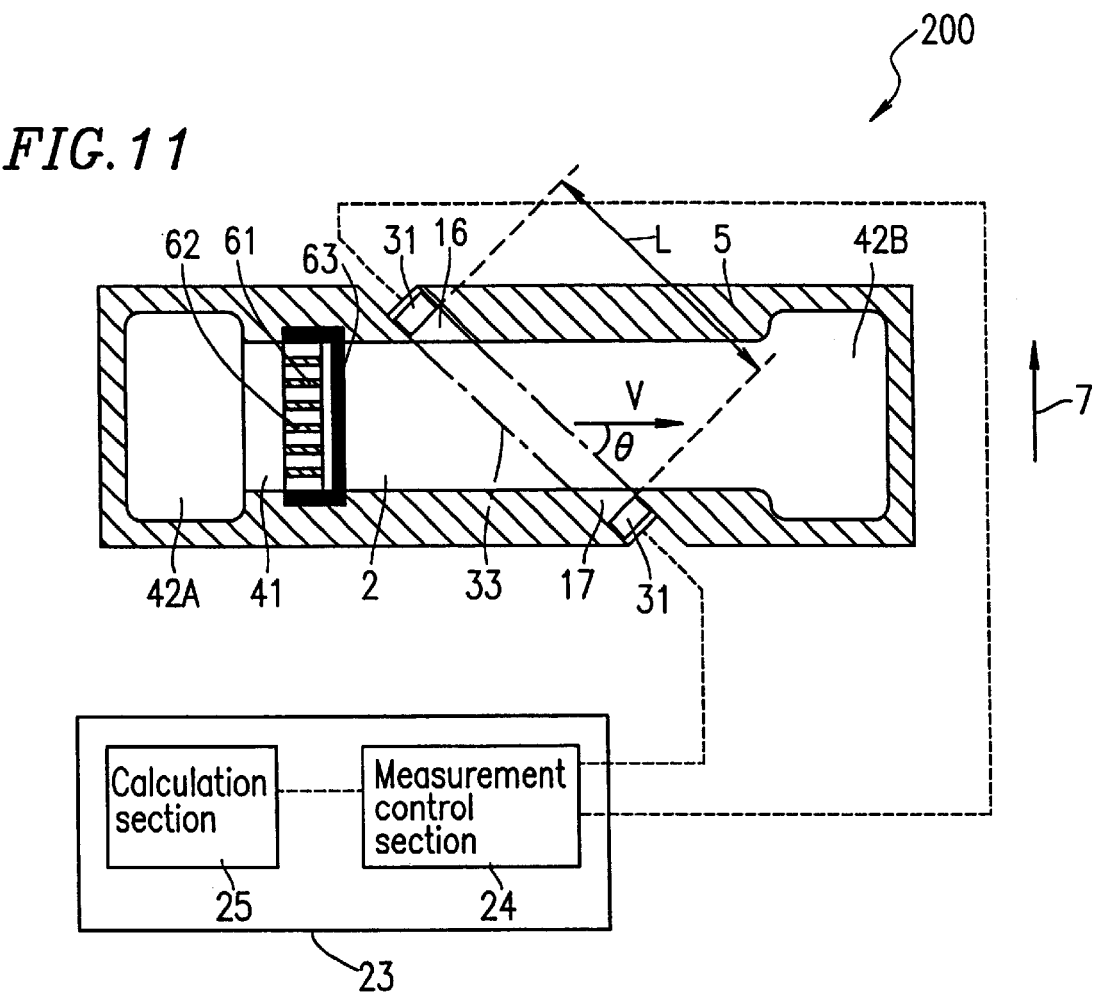
FIG. 11 is a longitudinal and horizontal cross-sectional view of the flow meter according to the second example.

FIG. 10 is a longitudinal and vertical cross-sectional view of a flow meter 200 according to a second example of the present invention, and FIG. 11 is a longitudinal and horizontal cross-sectional view of the flow meter 200. Identical elements previously discussed with respect to the flow meter 100 bear identical reference numerals and will not be described in detail.

The flow meter 200 includes a flow path wall 5 defining a flow path 1, through which a fluid as a measuring target flows. The flow path 1 includes a measuring flow path 2 where a flow rate of the fluid as the measuring target is measured, an inlet section 3 provided upstream with respect to the measuring flow path 2 for introducing the fluid to the measuring flow path 2, and an output section 4 provided downstream with respect to the measuring flow path 2 for discharging the fluid from the measuring flow path 2. The measuring flow path 2 has a quadrangular flow path cross-section 8. A curved section 42A is provided between the measuring flow path 2 and the inlet section 3 for connecting the measuring flow path 2 and the inlet section 3. The curved section 42A is curved so as to rise in a height direction 6 from the measuring flow path 2. A curved section 42B is provided between the measuring flow path 2 and the outlet section 4 for connecting the measuring flow path 2 and the outlet section 4. The curved section 42B is curved so as to rise in the height direction 6 from the measuring flow path 2.

In the flow path wall 5, a pair of generally parallelepiped transceivers 31 are provided so as to face each other. One of the transceivers 31 is provided in an upstream part of the flow path wall 5, and the other transceiver 31 is provided in a downstream part of the flow path wall 5. Each transceiver 31 has a rectangular transceiving surface 32 for sending and receiving ultrasonic waves propagating across the flow path 1. The pair of transceivers 31 are provided obliquely with respect to the direction in which the fluid flows in the measuring flow path 2, and are away from each other by a distance L across the measuring flow path 2. Each transceiver 5 is provided in the central position in the height direction 6 of the measuring flow path 5. The flow path wall 5 of the measuring flow path 2 has an opening 16 in an upstream portion of the flow path wall 5 and another opening 16 in a downstream portion of the flow path wall 5. The openings 16 are for exposing the pair of transceivers 31 to the measuring flow path 2. The ultrasonic wave sent and received by the pair of transceivers 31 propagates through the measuring flow path 2 along the ultrasonic wave propagation path 33.

The flow meter 200 includes an asymmetric flow promotion section 41 for deviating, in the height direction 6, the flow speed distribution of the fluid flowing through the measuring flow path 2. In the low flow rate area, the asymmetric flow promotion section 41 makes the low flow rate flow speed distribution S asymmetric with respect to the center 18 in the height direction 6 of the measuring flow path 2. Thus, the asymmetric flow promotion section 41 deviates the maximum flow speed generation position T downward in the height direction 6 (downward in the sheet of FIG. 10) from the center 18, so that the positions of the pair of transceivers 31 in the height direction 6 of the measuring flow path 2 match the positions of the equal flow speed areas P1 in the height direction 6.

The asymmetric flow promotion section 41 includes the curved section 42A provided upstream with respect to the measuring flow path 2, a step 44 and a different-shape section 45. The step 44 is provided in the vicinity of an outer circumferential surface 43 of the upstream curved section 42A. The different-shape section 45 includes two ends 46 and 47 of the measuring flow path 2. The ends 46 and 47 face each other across the height direction 6, and have different shapes from each other. The end 46 is stepped with no curve, and the end 47 has a curved portion smoothly rounding in the height direction 6.

A flow stabilizing member 61 is provided between the asymmetric flow promotion section 41 and the ultrasonic wave propagation path 33. The flow stabilizing member 61 includes a direction regulation section 62 including a plurality of portions divided in the height direction 6 of the flow path cross-section 8 of the measuring flow path 2 so as to rectify the flow direction of the fluid flowing through the flow path 1. The flow stabilizing member 61 also includes a fluctuation restriction section 63 formed of a mesh body or the like for reducing the flow speed fluctuation of the fluid flowing through the flow path 1. The flow stabilizing member 61 retains the flow speed distribution asymmetric as obtained by the asymmetric flow promotion section 41 and also rectifies the flow direction and the flow speed fluctuation of the fluid flowing through the flow path 1 before supplying the fluid to the ultrasonic wave propagation path 33.

The flow meter 200 includes a flow rate calculation section 23 for calculating a flow rate of the fluid flowing through the flow path 1 based on a result of the sent and received ultrasonic waves obtained by the pair of transceivers 31. The flow rate calculation section 23 includes a measurement control section 24 connected to each of the pair of transceivers 31, and a calculation section 25 connected to the measurement control section 24.

Figure 12:
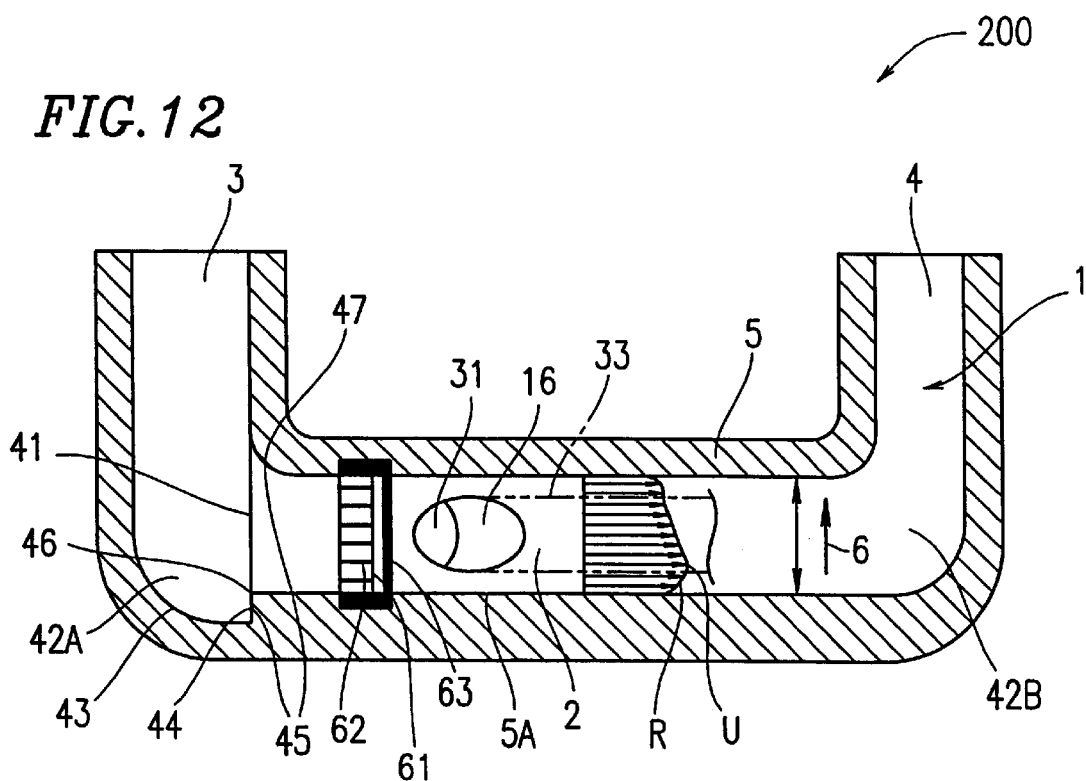
FIG. 12 is a longitudinal and vertical cross-sectional view of the flow meter according to the second example of the present invention, illustrating a flow speed distribution when the flow rate is high.

The flow meter 200 having the above-described structure operates as follows. When a fluid as a measuring target is introduced to the inlet section 3, the flow speed distribution in the height direction 6 of the fluid flowing through the measuring flow path 2 is made asymmetric, instead of symmetric, by the asymmetric flow promotion section 41 provided upstream with respect to the measuring flow path 2. Specifically, when the flow rate of the fluid flowing through the measuring flow path 2 is in a low flow rate area (layer flow area) or a transition area between the low flow rate area and a high flow rate area (disturbed flow area), the low flow rate flow speed distribution S having a parabolic curve (in which the speed increases as it becomes farther from the flow path wall 5), is deviated downward as shown in FIG. 10 from the center 18 in the height direction 6. The maximum flow speed generation position T of the low flow rate flow speed distribution S is deviated downward in the sheet of FIG. 10. When the flow rate of the fluid flowing through the measuring flow path 2 is in a high flow rate area, as shown in FIG. 12, the high flow rate flow speed distribution R (which has a smaller change in the flow speed in the height direction 6 and is like a relatively flat plateau) is deviated downward as shown in FIG. 12 from the center 18 in the height direction 6, like the low flow rate flow speed distribution S. The maximum flow speed generation position U in the high flow rate flow speed distribution R is also deviated downward in the sheet of FIG. 12.

When the fluid flows in the curve section 42A, a centrifugal force acts on the fluid flowing in the curved section 42A. Therefore, the flow is deviated toward a flow path wall portion 5A on the side of the outer circumferential surface 43 of the curved section 42A. This makes the fluid speed distribution in the height direction 6 asymmetric. When the fluid flows through the step 44, the flow is shrunk by the step 44, and thus the flow speed distribution in the height direction 6 is deviated. When the fluid flows through the different-shape section 45 having the different-shaped ends 46 and 47, the flow speed distribution in the height direction 6 of the measuring flow path 2 is more significantly deviated.

The flow speed distribution made asymmetric by the asymmetric flow promotion section 41 is rectified in the fluid flow direction by the flow stabilization member 61 and stabilized in terms of the flow speed fluctuation. Thus, the flow speed distribution made asymmetric by the asymmetric flow promotion section 41 is retained until reaching the ultrasonic wave propagation path 33.

The flow rate calculation section 23 calculates a flow rate of the fluid flowing through the flow path 1 based on a first propagation time period t1, a second propagation time period t2, and a correction coefficient K as in the first example.

Figure 13:
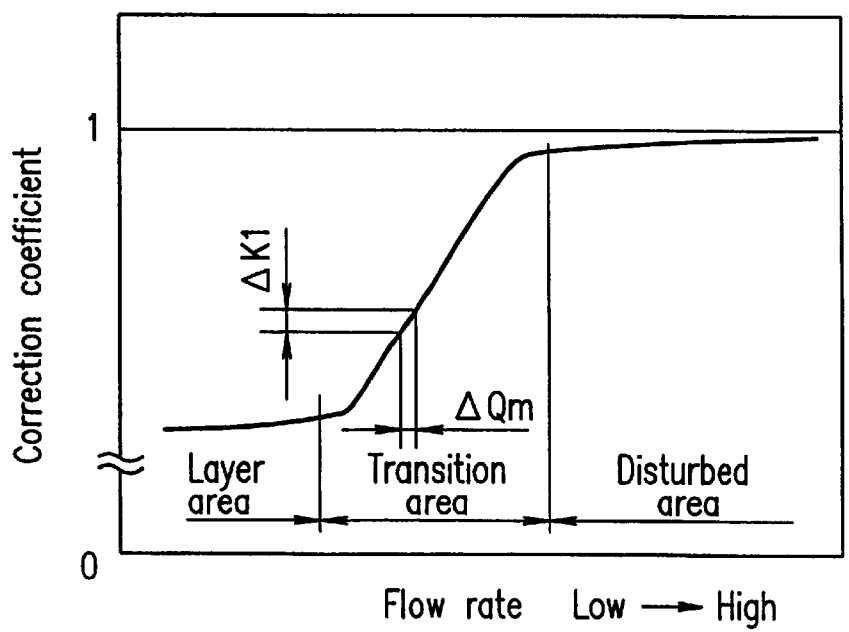
FIG. 13 is a graph illustrating the flow rate and the correction coefficient in a conventional flow meter.

FIG. 13 is a graph illustrating the relationship between the flow rate and the correction coefficient in a conventional flow meter without the asymmetric flow promotion section 41. The horizontal axis represents the flow rate of the fluid flowing through the measuring flow path 2, and the vertical axis represents the correction coefficient K. In the case of the high flow rate flow speed distribution R in a high flow rate area (disturbed flow area), the correction coefficient K is closer to 1 as shown in FIG. 13. The reason is that since the change in the flow speed in the height direction 6 is smaller than that of the low flow rate flow speed distribution S and is like a relatively flat plateau, the measured apparent flow rate is relatively close to the average flow rate. By contrast, the low flow rate flow speed distribution S in a low flow rate area (layer flow area) exhibits a parabolic curve in which the flow speed increases as it becomes farther from the flow path wall 5. The change in the flow speed in the height direction 6 is larger than that of the high flow rate flow speed distribution R. When the maximum flow speed generation position T at the center in the height direction 6 is measured by the transceivers 31, the measured apparent flow rate is significantly larger than the average flow rate. Therefore, as shown in FIG. 13, the value of the correction coefficient K is significantly smaller than that of the high flow rate area. Therefore, as shown in FIG. 13, the correction coefficient K significantly changes in a transition area between the low flow rate area and the high flow rate area. Accordingly, when the flow rate measured in the transition area includes an error $\Delta Qm$, the error is enlarged because the correction coefficient significantly changes to $\Delta K1$.

The error $\Delta Qm$ of the flow rate measured in the transition area may be generated by a change in the dynamic viscosity coefficient which is caused by a temperature change or a composition ratio change of the fluid or by the change in the flow state which is caused by a change in the Reynolds number. Especially when measuring town gas, LPG or the like, the composition ratio of the gas may change due to a temperature change of the fluid depending on the season or district. Therefore, there is an undesirable possibility that the error $\Delta Qm$ is enlarged.

Figure 14:
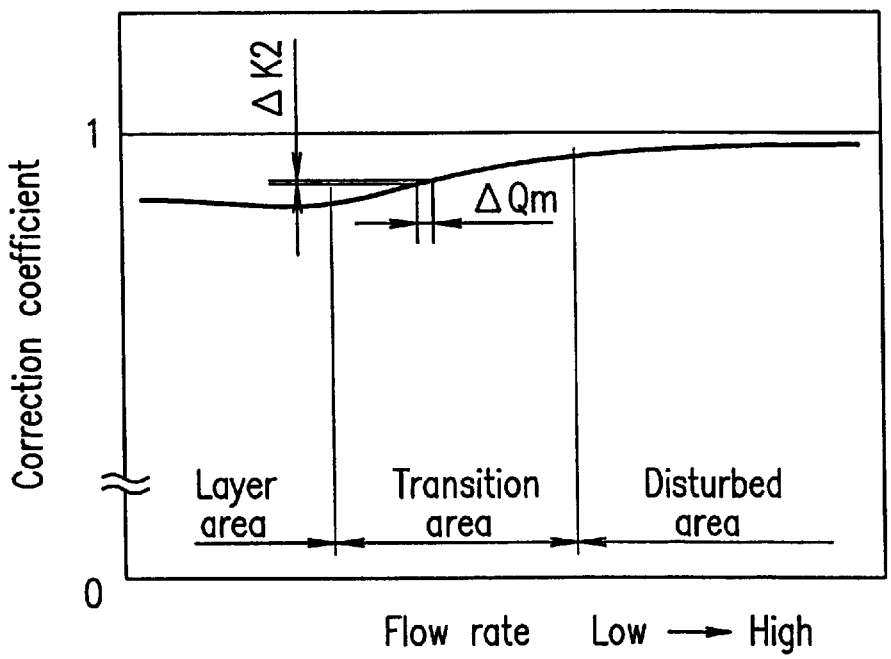
FIG. 14 is a graph illustrating the flow rate and the correction coefficient in the flow meter according to the second example.

FIG. 14 is a graph illustrating the relationship between the flow rate and the correction coefficient in the flow meter 200 according to the second example of the present invention. The horizontal axis represents the flow rate of the fluid flowing through the measuring flow path 2, and the vertical axis represents the correction coefficient K. In the case of a low flow rate area, when the flow speed distribution is deviated by the asymmetric flow promotion section 41, a flow speed which is lower than the speed of the maximum flow speed generation position T is measured by the transceivers 31. Therefore, the measured apparent flow rate is closer to the average flow rate. Therefore, as shown in FIG. 14, the correction coefficient K is increased to be closer to 1. In the case of a high flow rate area, the distribution R is like a relatively flat plateau. Therefore, even when the flow speed distribution is deviated by the asymmetric flow promotion section 41, the measured flow speed is not substantially different from the flow speed measured without deviating the flow speed distribution. Therefore, the value of the correction coefficient K is not substantially different from that of the conventional flow meter shown in FIG. 13. Thus, the correction coefficient K increases in the low flow rate area, whereas the correction coefficient K does not substantially change in the high flow rate area. As a result, the difference in the correction coefficient K between the low flow rate area and the high flow rate area is reduced. Accordingly, the change in the correction coefficient K in the transition area between the low flow rate area and the high flow rate area decreases, and thus the correction coefficient K with respect to the flow rate is flattened. Accordingly, even when the flow rate measured in the transition area involves an error $\Delta Qm$, the change in the correction coefficient K can be as small as $\Delta K2$ ($<\Delta K1$). Thus, the flow rate can be measured with high precision.

Especially the temperature or composition ratio of a fluid as a measuring target is changed, flattening the correction coefficient K with respect to the flow rate is effective for preventing the measuring error from being enlarged. The flow rate of fuel gas, such as, for example, town gas or LPG, which may have a temperature or composition ratio change, can be measured with high precision.

As described above, according to the second example of the present invention, the asymmetric flow promotion section 41 deviates the equal flow rate areas P1 in the height direction 6 of the measuring flow path 2, so that the positions of the pair of transceivers 31 in the height direction 6 of the measuring flow path 2 match the positions of the equal flow speed areas P1 in the height direction 6. In a low flow rate area, a flow speed which is lower than the speed of the maximum flow speed generation position T is measured by the transceivers 31. Therefore, the measured apparent flow rate is closer to the average flow rate. Thus, the correction coefficient K is increased to be closer to 1. In a high flow rate area, the correction coefficient K does not substantially change. Therefore, the difference in the correction coefficient K between the low flow rate area and the high flow rate area is decreased. As a result, the characteristic of the correction coefficient K in a transition area between the low flow rate area to the high flow rate area can be flattened. Accordingly, even when the flow rate measured in the transition area involves an error $\Delta Qm$, the flow rate can be measured with high precision.

The inlet section 3 and the outlet section 4 are connected to the measuring flow path 2 respectively via the curved sections 42A and 42B. Due to such a structure, the width of the flow meter 200 can be reduced so as to reduce the size of the flow meter 200. This allows the flow meter 200 to be installed at a wide variety of sites.

By adjusting the size of the step 44, the upper limit of the flow rate range, in which the deviation of the high flow rate flow speed distribution R in the height direction 6 of the measuring flow path 2 can be retained, can be changed. When the step 44 is enlarged, the upper limit of the flow rate range, in which the correction coefficient K with respect to the flow rate can be flattened, can be raised. Thus, the size of the step 44 is set in accordance with the flow rate range required to be measured. As described above, adjustment of the size of the step 44 allows the characteristic of the correction coefficient K to be flattened over a wider flow rate range. Therefore, the flow meter according to the second example is highly adaptable to a wider flow rate range to be measured and has a higher productivity.

The different-shaped section 45 includes the ends 46 and 47 in the height direction 6 of the measuring flow path 2. Since the ends 46 and 47 have different shapes from each other, the deviation of the flow speed distribution in the height direction 6 of the measuring flow path 2 can be promoted. Thus, the correction coefficient K with respect to the flow rate can be further flattened, and the measuring precision can be improved.

In the case where the curved section 42A and the step 44 are combined, the following effect is provided. An interaction of the curved section 42A and the step 44 makes the flow speed distribution in the height direction 6 of the measuring flow path 2 asymmetric more easily, so that the asymmetric flow speed distribution can be retained even in the high flow rate area in which the flow is progressively disturbed. Thus, the characteristic of the correction coefficient K can be flattened over a wider flow rate range. Therefore, the flow meter according to the second example is highly adaptable to a wider flow rate range to be measured and is compact.

In the case where the curved section 42A, the step 44 and the different-shaped section 45 are combined, the following effect is provided. An interaction of the curved section 42A, the step 44 and the different-shaped section 45 makes the flow speed distribution in the height direction 6 of the measuring flow path 2 asymmetric more easily, so that the asymmetric flow speed distribution can be retained even in the high flow rate area. Thus, the deviation of the flow speed distribution in the height direction 6 of the measuring flow path 2 can be promoted. As a result, the characteristic of the correction coefficient K can be flattened over a wider flow rate range. Therefore, the flow meter according to the second example is highly adaptable to a wider flow rate range to be measured and is compact.

The end 46 of the different-shape section 45 is stepped with no curve. Such a shape shrinks the flow and thus enlarges the deviation of the flow speed distribution. The other end 47 has a curved portion, which smoothly rounds in the height direction 6. Thus, the stability of the flow of the fluid, and therefore, the measuring precision of the flow rate can be stabilized.

Figure 15:
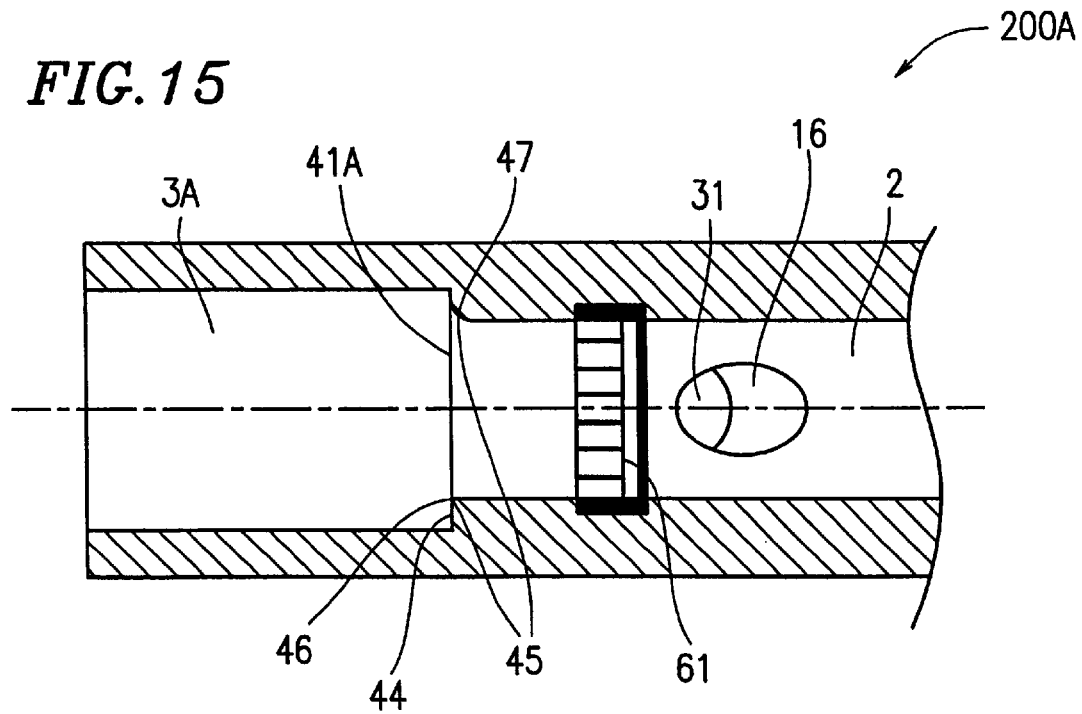
FIG. 15 is a longitudinal and vertical cross-sectional view of another flow meter according to the second example.

FIG. 15 is a longitudinal and vertical cross-sectional view of another flow meter 200A according to the second example of the present invention. Identical elements previously discussed with respect to the flow meter 200 in FIGS. 10 through 12 bear identical reference numerals and will not be described in detail. With reference to FIG. 15, the flow meter 200A includes an inlet section 3A and the measuring flow path 2 which are coaxially provided and connected to each other directly, not via a curved section. An asymmetric flow promotion section 41A includes the step 44 and the different-shape section 45 at the entrance of the measuring flow path 2. The different-shape section 45 has the ends 46 and the 47 having different shapes from each other. Since the inlet section 3A and the measuring flow path 2 are directly connected to each other, the flow meter 200A is compact. The inlet section 3A and the measuring flow path 2 may be provided parallel to each other, instead of coaxially.

Figure 16:
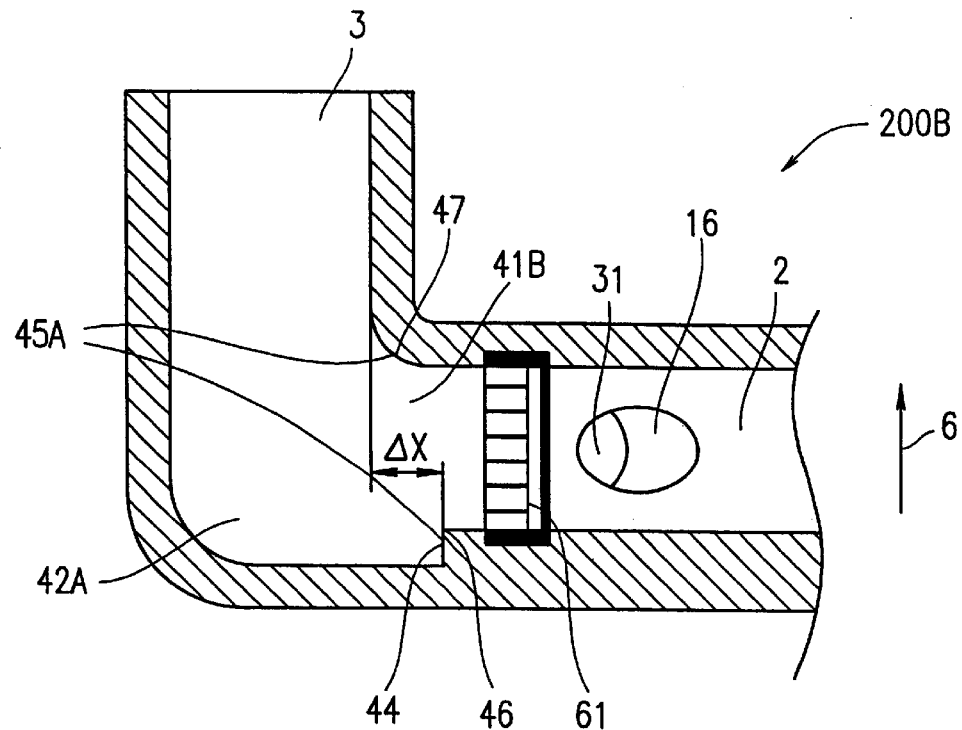
FIG. 16 is a longitudinal and vertical cross-sectional view of still another flow meter according to the second example.

FIG. 16 is a longitudinal and vertical cross-sectional view of still another flow meter 200B according to the second example of the present invention. Identical elements previously discussed with respect to the flow meter 200 in FIGS. 10 through 12 bear identical reference numerals and will not be described in detail. In the flow meter 200B, an asymmetric flow promotion section 41B includes a different-shape section 45A. The different-shape section 45A includes the ends 46 and 47 in the height direction 6. The ends 46 and 47 are formed at the entrance of the measuring flow path 2, with a distance of $\Delta X$ therebetween in the fluid flow direction. Since the ends 46 and 47 formed in the height direction 6 at the entrance of the measuring flow path 2 are deviated from each other in the flow direction of the fluid, the deviation of the flow speed distribution in the height direction 6 can be promoted. Therefore, the correction coefficient K in a high flow rate area is increased, which further flattens the characteristic of the correction coefficient. In the example shown in FIG. 16, the end 46 is stepped and the end 47 is curved. Alternatively, both the ends 46 and 47 may be stepped, or both the ends 46 and 47 may be curved.

Figure 17:
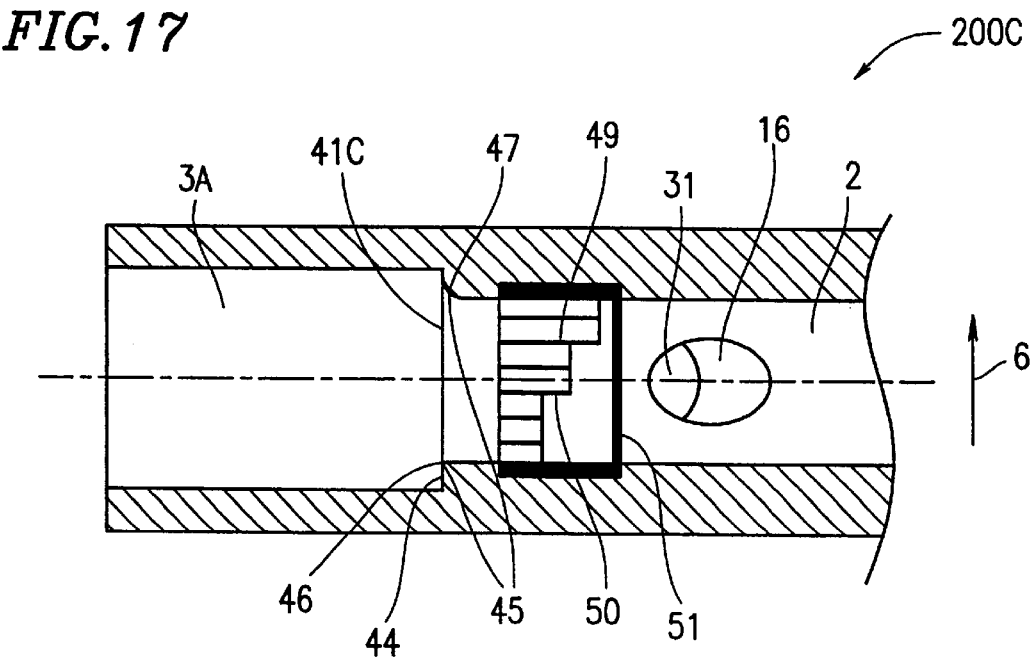
FIG. 17 is a longitudinal and vertical cross-sectional view of still another flow meter according to the second example.

FIG. 17 is a longitudinal and vertical cross-sectional view of still another flow meter 200C according to the second example of the present invention. Identical elements previously discussed with respect to the flow meter 200 in FIGS. 10 through 12 bear identical reference numerals and will not be described in detail. In the flow meter 200C, an asymmetric flow promotion section 41C includes a rectifier 49, which is provided at the entrance of the measuring flow path 2. The rectifier 49 includes a direction regulation section 50 including a plurality of lattice portions divided in the flow path cross-section 8 of the measuring flow path 2 and a fluctuation restriction section 51. The plurality of lattice portions of the direction regulation section 50 have lengths (in the fluid flow direction) which are different in the height direction 6, and the fluctuation restriction section 51 is formed of a mesh or the like for reducing the flow speed fluctuation. Since the plurality of lattice portions of the direction regulation section 50 divided in the height direction 6 of the measuring flow path 2 have different lengths in the height direction 6 of the measuring flow path 2, the resistance against a flow is varied in the height direction 6. By arbitrary varying the resistance against a flow in the height direction 6 of the measuring flow path 2, the flow speed distribution can be made optimally asymmetric and the characteristic of the correction coefficient K can be further flattened. In the example shown in FIG. 17, the asymmetric flow promotion section 41C includes the rectifier 49. Alternatively, the rectifier 49 can be combined with the curved section 42, the step 44 and/or the different-shape section 45. In such a case, the distribution can be more asymmetric in the height direction 6, and the characteristic of the correction coefficient K can be further flattened. Instead of varying the length of the direction regulation section 50, the size of the lattices may be varied in order to change the resistance against a flow. Alternatively, the size of the openings of the fluctuation restriction section 51 may be varied in the height direction 6 of the measuring flow path 2 in order to change the resistance against a flow.

In all the examples of the present invention, the measuring flow path 2 has a quadrangular cross-section. Alternatively, the measuring flow path 2 may have a generally quadrangular cross-section with slightly rounded corners, or a trapezoidal, circular or elliptical cross-section. In this example, the curved section 42 (and the like) is curved at a right angle. The curved section 42 does not need to be curved at a right angle, but may be curved at such an angle that provides the fluid with a centrifugal force. The curved section 42 may also be inclined with respect to the width direction of the measuring flow path 2.

Figure 18:
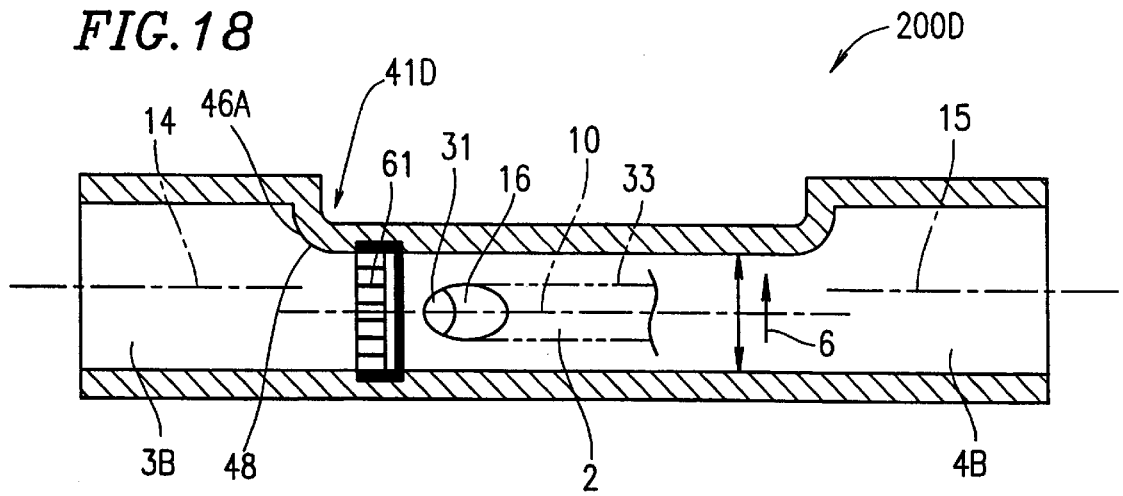
FIG. 18 is a longitudinal and vertical cross-sectional view of still another flow meter according to the second example.

FIG. 18 is a longitudinal and vertical cross-sectional view of still another flow meter 200D according to the second example of the present invention. Identical elements previously discussed with respect to the flow meter 200 in FIGS. 10 through 12 bear identical reference numerals and will not be described in detail. In the flow meter 200D, an inlet section 3B and an outlet section 4B are coaxially provided. A connection axis 14 is a central axis of the inlet section 3B, and a connection axis 15 is a central axis of the outlet section 4B. A measuring flow path axis 10, which is a central axis of the measuring flow path 2, is deviated from the connection axes 14 and 15 in the height direction 6. Thus, a deviating wall 48 is provided at an end 46A of the measuring flow path 2 at the entrance thereof. The deviating wall 48 acts as an asymmetric flow promotion section 41D. The deviating wall 48 has a curved portion smoothly rounding in the height direction 6. In the example shown in FIG. 18, the inlet section 3B and the outlet section 4B are provided so that the connection axes 14 and 15 thereof match each other. The connection axes 14 and 15 may be provided parallel to each other, instead of coaxially. In this case also, the deviating wall 48 can be similarly formed. Another deviating wall (not shown) having a different size from that of the deviating wall 48 may be provided at the other end of the measuring flow path 2 at the entrance thereof.

Next, the operation of the ultrasonic flow meter 200D will be described. A portion of a fluid as a measuring target flowing in from the inlet section 3B collides against the deviating wall 48 formed at the entrance of the measuring flow path 2 and flows into the measuring flow path 2. At the other end, the fluid flows into the measuring flow path 2 without colliding against any wall. Therefore, the flow speed distribution in the height direction 6 of the measuring flow path 2 is asymmetric with respect to the measuring flow path axis 10, which is the central axis of the measuring flow path 2.

In a low flow rate area, a flow speed which is lower than the speed of the maximum flow speed generation position is measured so as to increase the correction coefficient K. In a high flow rate area in which the flow speed distribution is relatively flat in the height direction 6, a flow speed which is not very different from the speed of the maximum flow speed generation position is measured. As a result, the correction coefficient K for this area is not very different from that of the conventional flow meter. Thus, the difference in the correction coefficient K between the low flow rate area and the high flow rate area is decreased, so as to reduce the change in the correction coefficient K with respect to the flow rate. Since the asymmetric flow promotion section is provided at the inlet section by deviating the measuring flow path, the shape of the measuring flow path can be simplified and the flow meter 200D can be compact, with the measuring flow path 2 and the inlet section 3B being provided close to each other. The simplified shape of the measuring flow path and the compact structure improves the processability and reduces the production costs.

The structure in which the inlet section and the outlet section are provided coaxially or parallel to each other further simplifies the shape of the measuring flow path and allows the inlet section 3B and the outlet section 4B to be provided close to each other.

Figure 19:
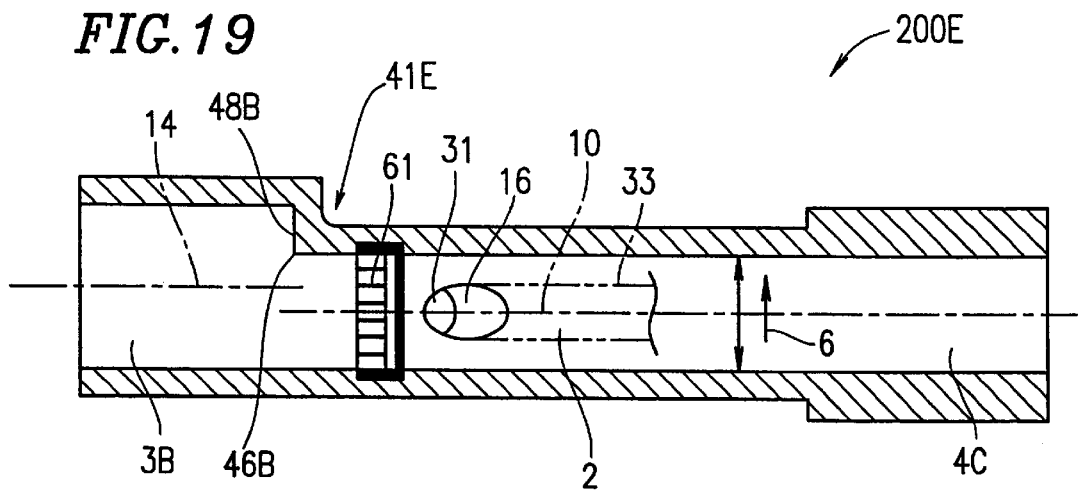
FIG. 19 is a longitudinal and vertical cross-sectional view of still another flow meter according to the second example.

FIG. 19 is a longitudinal and vertical cross-sectional view of still another flow meter 200E according to the second example of the present invention. In the flow meter 200E, the inlet section 3B and the measuring flow path 2 are provided so that the connection axis 14 as the central axis of the inlet section 3B, and the measuring flow path axis 10 as the central axis of the measuring flow path 2, are deviated with respect to each other. Thus, a deviating wall 48B is provided at an end of the measuring flow path 2 at the entrance thereof. The deviating wall 48B acts as an asymmetric flow promotion section 41E. An outlet section 4C is provided so that a central axis thereof is coaxial with the measuring flow path axis 10 of the measuring flow path 2. A fluid flowing into the measuring flow path 2 after colliding against the deviating wall 48B, which is stepped, is made more asymmetric in the height direction 6. As a result, the characteristic of the correction coefficient is further flattened. Since the measuring flow path 2 and the outlet section 4C are coaxial, the measuring flow path can be simplified in shape and reduced in size.

Figure 20:
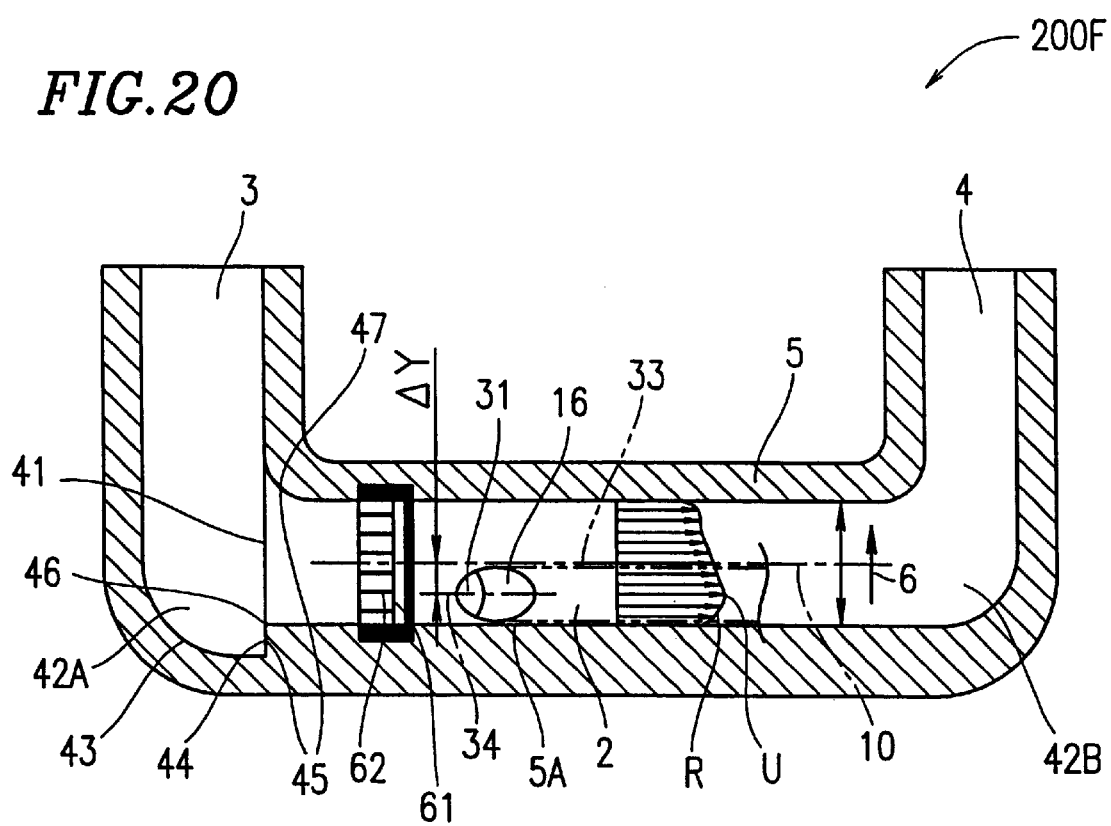
FIG. 20 is a longitudinal and vertical cross-sectional view of still another flow meter according to the second example.

FIG. 20 is a longitudinal and vertical cross-sectional view of still another flow meter 200F according to the second example of the present invention. Identical elements previously discussed with respect to the flow meter 200 in FIGS. 10 through 12 bear identical reference numerals and will not be described in detail. In the flow meter 200F, a transceiving axis 34 as a central axis of the transceiver 31 is deviated downward in the sheet of FIG. 20 by ΔY with respect to the measuring flow path axis 10 as the central axis of the measuring flow path 2.

The transceiving axis 34 of the transceiver 31 is deviated downward in the sheet of FIG. 20. A maximum flow speed generation position U is in a lower portion of the flow speed distribution R. The reason why the maximum flow speed generation position U is at such a position is because the flow is deviated toward the outer circumferential surface 43 due to the centrifugal function caused by the curved section 42A at the entrance of the measuring flow path 2. Even when the flow rate is high, the deviation is promoted and maintained by the step 44 provided in the vicinity of the outer circumferential surface 43 and the different-shape section 45.

Figure 21:
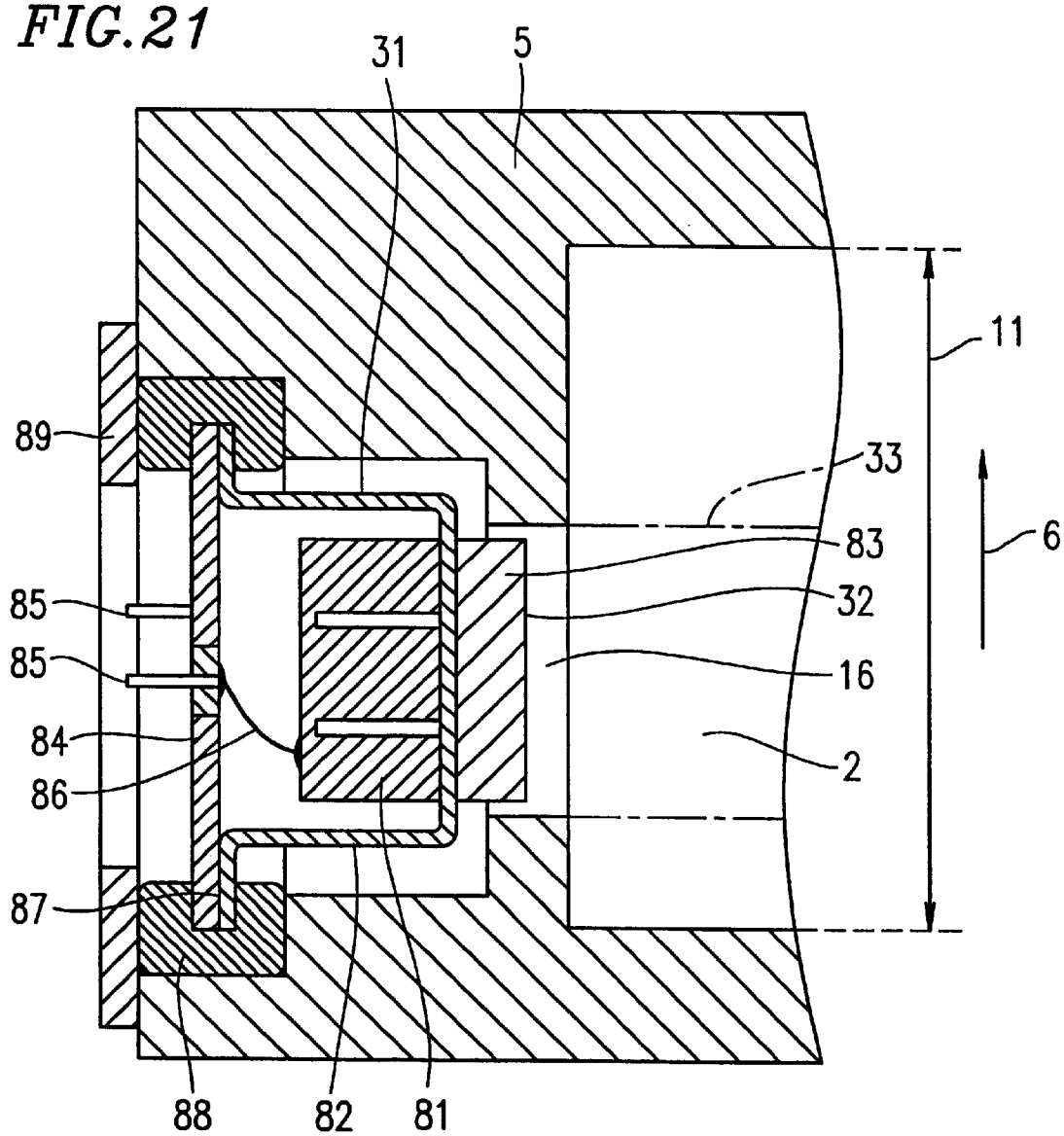
FIG. 21 is a longitudinal and vertical cross-sectional view illustrating a detailed structure of a transceiver of the flow meter shown in FIG. 20 according to the second example.

FIG. 21 is a longitudinal and vertical cross-sectional view illustrating a detailed structure of a transceiver 31 of the flow meter 200F shown in FIG. 20. In FIG. 21, reference numeral 82 represents an airtight case for accommodating a piezoelectric body 81 provided therein, reference numeral 83 represents an acoustic alignment layer fixed on an outer wall of the case 82, reference numeral 84 represents a sealing body joined to the case 82, reference numeral 85 represents a terminal provided on the sealing body 84, reference numeral 86 represents a lead for connecting the piezoelectric body 81 and the terminal 85, reference numeral 88 represents a vibration transfer restriction body for holding a support 87 and attaching the support 87 to the flow path wall 5 in an airtight manner so as to prevent vibration, and reference numeral 89 represents a fixing body for pressing the vibration transfer restriction body 88 so that the vibration transfer restriction body 88 does not come off from the flow path wall 5. The ultrasonic transceiver 31 is deviated in the height direction 6 of the measuring flow path 2. The transceiving surface 32 provided on the acoustic alignment layer 83 for releasing ultrasonic waves to the fluid as a measuring target has a smaller size than a size 11 in the height direction 6 of the measuring flow path 2. The ultrasonic transceiver 31 provided on the downstream side has substantially the same structure and will not be described.

The operation of the flow meter 200F will be described. The ultrasonic transceiver 31 is deviated from the center of the measuring flow path 2 in the height direction 6. Therefore, in a low flow rate area (layer flow area) having a convex-shaped flow speed distribution, the height direction center of the ultrasonic wave propagation path 33 becomes farther from the maximum flow speed generation position. Thus, the correction coefficient K is increased. Utilizing this, the position of the ultrasonic transceiver 31 can be appropriately deviated in the height direction 6 so that the correction coefficient K has a value close to the value in a disturbed high flow rate area. In this manner, the correction coefficient K is allowed to remain substantially unchanged with respect to the flow rate even in a low flow rate area. In this example, the ultrasonic transceiver 31 is deviated toward the maximum flow speed generation position in the height direction 6. Therefore, in the area having a convex-shaped flow speed distribution and in a transition area, the change in the flow speed between the maximum flow speed generation position and the flow path wall can be steeper. In this case, by only slightly adjusting the position of the ultrasonic transceiver 31 in the height direction 6, the value of the correction coefficient K can be easily changed. As a result, the correction coefficient K is allowed to remain substantially unchanged with respect to the flow rate even in a low flow rate area. In a high flow rate area, a high flow speed is measured so that the value of the correction coefficient K is reduced. Thus, the difference in the correction coefficient K between the high flow rate area and the low flow rate area is decreased so as to flatten the characteristic of the correction coefficient K. As a result, the correction coefficient K is allowed to remain substantially unchanged over a wide flow rate range.

The ultrasonic transceiver 31 is deviated from the center of the measuring flow path 2 in the height direction 6 toward the outer circumferential surface 43. Due to such a structure, the deviation of the flow toward the outer circumferential surface 43 of the curved section 42 is more highly promoted as the flow rate increases due to the function of the centrifugal force of the curved section 42. Thus, the ratio of a high flow speed area in the ultrasonic wave propagation path 33 (deviated in the height direction 6) can be increased, resulting in a reduction of the correction coefficient in a high flow rate area. The value of the correction coefficient K can be reduced at a higher flow rate, which further flattens the characteristic of the correction coefficient K over a wider flow rate range to be measured. The transceiving surface 32 of the transceiver 31 has a smaller size than the size 11 in the height direction 6. Therefore, the transceiver 31 can be provided with respect to the measuring flow path 2 so that the transceiving surface 32 is not hidden by the flow path wall 5 even when the transceiver 31 is slightly deviated. Thus, the ultrasonic waves can be effectively released to the ultrasonic wave propagation path 33. The reduction in the ultrasonic wave sending and receiving sensitivity is prevented. Ultrasonic waves having a higher S/N ratio can be sent and received, which improves the measuring precision of the flow rate. In addition, the ultrasonic wave sending and receiving sensitivity of the transceiver 31 is prevented from being reduced in a wider range of positions to which the transceiver 31 is deviated. This enlarges the freedom of deviation. Therefore, an ultrasonic wave can be propagated to an equal flow speed area in the measuring flow path for measuring the flow rate, so that the characteristic of the correction coefficient K is further flattened.

As described above, the ultrasonic transceiver is deviated from the center of the measuring flow path in the height direction. The ultrasonic transceiver can be deviated to an optimum position in the height direction so that the value of the correction coefficient in a low flow speed area (layer flow area) is close to the value in the disturbed high flow speed area. Thus, the correction coefficient is allowed to remain substantially unchanged even in a low flow speed area.

The ultrasonic transceiver is deviated toward the maximum flow speed generation position in the flow speed distribution. Since the flow speed between the maximum flow speed generation position and the flow path wall changes rapidly, the correction coefficient can be easily adjusted by slightly changing the position of the ultrasonic transceiver in the height direction. This allows the correction coefficient to remain substantially unchanged even in a low flow rate area. In a disturbed high flow rate area, a high flow speed is measured. Therefore, the value of the correction coefficient can be decreased. The difference in the correction coefficient between a high flow rate area and a low flow rate area is decreased. Thus, the characteristic of the correction coefficient is further flattened over a wider flow rate range.

The transceiver is deviated toward the outer circumferential surface of a curved section from the center of the measuring flow path. By the function of the centrifugal force of the curved section, the deviation toward the outer circumferential surface of the curved section is more highly promoted as the flow rate is higher. Thus, the correction coefficient can be reduced in a high flow rate area. The difference in the correction coefficient between a low flow rate area and a high flow rate area is decreased, so that the characteristic of the correction coefficient is further flattened over a wider flow rate range to be measured.

The transceiving surface of the ultrasonic transceiver has a smaller size than the size of the measuring flow path in the height direction. Even when the ultrasonic transceiver is slightly deviated in the height direction of the measuring flow path, ultrasonic waves can be effectively released to the ultra sonic wave propagation path. The reduction in the ultrasonic wave sending and receiving sensitivity of the ultrasonic transceiver is prevented. Ultrasonic waves having a higher S/N ratio can be sent and received, which improves the measuring precision of the flow rate. In addition, the freedom of deviation is enhanced. An ultrasonic wave can be propagated to an equal flow speed area of the measuring flow path for measuring the flow rate, so that the characteristic of the correction coefficient K is further flattened.

EXAMPLE 3

Figure 22:
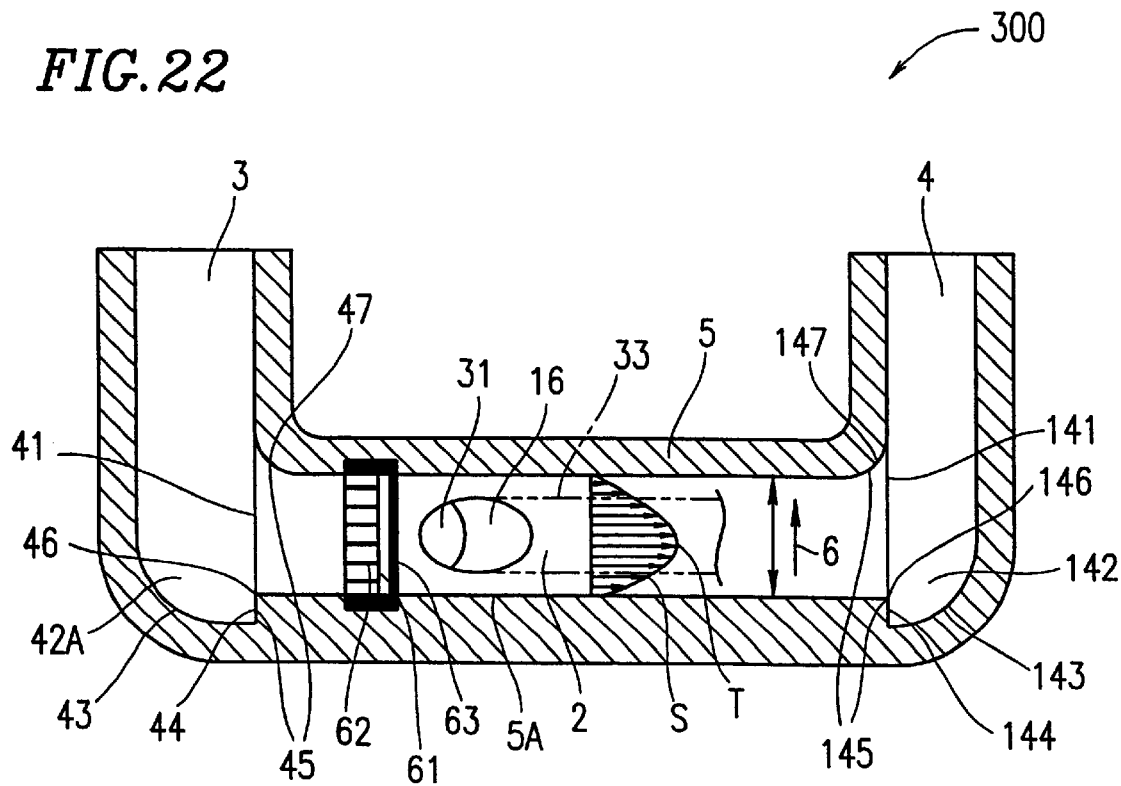
FIG. 22 is a longitudinal and vertical cross-sectional view of a flow meter according to a third example of the present invention.
Figure 23:
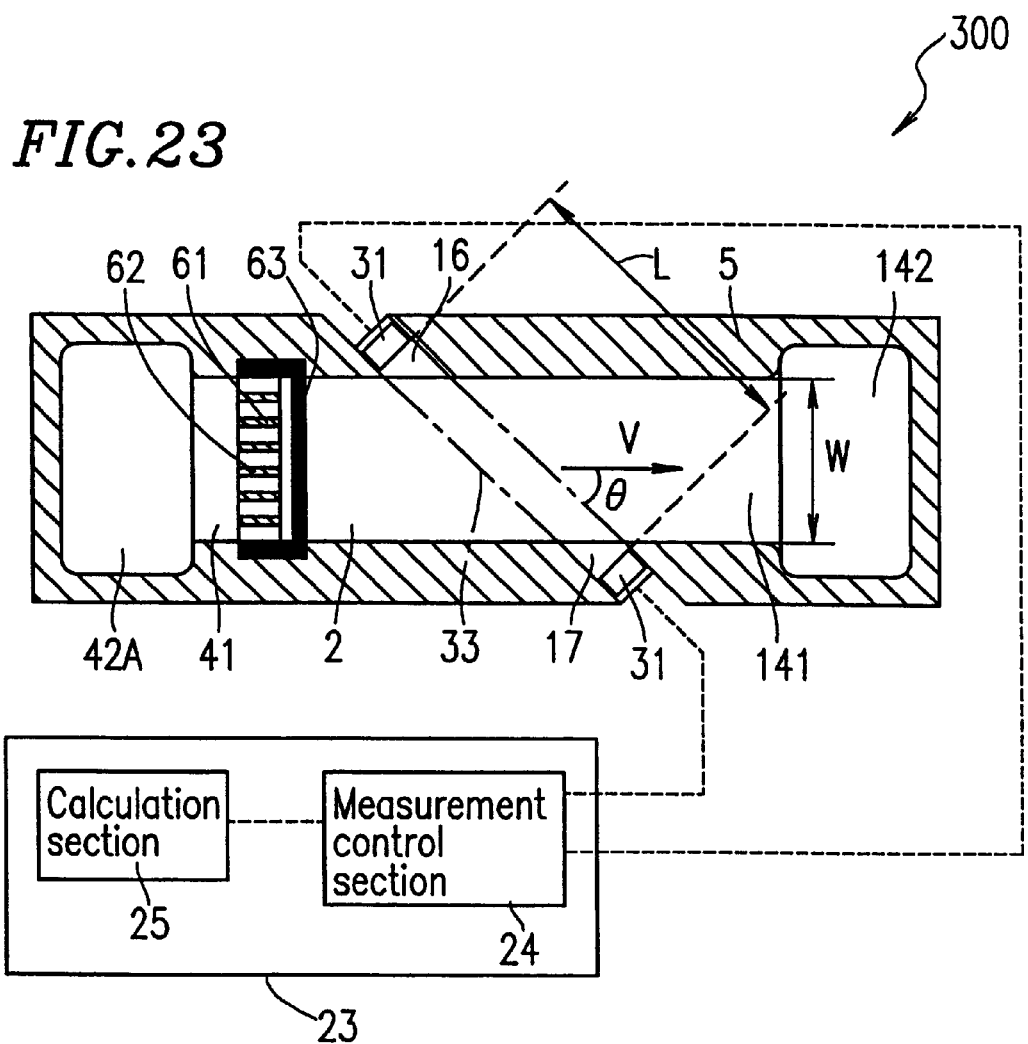
FIG. 23 is a longitudinal and horizontal cross-sectional view of the flow meter according to the third example.
Figure 24:
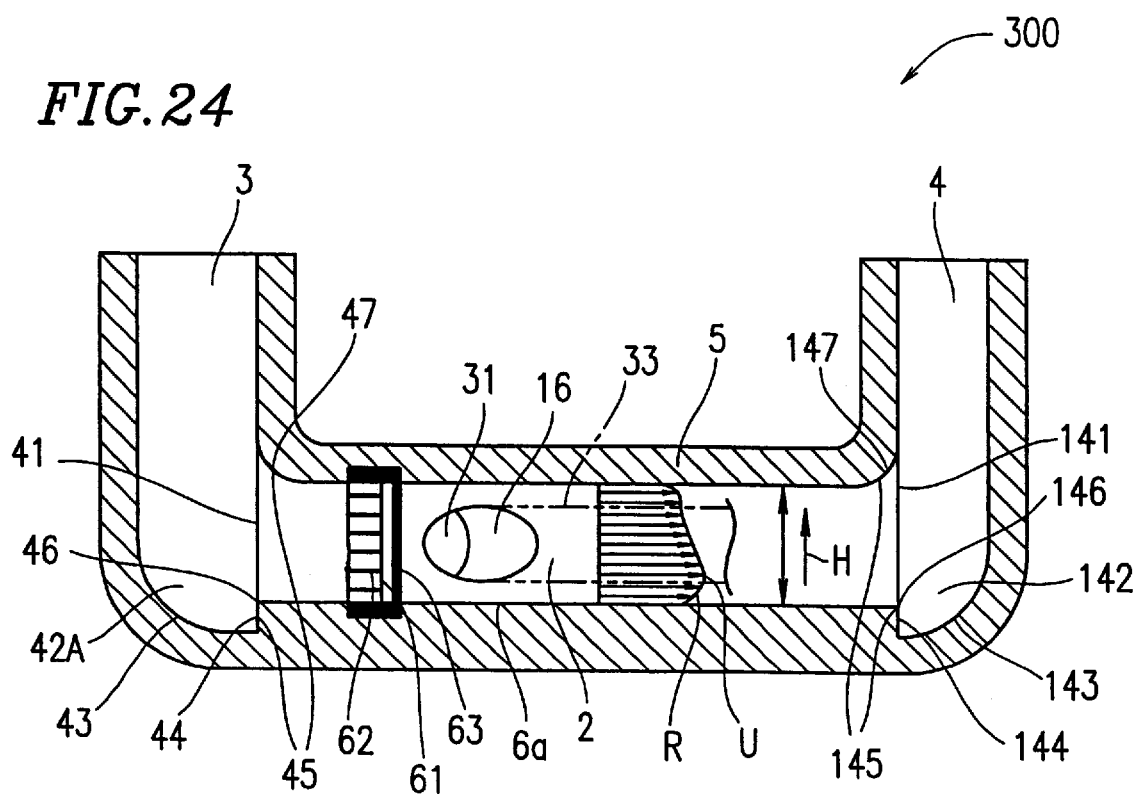
FIG. 24 is a longitudinal and vertical cross-sectional view of the flow meter according to the third example, illustrating a flow speed distribution when the flow rate is high.

In a third example of the present invention, a flow meter including an asymmetric flow promotion section downstream with respect to the measuring flow path in addition to upstream with respect to the measuring flow will be described. FIG. 22 is a longitudinal and vertical cross-sectional view of a flow meter 300 according to the third example of the present invention. FIG. 23 is a longitudinal and horizontal cross-sectional view of a flow meter 300. FIG. 24 is a longitudinal and vertical cross-sectional view of the flow meter 300, illustrating a flow speed distribution when the flow rate is high. Identical elements previously discussed with respect to the flow meter 200 in FIGS. 10 through 12 bear identical reference numerals and will not be described in detail.

The flow meter 300 includes an asymmetric flow promotion section 141 downstream with respect to the measuring flow path 2 in addition to upstream with respect to the measuring flow path 2. Like the asymmetric flow promotion section 41 provided upstream, the asymmetric flow promotion section 141 includes a curved section 142, a step 144, and a different-shape section 145 including ends 146 and 147 having different shapes from each other. The step 44 is provided in the vicinity of the outer circumferential surface 43 upstream with respect to the measuring flow path 2, and the step 144 is provided in the vicinity of an outer circumferential surface 143 downstream with respect to the measuring flow path 2. The end 46 of the different-shape section 45 and the end 146 of the different-shape section 145 are stepped with no curve. The end 47 of the different-shape section 45 and the end 147 of the different-shape section 145 each have a curved portion smoothly rounding in the height direction 6.

Next, the operation of the ultrasonic flow meter 300 will be described. The operation of the ultra sonic flow meter 300 when a fluid flows in from the inlet section 3 and flows out of the outlet section 4 in a forward direction is identical with the operation of the flow meter 200 described above with reference to FIGS. 10 through 12 and will not be described in detail. When a fluid flows in from the outlet section 4 and flows out of the inlet section in a rearward direction, the flow meter 300 operates as follows. A fluid speed distribution in the height direction 6 of the measuring flow path 2 is made asymmetric by the asymmetric flow promotion section 141, rather than symmetric with respect to the center in the height direction 6. Like in the forward flow, the flow speed distribution has the maximum flow speed generation position, which is slightly deviated from the center in the height direction 6. Thus, the ultrasonic wave propagation path 33 moves.

The ultrasonic flow meter 300 includes the asymmetric flow promotion section 141 downstream as well as upstream with respect to the measuring flow path 2. Accordingly, the same effect as described above regarding the flow meter 200 in the second example (FIGS. 10 through 12) is provided in the forward flow obtained where the fluid flows from an upstream position to a downstream position with respect to the measuring flow path 2 and also in the rearward flow where the fluid flows from a downstream position to an upstream position with respect to the measuring flow path 2.

Especially in the case where the flow meter is connected to a reciprocating engine driven by town gas, LPG or the like through pipes, the flow direction is changed from forward to rearward and from rearward to forward in repetition in a short period of time by pressurizing pulsation of a fluid as a measuring target. In such a case, the measured flow rate is likely to have a large error, which is also likely to be magnified by the correction coefficient. The flow meter 300 in this example, even when a fluid flows rearward from a downstream position to an upstream position with respect to the measuring flow path 2, can flatten the correction coefficient K with respect to the flow rate in a transition area between a low flow rate area and a high flow rate area. Even when the flow rate measured in the transition area involved an error ΔQm, the measured flow rate is still highly precise. Such a flow meter provides a significant effect when used for measuring a flow rate of a fluid, the flow direction of which changes from forward to rearward and from rearward to forward repeatedly in a short period of time.

Figure 25:
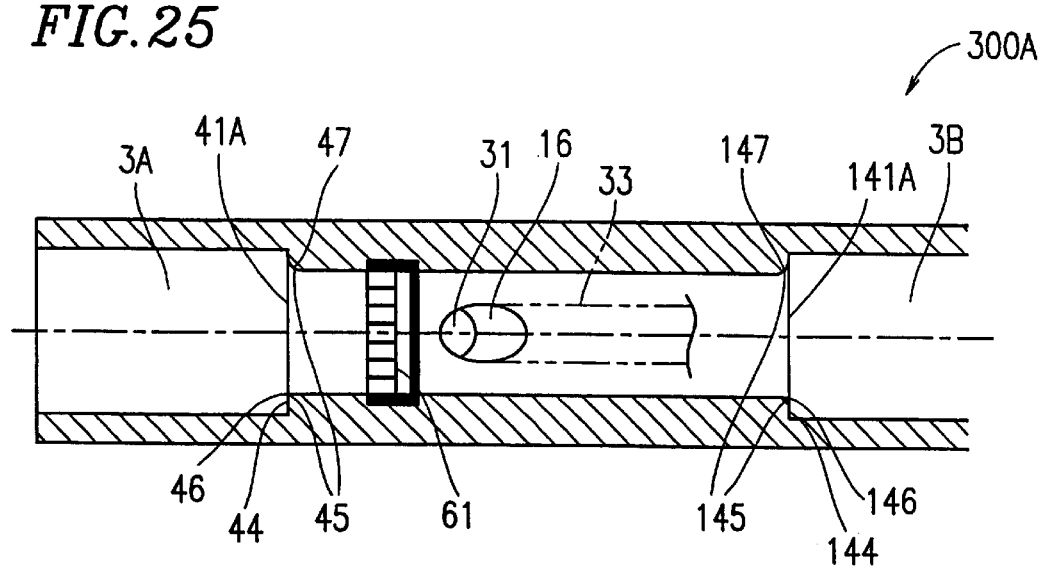
FIG. 25 is a longitudinal and vertical cross-sectional view of another flow meter according to the third example.

FIG. 25 is a longitudinal and vertical cross-sectional view of another flow meter 300A according to the third example of the present invention. Identical elements previously discussed with respect to the flow meter 200A in FIG. 15 bear identical reference numerals and will not be described in detail.

The flow meter 300A includes an asymmetric flow promotion section 141A downstream with respect to the measuring flow path 2. An inlet section 3A and an outlet section 3B are provided parallel to or coaxially with the measuring flow path 2. A step 44 is provided at the entrance of the measuring flow path 2, and a step 144 is provided at the exit of the measuring flow path 2. The steps 44 and 144 are both provided at an end of the measuring flow path 2 in the height direction 6. A different-shape section 45 includes ends 46 and 47 having different shapes from each other, and a different-shape section 145 includes ends 146 and 147 having different shapes from each other. An asymmetric flow promotion section 41A includes the step 44 and the different-shape section 45. An asymmetric flow promotion section 141A includes the step 144 and the different-shape section 145. Due to such a structure, the inlet section 3A at the entrance of the fluid as a measuring target and the outlet section 4A at the exit of the fluid can be connected to each other without using a large connection member. Thus, the flow meter 300A has a compact structure.

The different-shape section 45 at the entrance of the measuring flow path 2 includes the stepped end 46 and the smoothly curved end 47. The different-shape section 145 at the exit of the measuring flow path 2 includes the stepped end 146 and the smoothly curved end 147. Whether the flow is in a forward or rearward direction, the flow speed distribution is not made symmetric due to the different shapes of the ends. The steps shrink the flow so as to promote the deviation, in the height direction 6, of the maximum flow speed generation position of the measuring flow path 2. The smoothly curved portions improve the stability of the flow, whether the flow is in a forward or rearward direction. Thus, the measuring precision can be improved.

Figure 26:
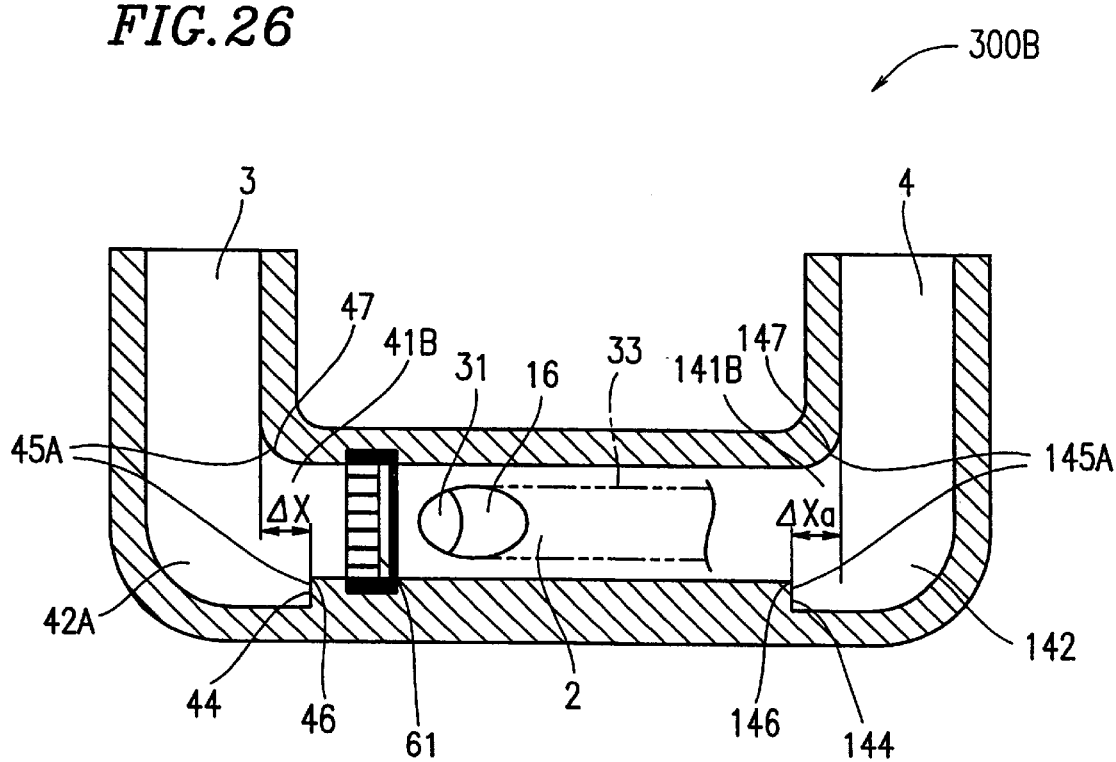
FIG. 26 is a longitudinal and vertical cross-sectional view of still another flow meter according to the third example.

FIG. 26 is a longitudinal and vertical cross-sectional view of still another flow meter 300B according to the third example of the present invention. Identical elements previously discussed with respect to the flow meter 200B in FIG. 16 bear identical reference numerals and will not be described in detail. A different-shape section 45A at the entrance of the measuring flow path 2 includes ends 46 and 47. The ends 46 and 47 are deviated from each other by a distance ΔX. A different-shape section 145A at the exit of the measuring flow path 2 includes ends 146 and 147. The ends 146 and 147 are deviated from each other by a distance ΔXa. Whether the flow is in a forward or rearward direction, the positions in the height direction 6 of the ends from which the fluid flows into the measuring flow path 2 are different. Thus, the deviation of the maximum flow speed generation position can be more highly promoted. Since the correction coefficient in a low flow rate area (layer flow area) is increased and the correction coefficient in a high flow rate area (disturbed flow area) is decreased, the characteristic of the correction coefficient can be flattened over a wide flow rate range. In the example shown in FIG. 26, the ends 46 and 146 are stepped and the ends 47 and 147 are curved. Alternatively, all the ends 46, 47, 146 and 147 may be stepped, or all the ends 46, 47, 146 and 147 may be curved.

Figure 27:
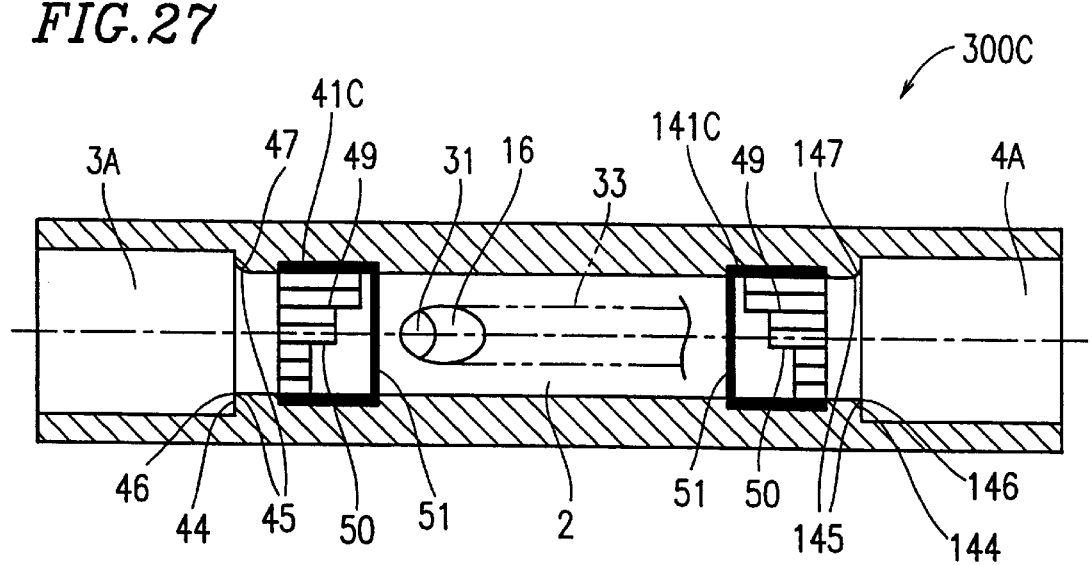
FIG. 27 is a longitudinal and vertical cross-sectional view of still another flow meter according to the third example.

FIG. 27 is a longitudinal and vertical cross-sectional view of still another flow meter 300C according to the third example of the present invention. Identical elements previously discussed with respect to the flow meter 200C in FIG. 17 bear identical reference numerals and will not be described in detail. In the flow meter 300C, an asymmetric flow promotion section 41C includes a rectifier 49 provided at the entrance of the measuring flow path 2. An asymmetric flow promotion section 141C also includes a rectifier 49 provided at the exit of the measuring flow path 2. The rectifiers 49 each include a direction regulation section 50 including a plurality of lattice portions divided in the cross-section of the measuring flow path 2, and a fluctuation restriction section 51. The plurality of lattice portions of the direction regulation section 50 have lengths (in the fluid flow direction) which vary as their positions in the height direction 6 vary. The fluctuation restriction section 51 is formed of a mesh or the like for reducing the flow speed fluctuation. Since the plurality of lattice portions of the direction regulation section 50 have different lengths in the height direction 6, the resistance against a flow is varied in the height direction 6 of the measuring flow path 2. By arbitrary varying the resistance against a flow in the height direction 6 of the measuring flow path 2, the flow speed distribution can be made optimally asymmetric and the characteristic of the correction coefficient K can be further flattened, whether the flow is in a forward or rear ward direction. In the example shown in FIG. 27, the asymmetric flow promotion sections 41C and 141C each include the rectifier 49. Alternatively, the rectifier 49 can be combined with the curved sections 42 and 142, the steps 44 and 144 and/or the different-shape sections 45 and 145. In such a case, the distribution can be more asymmetric in the height direction 6, and the characteristic of the correction coefficient K can be further flattened. Instead of varying the length of the direction regulation section 50, the size of the lattices may be varied in order to change the resistance against a flow. Alternatively, the size of the openings of the fluctuation restriction section 51 may be varied in the height direction 6 of the measuring flow path 2 in order to change the resistance against a flow.

Whether the flow is in a forward or rearward direction, the asymmetric flow promotion section deviates the maximum flow speed generation position in the same direction from the center of the measuring flow path in the height direction (downward as shown in FIGS. 22, 24 and 25 through 27). This provides the following advantages in the case of pulsation, in which the flow direction is changed from forward to rearward and from rearward to forward in repetition. When the flow direction changes, the flow speed is smoothly changed. More specifically, a vortex flow is prevented; or even when a vortex flow is generated, the strength of the vortex is reduced. Since the attenuation or reflection of ultrasonic waves by the vortex can be reduced, the ultrasonic waves can be sent and received with higher sensitivity. Since the flow speed is well balanced when the flow direction is changed, the flow in the ultra sonic wave propagation path is stabilized. Thus, the measuring precision is improved.

The curving direction of the curved sections 42A and 142A is the same in the inlet section 3 and the outlet section 4. By curving the inlet section 3 at the entrance of the measuring flow path 2 and the outlet section 4 at the exit of the measuring flow path 2, the flow meter can be reduced in width, resulting in the size reduction of the flow meter. By curving the inlet section 3 and the outlet section 4 in the same direction, the maximum flow speed generation position can be deviated in the same direction with respect to the center of the measuring flow path in the height direction. Accordingly, even when the flow direction is changed by the pulsation of the flow, the measuring precision is kept high. In addition, the portions of the flow meter to be connected to external pipes are provided close to each other, which allows the flow meter to be installed at a wide variety of sites.

The step 44 at the entrance and the step 144 at the exit are both below the center of the measuring flow path 2 in the height direction 6 (i.e., on the same side with respect to the center of the measuring flow path 2). The different-shape section 45 at the entrance and the different-shape section 145 at the exit both have a stepped lower end and a smoothly curved upper end. Alternatively, the different-shape sections 45 and 145 may both have a lower end which is deviated toward the ultrasonic wave propagation path 33 in the measuring flow path 2 with respect to an upper end. The stepped ends of the different-shape sections 45 (at the entrance) and 145 (at the exit) are provided on the same side with respect to the center of the measuring flow path 2 in the height direction 6. The smoothly curved ends of the different-shape sections 45 (at the entrance) and 145 (at the exit) are provided on the same side with respect to the center of the measuring flow path 2 in the height direction 6. Whether the inlet section 3 and the outlet section 4 are connected to the measuring flow path 2 via the curved sections 42A and 142, or the inlet section 3A and the outlet section 4A are provided parallel to or coaxially with the measuring flow path 2, the flow meter can be compact and can be installed at a wide variety of sites. Whether the flow is in a forward or rearward direction, the maximum flow speed generation position can be deviated in the same direction from the center of the measuring flow path 2 in the height direction 6. Thus, the measuring precision is improved.

In the third example, the measuring flow path 2 has a quadrangular cross-section. Alternatively, the measuring flow path 2 may have a generally quadrangular cross-section with slightly rounded corners, or a trapezoidal, circular or elliptical cross-section. In this example, the curved section is curved at a right angle. The curved section does not need to be curved at a right angle, but may be curved at such an angle that provides the fluid with a centrifugal force. The curved section may also be inclined with respect to the width direction of the measuring flow path.

Figure 28:
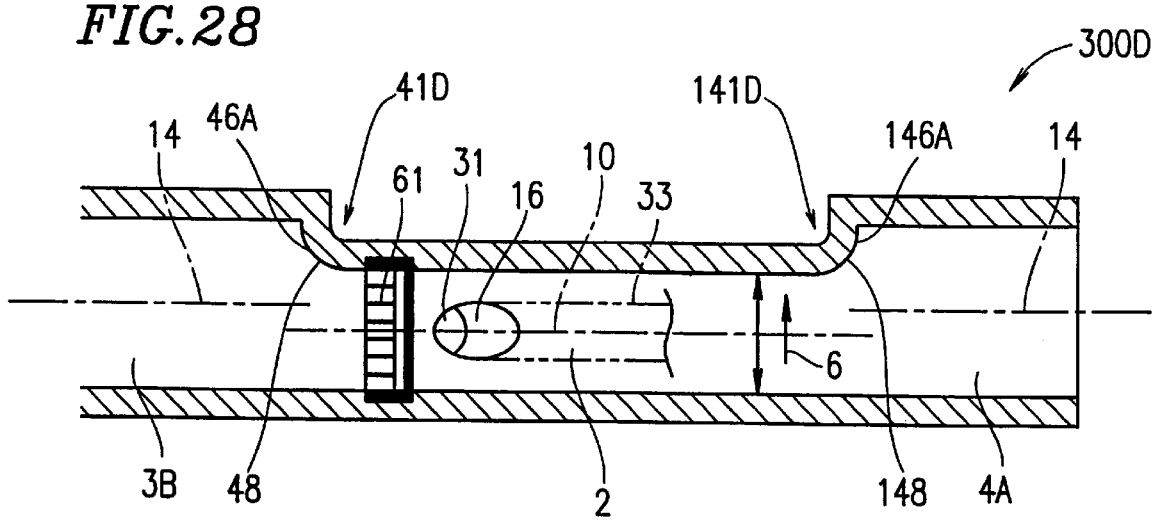
FIG. 28 is a longitudinal and vertical cross-sectional view of still another flow meter according to the third example.

FIG. 28 is a longitudinal and vertical cross-sectional view of still another flow meter 300D according to the third example of the present invention. Identical elements previously discussed with respect to the flow meter 200D in FIG. 18 bear identical reference numerals and will not be described in detail.

In the flow meter 300D, an inlet section 3B and an outlet section 4A are coaxially provided. A connection axis 14 is a central axis of the inlet section 3B, and another connection axis 14 is a central axis of the outlet section 4A. A measuring flow path axis 10, which is a central axis of the measuring flow path 2, is deviated from the connection axes 14 in the height direction 6. Thus, a deviating wall 48 is provided at an end 46A of the measuring flow path 2 at the entrance thereof. The deviating wall 48 acts as an asymmetric flow promotion section 41D. A deviating wall 148 is provided at an end 146A of the measuring flow path 2 at the exit thereof. The deviating wall 148 acts as an asymmetric flow promotion section 141D. The deviating walls 48 and 148 both have a curved portion smoothly rounding in the height direction 6. In the example shown in FIG. 28, the inlet section 3B and the outlet section 4A are provided so that the connection axes 14 thereof match each other. The connection axes 14 may be provided parallel to each other, instead of coaxially. In this case also, the deviating walls 48 and 148 can be similarly formed.

Next, the operation of the ultrasonic flow meter 300D will be described. A portion of a fluid as a measuring target flowing in from the inlet section 3B collides against the deviating wall 48 formed at the entrance of the measuring flow path 2 and flows into the measuring flow path 2. At the other end of the entrance, the fluid flows into the measuring flow path 2 without colliding against any wall. Therefore, the flow speed distribution in the height direction 6 of the measuring flow path 2 is asymmetric with respect to the measuring flow path axis 10, which is the central axis of the measuring flow path 2. A portion of a fluid as a measuring target flowing in from the outlet section 4A collides against the deviating wall 148 formed at the exit of the measuring flow path 2 and flows into the measuring flow path 2. At the other end of the exit, the fluid flows into the measuring flow path 2 without colliding against any wall. Therefore, the flow speed distribution in the height direction 6 of the measuring flow path 2 is asymmetric with respect to the measuring flow path axis 10, which is the central axis of the measuring flow path 2.

Whether the flow is in a forward or rearward direction, in a low flow rate area (layer flow area), a flow speed which is lower than the speed of the maximum flow speed generation position is measured so as to increase the correction coefficient K. In a high flow rate area (disturbed flow area) in which the flow speed distribution is relatively flat in the height direction 6, a flow speed which is not very different from the speed of the maximum flow speed generation position is measured. As a result, the correction coefficient K for this area is not very different from that of the conventional flow meter. Thus, the difference in the correction coefficient K between the low flow rate area and the high flow rate area is decreased, so as to reduce the change in the correction coefficient K with respect to the flow rate. Since the asymmetric flow promotion sections 41D and 141D are respectively provided at the inlet section 3B and the outlet section 4A by deviating the measuring flow path 2, the shape of the measuring flow path can be simplified and the flow meter 300D can be compact, with the measuring flow path 2, the inlet section 3B and the outlet section 4A being provided close to each other. The simplified shape of the measuring flow path and the compact structure improves the processability and reduces the production costs.

The structure in which the inlet section 3B and the outlet section 4A are provided coaxially or parallel to the measuring flow path further simplifies the shape of the measuring flow path and allows the inlet section 3B and the outlet section 4A to be provided close to each other. The flow meter 300D can be reduced both in production costs and size.

Figure 29:
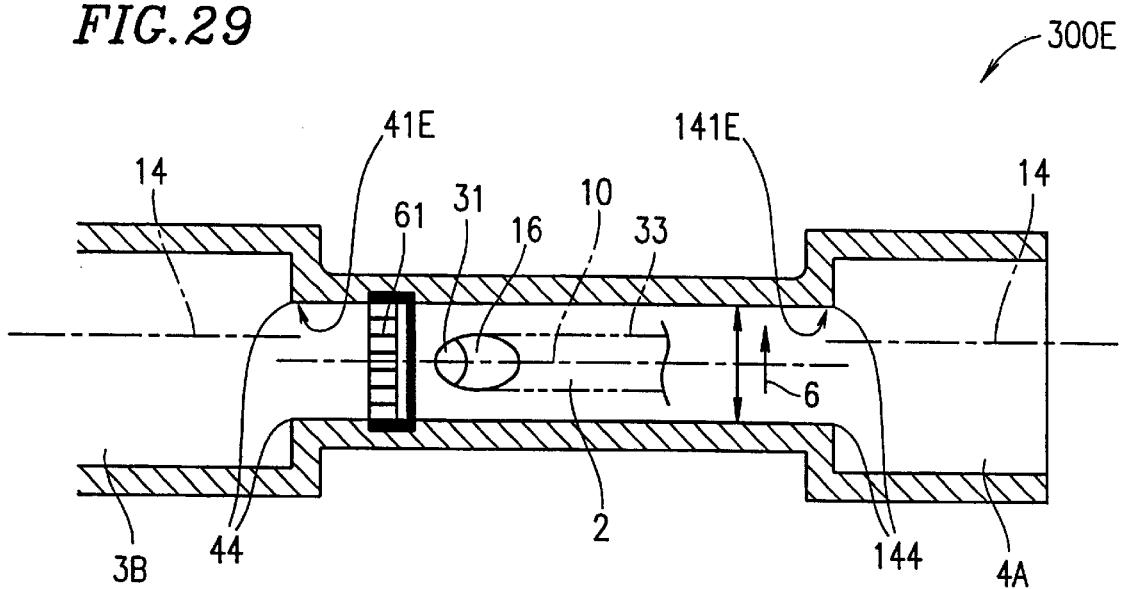
FIG. 29 is a longitudinal and vertical cross-sectional view of still another flow meter according to the third example.

FIG. 29 is a longitudinal and vertical cross-sectional view of still another flow meter 300E according to the third example of the present invention. Identical elements previously discussed with respect to the flow meter 200E in FIG. 19 bear identical reference numerals and will not be described in detail. In the flow meter 300E, the inlet section 3B and the outlet section 4A are provided so that the connection axes 14 thereof are coaxial to each other. The measuring flow path axis 10 as the central axis of the measuring flow path 2 is deviated with respect to the connection axes 14. Thus, steps 44 are provided at the entrance of the measuring flow path 2, at an upper end and a lower end in the height direction 6 of the measuring flow path 2. The steps 144 are provided at the exit of the measuring flow path 2, at an upper end and a lower end in the height direction 6 of the measuring flow path 2. Each step 44 is included in an asymmetric flow promotion section 41E, and each step 144 is included in an asymmetric flow promotion section 141E. Due to such a structure, whether the flow is in a forward or rearward direction, the flow flowing into the measuring flow path 2 after colliding against the step 44 or 144 is made asymmetric with respect to the center of the measuring flow path 2 in the height direction 6. The characteristic of the correction coefficient can hence be further flattened over a wider flow rate range. Since the central axes of the inlet section 3B and the outlet section 4A are coaxial, the measuring flow path is simplified in shape and reduced in size.

The inlet section 3B and the outlet section 4A do not need to be completely parallel to the measuring flow path 2 but may be substantially parallel. In the example of FIG. 29, the steps 44 and 144 are provided at both an upper end and a lower end of the measuring flow path 2. The steps 44 and 144 may be provided at either an upper end or a lower end of the measuring flow path 2.

Figure 30:
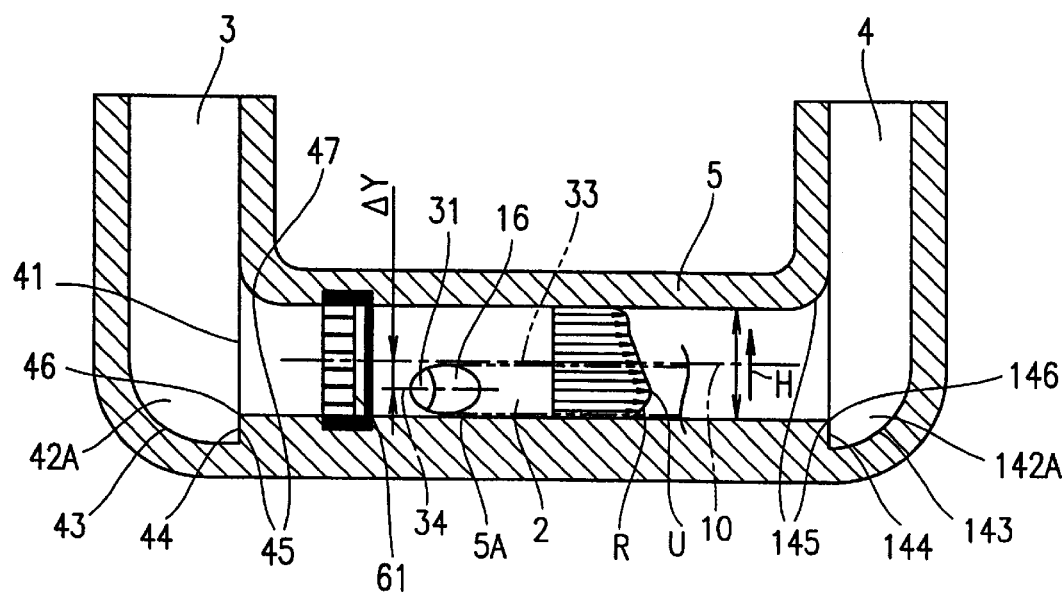
FIG. 30 is a longitudinal and vertical cross-sectional view of still another flow meter according to the third example.

FIG. 30 is a longitudinal and vertical cross-sectional view of still another flow meter 300F according to the third example of the present invention. Identical elements previously discussed with respect to the flow meter 200F in FIG. 20 bear identical reference numerals and will not be described in detail.

In the flow meter 300F, a transceiving axis 34 as a central axis of the transceiver 31 is deviated downward in the sheet of FIG. 30 by ΔY with respect to the measuring flow path axis 10 as the central axis of the measuring flow path 2.

The transceiving axis 34 of the transceiver 31 is deviated downward in the sheet of FIG. 30. A maximum flow speed generation position U is in a lower portion of the flow speed distribution R, for the following reasons. When the flow is in a forward direction, the flow is deviated toward the outer circumferential surface 43 due to the centrifugal function caused by the curved section 42A at the entrance of the measuring flow path 2. When the flow is rearward, the flow is deviated toward the outer circumferential surface 143 due to the centrifugal function caused by the curved section 142A at the exit of the measuring flow path 2. In addition, the steps 44 and 144 and the different-shape sections 45 and 145 promote the deviation of the flow, and allow the deviation to be maintained even when the flow rate is high.

EXAMPLE 4

Figure 31:
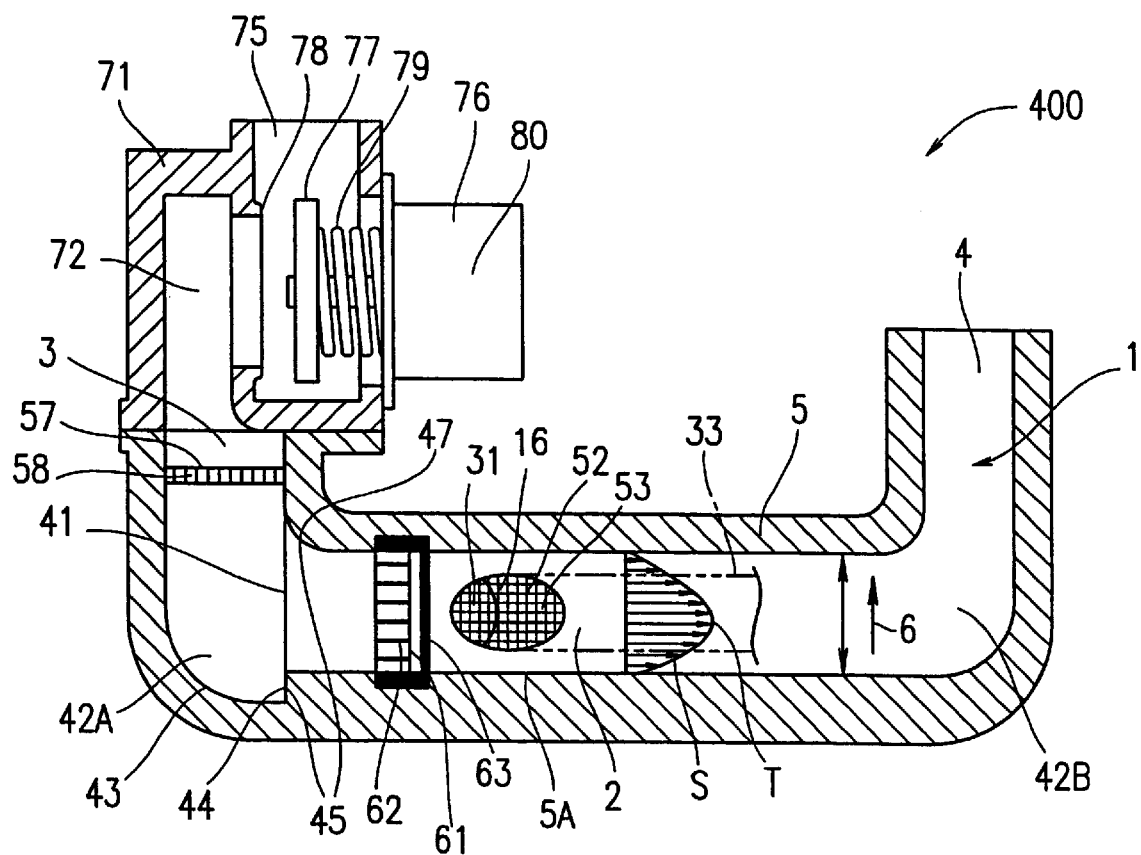
FIG. 31 is a longitudinal and vertical cross-sectional view of a flow meter according to a fourth example of the present invention.
Figure 32:
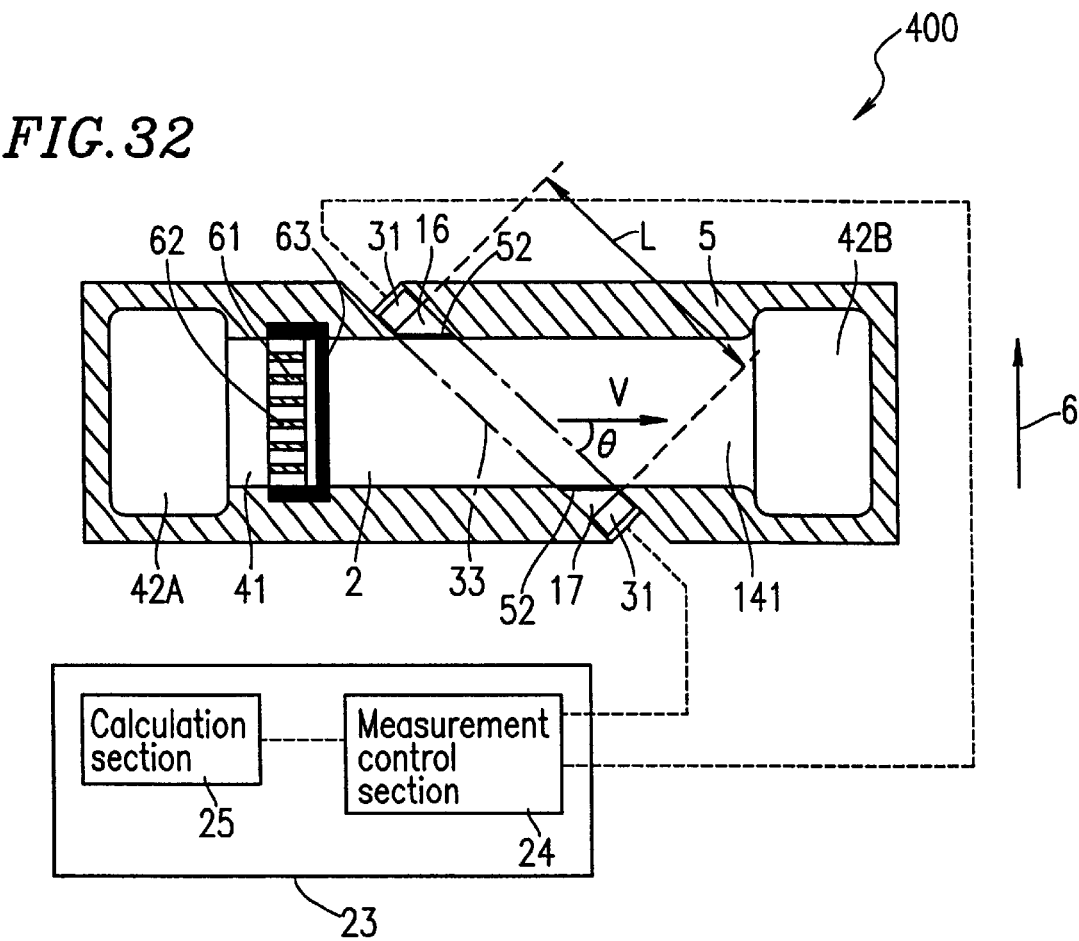
FIG. 32 is a longitudinal and horizontal cross-sectional view of the flow meter according to the fourth example.

FIG. 31 is a longitudinal and vertical cross-sectional view of a flow meter 400 according to a fourth example of the present invention. FIG. 32 is a longitudinal and horizontal cross-sectional view of a flow meter 400. Identical elements previously discussed with respect to the flow meter 200 in FIGS. 10 through 12 bear identical reference numerals and will not be described in detail.

The flow meter 400 includes an open-hole rectifier 52, which is provided in each of openings 16 and 17. The open-hole rectifier 52 is formed of a mesh, microporous plate, unwoven cloth or the like having fine ultrasonic openings 53 through which ultrasonic waves can pass. The open-hole rectifier 52 reduces the amount of a fluid as a measuring target flowing into the openings 16 and 17. In addition, the open-hole rectifiers 52 are provided on the same level as that of the flow path wall 5 so as not to project into the measuring flow path 2. Thus, the open-hole rectifiers 52 reduce the disturbance of the flow in the measuring flow path 2.

The flow meter 400 also includes a flow deviation restriction member 57 provided in the inlet section 3 connected to the measuring flow path 2 via the curved section 42A upstream with respect to the measuring flow path 2. The flow deviation restriction member 57 has a great number of fine passage openings 58. When there is a deviation in the fluid speed distribution of the fluid flowing into the inlet section 3, the flow deviation restriction member 57 uniformizes the fluid speed distribution before the fluid flows into the measuring flow path 2.

The flow meter 400 further includes a valve block 71 which is connected upstream with respect to the curved section 42A. The valve block 71 has a connection opening 72 which is opened toward the inlet section 3. The valve block 71 includes an open/close valve 76 having a valve body 77 provided so as to face a valve seat 78. The valve block 71 has a fluid inlet 75 through which a fluid as a measuring target flows in. The valve body 77 is biased toward the valve seat 78 by a spring 79. The flow meter 400 includes a driving section 80 such as a solenoid or a motor for opening or closing the valve body 77.

Figure 33:
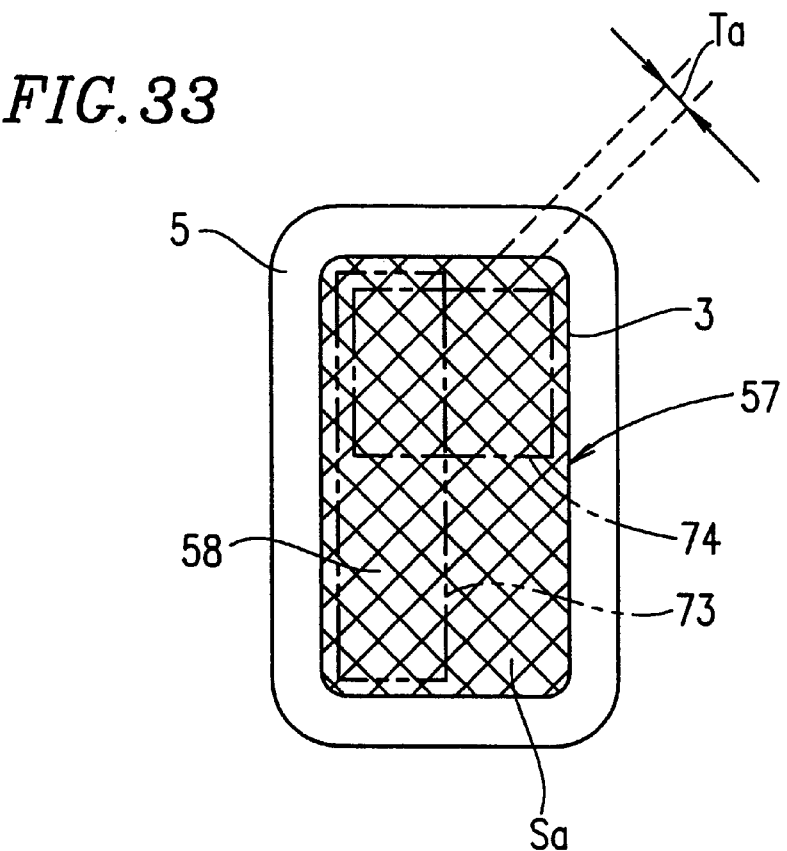
FIG. 33 is a plan view illustrating a flow deviation restriction member in the flow meter according to the fourth example.

FIG. 33 is a plan view of the flow deviation restriction member 57 included in the flow meter 400. The flow deviation restriction member 57 is provided from wall to wall of the inlet section 3 as shown in FIG. 31. Reference numeral 73 (two-dot chain line) represents the connection opening 72 in the case where the open/close valve 76 is provided horizontally as shown in FIG. 31 and the connection opening 72 is provided on the left of the sheet of FIG. 31. In this case, the connection opening 72 is at a first opening position 73. Reference numeral 74 (one-dot chain line) represents the connection opening 72 in the case where the open/close valve 76 is provided vertically with respect to the sheet of FIG. 31 and the connection opening 72 is provided on the rear side of the sheet. In this case, the connection opening 72 is at a second opening position 74. In order that the connection opening 72 is in the inlet section 3 either at the first opening position 73 and the second opening position 74, the inlet section 3 has a cross-section Sa which is larger than a cross-section Sb (see FIG. 34) of the measuring flow path 2 (i.e., Sa>Sb). The cross-section Sb of the measuring flow path 2 is of a quadrangular shape defined by a width 11 and a height 12. Thus, the cross-section across which the flow deviation restriction member 57 is installed is larger than the cross-section of the measuring flow path 2. Therefore, the pressure loss of the fluid caused by the flow deviation restriction member 57 is reduced. Even when the first opening position 73 and the second opening position 74 are deviated with respect to the inlet section 3 depending on various arrangements and structures of the valve block 71, the flow distribution can be uniformized by the fine passage openings 58 of the flow deviation restriction member 57 before the fluid flows into the measuring flow path 2. Thus, the flow speed distribution in the height direction 6 can be stably made asymmetric by the asymmetric flow promotion section 41. This reduces the disturbance of the flow between the two ultrasonic transceivers 31. As a result, the measuring precision is improved, and the upper limit of the measurable flow rate range is raised. Even when the shape of the paths or pipes, including the valve block 71, provided upstream with respect to the measuring flow path 2 varies, the measuring precision is guaranteed, which allows the flow meter 400 to be installed at a wide variety of sites.

Figure 34:
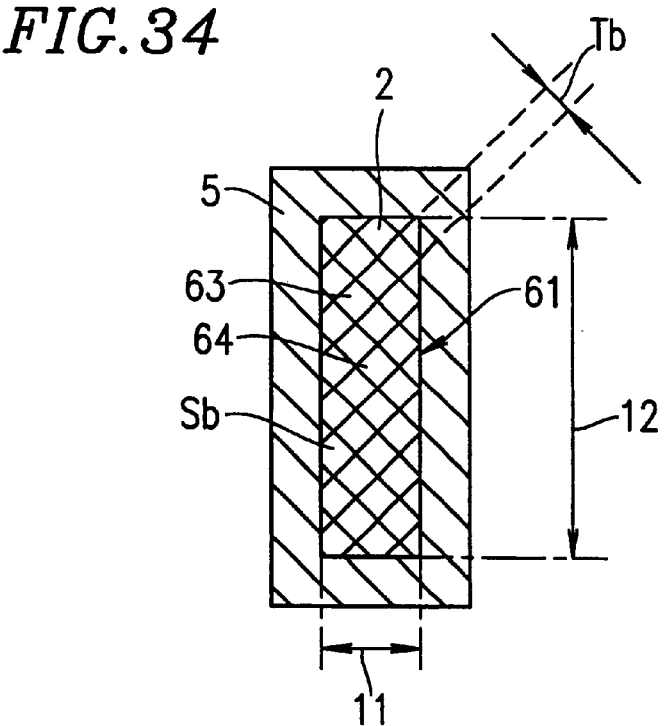
FIG. 34 is a cross-sectional view illustrating a fluctuation restriction section of a flow stabilizing member in the flow meter according to the fourth example.

FIG. 34 is a cross-sectional view of a fluctuation restriction section 63 of a flow stabilizing member 61 in the flow meter 400 according to the fourth example. The fine passage openings 58 of the flow deviation restriction member 57 each have a size Ta which is smaller than a size Tb of each of fine passage openings 64 of the fluctuation restriction section 63 (Ta<Tb). Therefore, the flow deviation restriction member 57 can more strongly uniformize the flow pulsation or flow speed distribution than the flow stabilizing member 61. By providing the flow deviation restriction member 57, the flow supplied to the measuring flow path 2 can be further stabilized.

Accordingly, even when it is unavoidable that the connection opening 72 be deviated with respect to the inlet section 3, the fluid flows into the measuring flow path 2 in a uniform state. Thus, the measuring precision is improved. Even when the fluid flowing into the inlet section 3 is pulsated, the pulsation of the fluid flowing into the measuring flow path 2 is alleviated. The measuring precision is improved even against pulsation. The fine passage openings 58 of the flow deviation restriction member 57 is smaller than the fine passage openings 64 of the fluctuation restriction section 63. Thus, invasion of foreign objects such as garbage or dust is reduced, so as to guarantee accurate measuring with higher reliability. The cross-section Sa of the flow deviation restriction member 57 is larger than the cross-section Sb of the measuring flow path 2. Thus, the pressure loss of the fluid can be reduced. Even when the foreign objects attach to the flow deviation restriction member 57, the reduction in the measuring characteristics can be avoided.

As described above, the flow meter 400 supplies a stable flow to the measuring flow path regardless of the shape of upstream paths or pipes. Therefore, the asymmetric flow speed distribution in the height direction can be stabilized. The disturbance of the flow between the two ultrasonic transceivers can be reduced. The measuring precision is improved, and the upper limit of the measurable flow rate range is raised. Regardless of the shape of the upstream paths or pipes, stable measuring is realized, which allow the flow meter 400 to be installed at a wide variety of sites.

Next, the operation of the flow meter 400 will be described. A fluid as a measuring target which flows in from the inlet section 3, after passing through the fluid inlet 75 and the valve seat 78 of the valve block 71, is made asymmetric, in terms of the flow speed distribution, by the asymmetric flow promotion section 41 provided at the entrance of the measuring flow path 2. In this state, the fluid flows into the ultrasonic wave propagation path 33.

By providing the open-hole rectifier 52, the strength of the vortex at the openings 16 and 17 can be reduced, and the disturbance of the flow in the measuring flow path caused by the openings 16 and 17 can be alleviated. Thus, the upper limit of the measurable flow rate range is raised.

Figure 35:
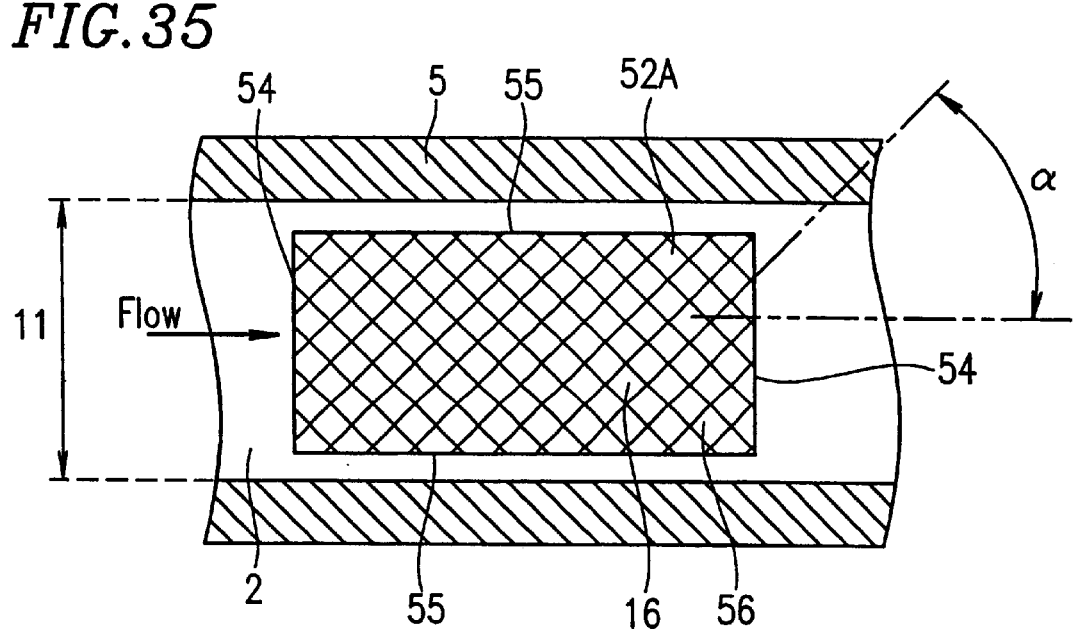
FIG. 35 is a partial cross-sectional view of an open-hole rectifier in the flow meter according to the fourth example.

FIG. 35 is a partial cross-sectional view of another open-hole rectifier 52A in a flow meter according to the fourth example of the present invention. The measuring flow path 2 has a cross-section having a width 12 and a height 11. The openings 16 and 17, which are quadrangular, each have a side 54 which is substantially perpendicular to the fluid flow direction (shown by the arrow in FIG. 35), and has another side 55 which is substantially parallel to the fluid flow direction. The measuring flow path 2 is provided so that the fluid flows substantially horizontally, and so that the wall having the openings 16 and 17 is substantially vertical. The open-hole rectifier 52 in the downstream opening 17 includes an inclining mesh 56 in which the openings are arranged to be inclined with respect to the horizontal direction at an angle α. The openings are arranged so as not to be parallel to the horizontal direction. The size of the openings of the open-hole rectifier 52 in the downstream opening 17 is smaller than the size of the openings of the open-hole rectifier 52 in the upstream opening 16. Thus, the fluid is restricted from flowing into the opening 17 which is opened at an acute angle with respect to the measuring flow path 2. The size of the openings of the open-hole rectifier 52 in the opening 16, which is opened at an obtuse angle with respect to the measuring flow path 2, is larger than the size of the openings of the open-hole rectifier 52 in the opening 17. Thus, the transmittance of the ultrasonic waves is increased. Therefore, the ultrasonic waves can be sent and received with higher sensitivity. The measuring precision is improved. The propagation loss of the ultrasonic wave is decreased, so as to reduce the driving input to the ultrasonic transceivers. Therefore, even a power supply having a limited capacitance such as batteries can realize long-term use, which improves the durability of the flow meter.

In the case where the fluid flows in the path containing fine powdery foreign objects such as dust, the dust or other fine powdery foreign objects are likely to attach to the open-hole rectifier 52. This occurs because the downstream opening 17 is opened at an acute angle with respect to the flow direction and therefore the fluid is likely to flow into the opening 17. However, in this example, the inclining mesh 56 of the open-hole rectifier 52 in the downstream opening 17 includes the opening which are arranged to be inclined with respect to the horizontal direction. Therefore, the fine powdery foreign objects attaching to the opening 17 are promoted to slide along the inclination and drop from the opening 17. This prevents the open-hole rectifier 52 from clogging with the fine powdery foreign objects accumulated. The ultrasonic waves pass through the open-hole rectifier 52 with certainty so as to provide stable measurement of the flow rate and flow speed.

As described above, the open-hole rectifiers 52 each include fine ultrasonic openings 53, and the size or shape of the ultrasonic openings 53 is different between the upstream open-hole rectifier 52 and the downstream open-hole rectifier 52. The fluid is further restricted from flowing into the openings 16 and 17. The ultrasonic waves can be sent and received with higher sensitivity, which improves the measuring precision. Durability and reliability of the flow meter against dust or the like can be improved.

The size of the open-hole rectifier in the upstream opening is larger than the size of the open-hole rectifier in the downstream opening. Due to such a structure, the propagation loss of the ultrasonic waves can be reduced, and thus the driving input to the ultrasonic transceivers can also be reduced. Even a power supply having a limited capacitance such as batteries can realize long-term use, which improves the durability of the flow meter.

Figure 36:
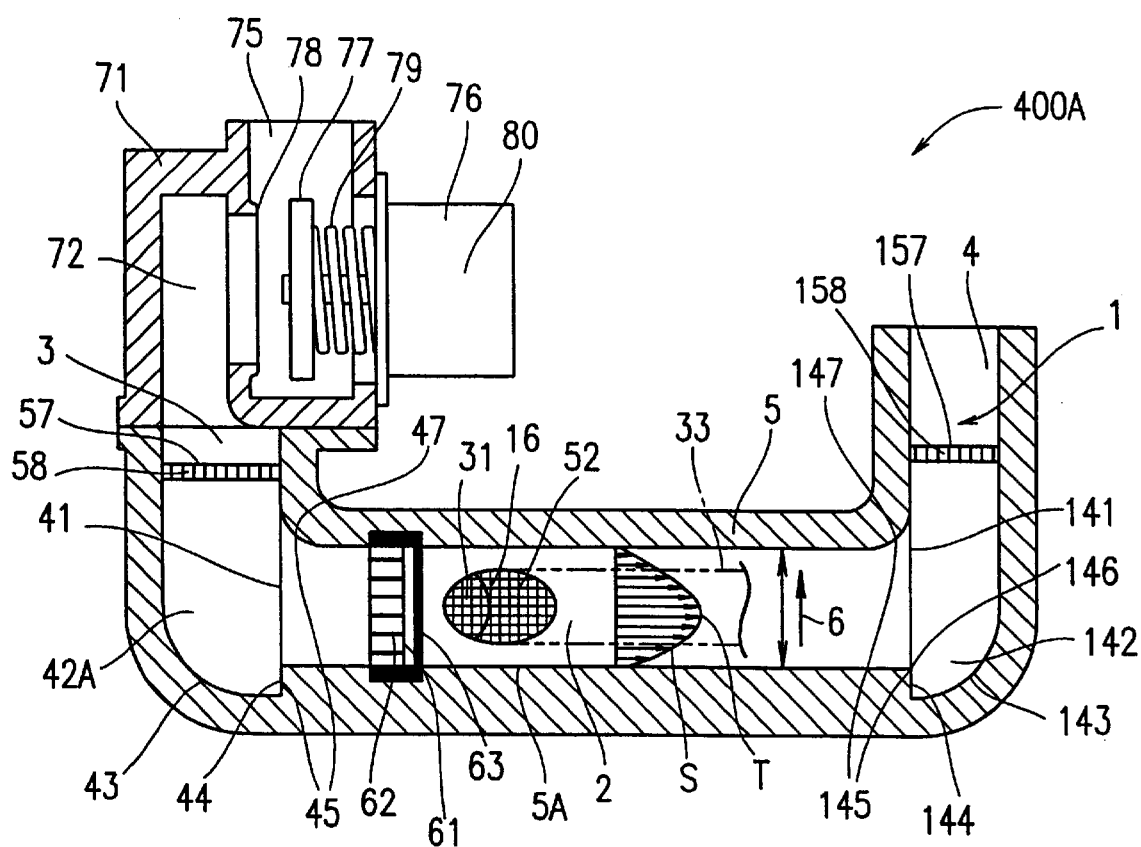
FIG. 36 is a longitudinal and vertical cross-sectional view of another flow meter according to the fourth example.

FIG. 36 is a longitudinal and vertical cross-sectional view of another flow meter 400A according to the fourth example of the present invention. Identical elements previously discussed with respect to the flow meter 300 in FIGS. 22 through 24 and the flow meter 400 in FIGS. 31 and 32 bear identical reference numerals and will not be described in detail.

The flow meter 400A includes a flow deviation restriction section member in the outlet section 4 as well as in the inlet section 3. Namely, the flow deviation restriction section members 57 and 157 each having fine passage openings 58 are respectively provided in the inlet section 3 and the outlet section 4. Therefore, whether the flow is in a forward or rearward direction, and regardless of the shape of the upstream or downstream paths or pipes, a stable flow can be supplied to the measuring flow path 2. Therefore, the fluid speed distribution can stably be made asymmetric in the height direction 6 by the asymmetric flow promotion sections 41 and 141. The disturbance of the flow between the two ultrasonic transceivers can be reduced. Even when the fluid is pulsated, the measuring precision is improved, and the upper limit of the measurable flow rate range can be raised. Regardless of the shape of the paths or pipes, stable measurement is realized, which allow the flow meter 400A to be installed at a wide variety of sites.

Figure 37:
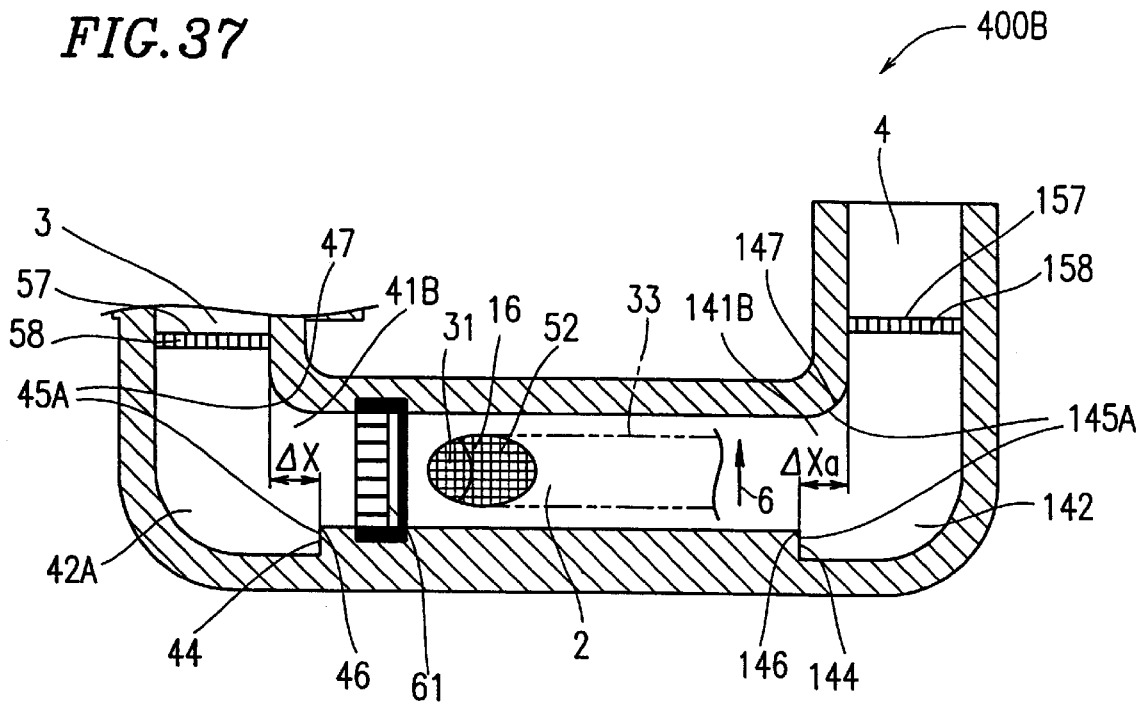
FIG. 37 is a longitudinal and vertical cross-sectional view of still another flow meter according to the fourth example.

FIG. 37 is a longitudinal and vertical cross-sectional view of another flow meter 400B according to the fourth example of the present invention. Identical elements previously discussed with respect to the flow meter 300B in FIG. 26 and the flow meter 400A in FIG. 36 bear identical reference numerals and will not be described in detail. A different-shape section 45A at the entrance of the measuring flow path 2 includes ends 46 and 47. The ends 46 and 47 are deviated from each other by a distance ΔX. A different-shape section 145A at the exit of the measuring flow path 2 includes ends 146 and 147. The ends 146 and 147 are deviated from each other by a distance ΔXa. Whether the flow is in a forward or rearward direction, the positions in the height direction 6 of the ends from which the fluid flows into the measuring flow path 2 are different. Therefore, the deviation of the maximum flow speed generation position can be more highly promoted. Since the correction coefficient in a low flow rate area (layer flow area) is increased and the correction coefficient in a high flow rate area (disturbed flow area) is decreased, the characteristic of the correction coefficient can be flattened over a wide flow rate range. In the example shown in FIG. 26, the ends 46 and 146 are stepped and the ends 47 and 147 are curved. Alternatively, all the ends 46, 47, 146 and 147 maybe stepped, or all the ends 46, 47, 146 and 147 may be curved.

By providing the flow stabilizing member 61 downstream with respect to the measuring flow path 2 as well as upstream with respect to the measuring flow path 2, the flow speed distribution in the height direction when the flow is rearward can be made asymmetric more stably. The characteristic of the correction coefficient can be further flattened when the flow is rearward.

Figure 38:
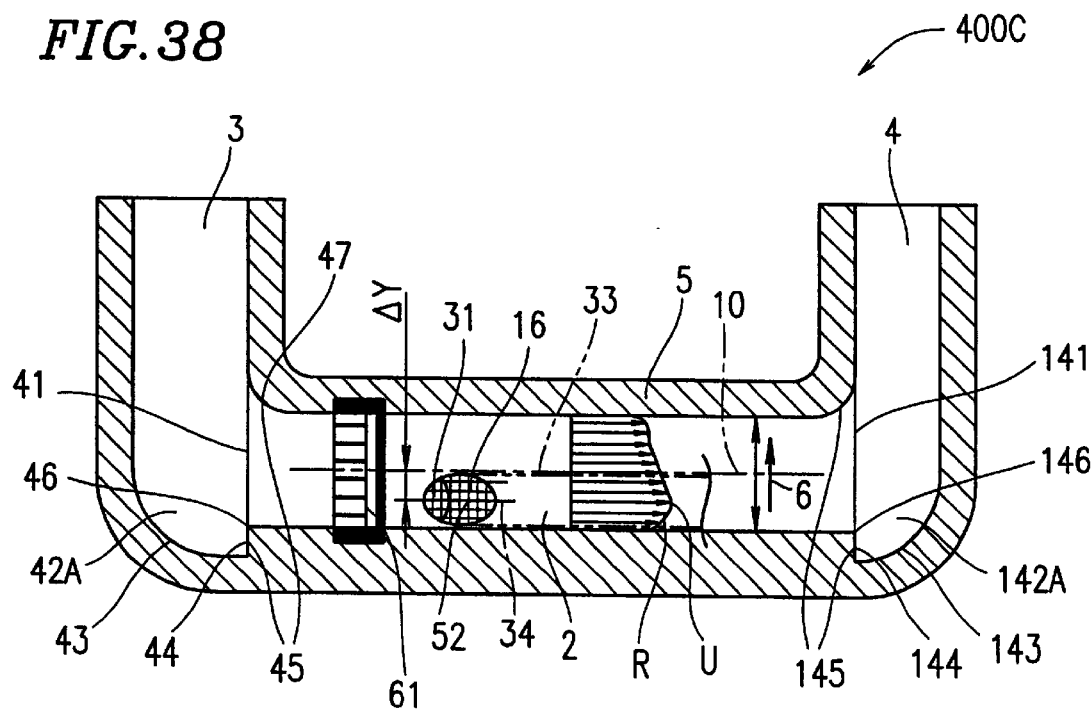
FIG. 38 is a longitudinal and vertical cross-sectional view of still another flow meter according to the fourth example.

FIG. 38 is a longitudinal and vertical cross-sectional view of another flow meter 400C according to the fourth example of the present invention. Identical elements previously discussed with respect to the flow meter in FIGS. 31 through 37 bear identical reference numerals and will not be described in detail.

In the flow meter 400C, a transceiving axis 34 as a central axis of the transceiver 31 is deviated downward as shown in FIG. 38 by ΔY with respect to the measuring flow path axis 10 as the central axis of the measuring flow path 2. A maximum flow speed generation position U is in a lower portion of the flow speed distribution R, for the following reasons. When the flow is in a forward direction, the flow is deviated toward the outer circumferential surface 43 due to the centrifugal function caused by the curved section 42A at the entrance of the measuring flow path 2. When the flow is rearward, the flow is deviated toward the outer circumferential surface 143 due to the centrifugal function caused by the curved section 142A at the exit of the measuring flow path 2. In addition, the steps 44 and 144 and the different-shape sections 45 and 145 promote the deviation of the flow, and allow the deviation to be maintained even when the flow rate is high.

Figure 39:
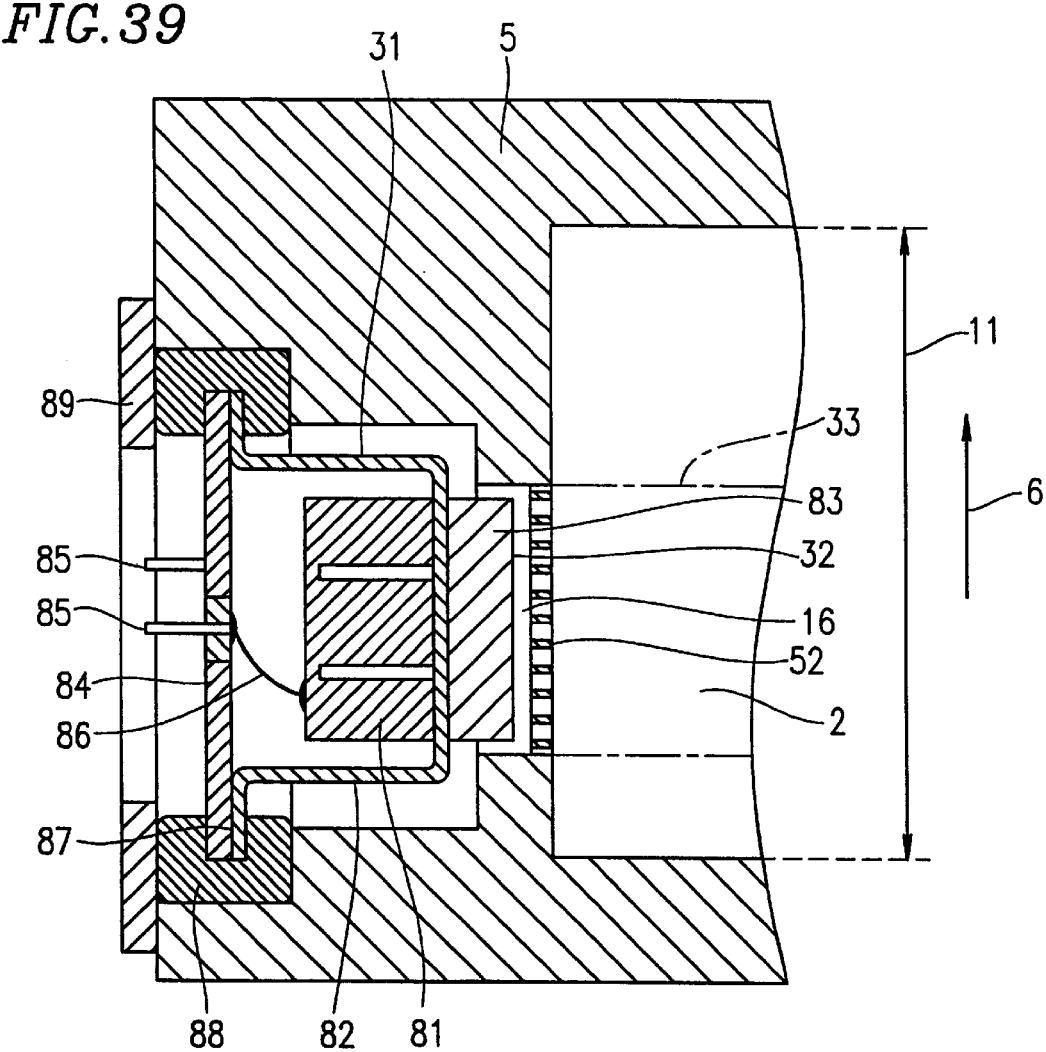
FIG. 39 is a longitudinal and vertical cross-sectional view illustrating a detailed structure of a transceiver of the flow meter shown in FIG. 38 according to the fourth example.
Figure 40:
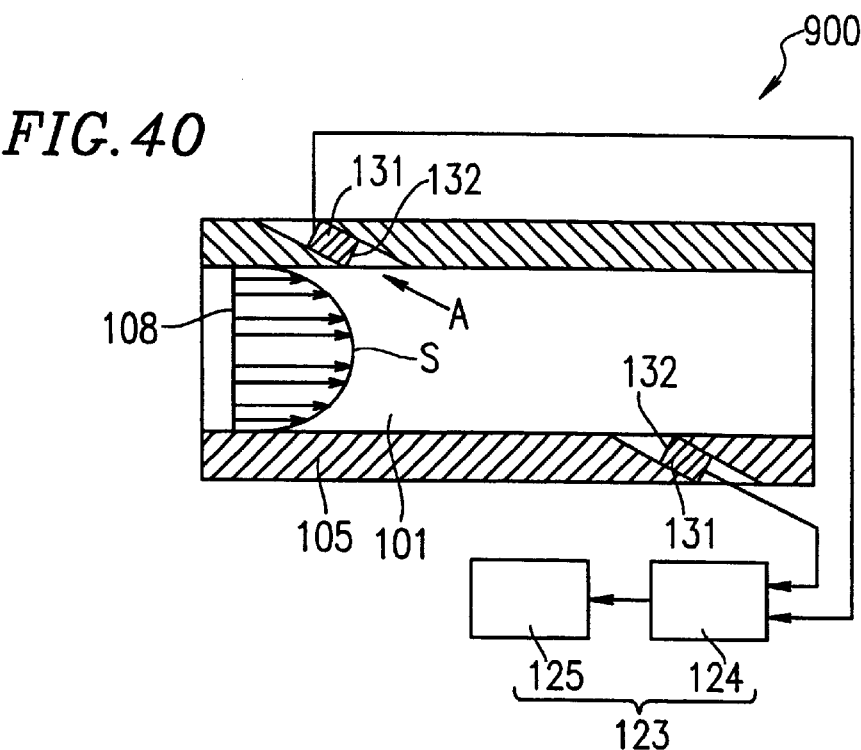
FIG. 40 is a longitudinal and vertical cross-sectional view of a conventional flow meter.
Figure 41:
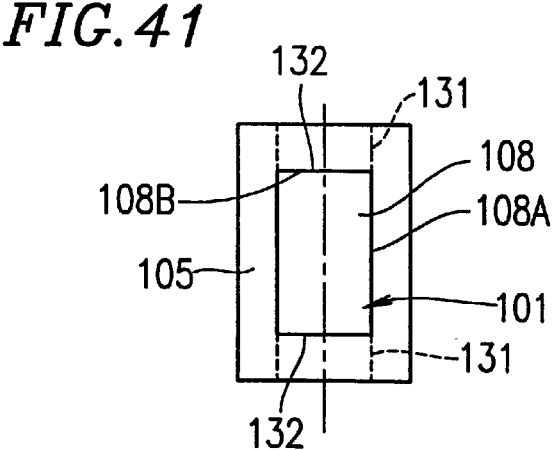
FIG. 41 is a height direction cross-sectional view of the conventional flow meter.
Figure 42:
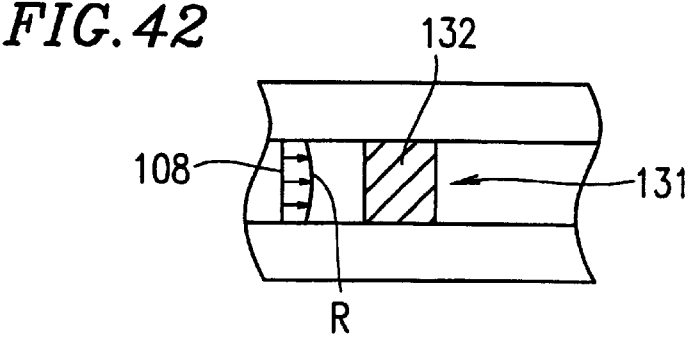
FIG. 42 is a cross-sectional view seen in the direction of arrow A in FIG. 40, illustrating a flow path structure when the flow rate is high.

FIG. 39 is a longitudinal and vertical cross-sectional view of a transceiver 31 of the flow meter 400C shown in FIG. 38. Identical elements previously discussed with respect to the flow meter 200F in FIGS. 20 and 21 bear identical reference numerals and will not be described in detail.

FIG. 39 shows the relationship between the height of the ultrasonic transceiver 31 and the measuring flow path 2. In FIG. 39, reference numeral 82 represents an airtight case for accommodating a piezoelectric body 81 provided therein, reference numeral 83 represents an acoustic alignment layer fixed on an outer wall of the case 82, reference numeral 84 represents a sealing body joined to the case 82, reference numeral 85 represents a terminal provided on the sealing body 84, reference numeral 86 represents a lead for connecting the piezoelectric body 81 and the terminal 85, reference numeral 88 represents a vibration transfer restriction body for holding a support 87 and attaching the support 87 to the flow path wall 5 in an airtight manner so as to prevent vibration, and reference numeral 89 represents a fixing body for pressing the vibration transfer restriction body 88 so that the vibration transfer restriction body 88 does not come off from the flow path wall 5. The ultrasonic transceiver 31 is deviated in the height direction 6 of the measuring flow path 2. The transceiving surface 32 provided on the acoustic alignment layer 83 for releasing ultrasonic waves to the fluid as a measuring target has a smaller size than a size 11 in the height direction 6 of the measuring flow path 2. The ultrasonic transceiver 31 provided on the downstream side has substantially the same structure and will not be described in detail.

The operation of the flow meter 400C when the flow is in a forward direction will be described. The ultrasonic transceiver 31 is deviated from the center of the measuring flow path 2 in the height direction 6. Therefore, in a low flow rate area (layer flow area) having a convex-shaped flow speed distribution, the height direction center of the ultrasonic wave propagation path 33 becomes farther from the maximum flow speed generation position. Thus, the correction coefficient K is increased. Utilizing this, the position of the ultrasonic transceiver 31 can be appropriately deviated in the height direction 6 so that the correction coefficient K has a value close to the value in a disturbed high flow rate area. In this manner, the correction coefficient K is allowed to remain substantially unchanged with respect to the flow rate even in a low flow rate area. In this example, the ultrasonic transceiver 31 is deviated toward the maximum flow speed generation position in the height direction 6. Therefore, in the area having a convex-shaped flow speed distribution and in a transition area, the change in the flow speed between the maximum flow speed generation position and the flow path wall can be steeper. In this case, by only slightly adjusting the position of the ultrasonic transceiver 31 in the height direction 6, the value of the correction coefficient K can be easily changed. As a result, the correction coefficient K is allowed to remain substantially unchanged with respect to the flow rate even in a low flow rate area.

In a high flow rate area, a high flow speed is measured so that the value of the correction coefficient K is reduced. Thus, the difference in the correction coefficient K between the high flow rate area and the low flow rate area is decreased to flatten the characteristic of the correction coefficient K. As a result, the correction coefficient K is allowed to remain substantially unchanged over a wide flow rate range.

The ultrasonic transceiver 31 is deviated from the center of the measuring flow path 2 in the height direction 6 toward the outer circumferential surface 43 of the curved section 42A (and toward the outer circumferential surface 143 of the curved section 143A). Due to such a structure, when the flow is in a forward direction, the deviation of the flow toward the outer circumferential surface 43 of the curved section 42A is more highly promoted as the flow rate increases due to the function of the centrifugal force of the curved section 42A. When the flow is rearward, the deviation of the flow toward the outer circumferential surface 143 of the curved section 142A is more highly promoted as the flow rate increases due to the function of the centrifugal force of the curved section 142A. Thus, whether the flow is in a forward or rearward direction, the ratio occupied by a high flow speed area in the ultrasonic wave propagation path 33 (deviated in the height direction 6) can be increased, resulting in a reduction of the correction coefficient in a high flow rate area. The value of the correction coefficient K can be reduced at a higher flow rate, which further flattens the characteristic of the correction coefficient K over a wider flow rate range to be measured. Since the correction coefficient is flattened due to the deviation of the ultrasonic transceivers 31 in the height direction 6, the error is prevented from being enlarged even at the time of pulsation in which the flow direction is changed from forward to rearward and from rearward to forward repeatedly in a short period of time. Thus, the measuring precision is further improved.

The transceiving surface 32 of the transceiver 31 has a smaller size than the size 11 in the height direction 6. Therefore, the transceiver 31 can be provided with respect to the measuring flow path 2 so that the transceiving surface 32 is not hidden by the flow path wall 5 even when the transceiver 31 is slightly deviated. Thus, the ultrasonic waves can be effectively released to the ultrasonic wave propagation path 33. The reduction in the ultrasonic wave sending and receiving sensitivity is prevented. Ultrasonic waves having a higher S/N ratio can be sent and received, which improves the measuring precision of the flow rate. In addition, the ultrasonic wave sending and receiving sensitivity of the transceiver 31 is prevented from being reduced over a wider range of positions to which the transceiver 31 is deviated. This enlarges the freedom of deviation. Therefore, an ultrasonic wave can be propagated to an equal flow speed area of the measuring flow path for measuring the flow rate, so that the characteristic of the correction coefficient K is further flattened.

As described above, the ultrasonic transceiver is deviated from the center of the measuring flow path in the height direction. The ultrasonic transceiver can be deviated to an optimum position in the height direction so that the value of the correction coefficient in a low flow speed area (layer flow area) is close to the value in the disturbed high flow speed area. Thus, the correction coefficient is allowed to remain substantially unchanged even in a low flow speed area. The measuring precision is further improved at the time of pulsation in which the flow direction is changed from forward to rearward and from rearward to forward repeatedly in a short period of time.

The ultrasonic transceiver is deviated, in the height direction, toward the maximum flow speed generation position in the flow speed distribution. Since the flow speed between the maximum flow speed generation position and the flow path wall changes rapidly, the correction coefficient can be easily adjusted by slightly changing the position of the ultrasonic transceiver in the height direction. This allows the correction coefficient to remain substantially unchanged even in a low flow rate area. In a disturbed high flow rate area, a high flow speed is measured. Therefore, the value of the correction coefficient can be reduced. The difference in the correction coefficient between a high flow rate area and a low flow rate area is reduced. Thus, the characteristic of the correction coefficient is further flattened over a wider flow rate range.

The transceiver is deviated toward the outer circumferential surface of a curved section from the center of the measuring flow path in the height direction. By the function of the centrifugal force of the curved section, the deviation toward the outer circumferential surface of the curved section is more highly promoted as the flow rate is higher. Thus, the correction coefficient can be reduced in a high flow rate area. The difference in the correction coefficient between a low flow rate area and a high flow rate area is reduced, so that the characteristic of the correction coefficient is further flattened over a wider flow rate range to be measured.

INDUSTRIAL APPLICABILITY

As described above, the present invention provides a flow meter for measuring a wide flow rate range with high precision.

The present invention provides a flow meter for reducing a change in the correction coefficient in a transition area between a high flow rate area and a low flow rate area.

What is claimed is:

1. A flow meter, comprising:
   a flow path through which a fluid flows;
   a pair of transceivers for sending and receiving an ultrasonic wave propagating across the flow path; and
   a flow calculation section for calculating a flow rate of the fluid flowing through the flow path based on a result of the ultrasonic wave being sent and received by the pair of transceivers, wherein:
   the flow path has an equal flow speed area in which the fluid flows at a substantially equal flow speed over an entire flow rate area ranging from a high flow rate area to a low flow rate area, and
   the pair of transceivers send and receive the ultrasonic wave so that the ultrasonic wave propagates in the equal flow speed area.

2. A flow meter according to claim 1, wherein:
   the equal flow speed area is provided at a position deviated from a center of the flow path in a height direction, and
   the pair of transceivers are each provided at a position deviated from the center of the flow path in the height direction so that the position of each of the pair of transceivers in the height direction substantially matches the position of the equal flow speed area in the height direction.

3. A flow meter according to claim 2, wherein:
   the flow path has a cross-section which has a quadrangular shape defined by two shorter sides extending in the height direction and two longer sides extending in a width direction, and
   the pair of transceivers are respectively provided on the two shorter sides.

4. A flow meter according to claim 3, wherein the pair of transceivers send and receive the ultrasonic wave propagating across the flow path in a direction of the two longer sides.

5. A flow meter according to claim 2, wherein the flow path has a cross-section which has a quadrangular shape defined by two shorter sides extending in the height direction and two longer sides extending in a width direction, the pair of transceivers each have a rectangular transceiving surface for sending and receiving the ultrasonic wave, and a deviation amount L1 of each of the transceivers from the center of the flow path in the height direction fulfills the relationship of:

$$(H-W) \times 0.3 \leq L1 \leq (H-W) \times 0.7,$$

and preferably fulfills the relationship of:

$$(H-W) \times 0.4 \leq L1 \leq (H-W) \times 0.6,$$

where H is a length of each of the two shorter sides of the cross-section extending in the height direction, and W is a length of the rectangular transceiving surface of each of the transceivers in the height direction.

6. A flow meter according to claim 2, wherein:
the flow path has a cross-section which has a quadrangular shape defined by two shorter sides extending in the height direction and two longer sides extending in a width direction, and
the ratio of a length of each of the two longer sides is 1.1 or more and 5 or less with respect to the length of each of the two shorter sides.

7. A flow meter according to claim 2, wherein:
the flow path has a cross-section which has a quadrangular shape defined by two shorter sides extending in the height direction and two longer sides extending in a width direction,
the pair of transceivers each have a rectangular transceiving surface for sending and receiving the ultrasonic wave, and
a length W of the transceiving surface of each of the transceivers and a length H of each of the two shorter sides of the flow path extending in the height direction fulfills the relationship of:

$$0.3 \times H \leq W \leq 0.7 \times H.$$

8. A flow meter according to claim 2, wherein:
the height direction of the flow path is a direction in which gravity acts, and
the pair of transceivers are deviated in a direction opposite to the direction in which the gravity acts.

9. A flow meter according to claim 1, further comprising an asymmetric flow promotion section for deviating the equal slow speed area in the height direction of the flow path, so that the position of each of the transceivers in the height direction of the flow path substantially matches the position of the equal flow speed area in the height direction.

10. A flow meter according to claim 9, wherein the flow path includes an inlet section upstream with respect to the pair of transceivers, and the asymmetric flow promotion section deviates a measuring flow path with respect to the inlet section.

11. A flow meter according to claim 9, wherein the asymmetric flow promotion section is provided upstream with respect to the pair of transceivers.

12. A flow meter according to claim 11, wherein:
the flow path includes an inlet section provided upstream with respect to the pair of transceivers and an outlet section provided downstream with respect to the pair of transceivers, and the inlet section and the outlet section are provided coaxially with or parallel to each other.

13. A flow meter according to claim 9, wherein the asymmetric flow promotion section includes a curved section provided upstream with respect to the pair of transceivers for curving the flow path so that the flow path rises in the height direction.

14. A flow meter according to claim 9, wherein the asymmetric flow promotion section includes a step provided on a wall portion of the flow path upstream with respect to the pair of transceivers.

15. A flow meter according to claim 9, wherein the asymmetric flow promotion section includes a different-shape section provided upstream with respect to the pair of transceivers, the different-shape section including an end provided on a wall portion of the flow path and another end provided on another wall portion of the flow path, the ends having different shapes from each other, and the wall portions facing each other across the height direction.

16. A flow meter according to claim 15, wherein one of the ends of the different-shape section is stepped, and the other end is smoothly curved.

17. A flow meter according to claim 15, wherein the ends are deviated from each other in a direction in which the fluid flows.

18. A flow meter according to claim 9, wherein the asymmetric flow promotion section includes a rectifier provided upstream with respect to the pair of transceivers for providing a resistance against a flow, the resistance varying in the height direction of the flow path.

19. A flow meter according to claim 9, wherein the pair of transceivers are each provided at a position deviated from the center of the flow path in the height direction.

20. A flow meter according to claim 19, wherein:
the asymmetric flow promotion section includes a curved section provided upstream with respect to the pair of transceivers for curving the flow path so that the flow path rises in the height direction, and
the pair of transceivers are each provided at a position deviated toward an outer circumferential surface of the curved section.

21. A flow meter according to claim 19, wherein:
the pair of transceivers each have a rectangular transceiving surface for sending and receiving the ultrasonic wave, and
the transceiving surface is smaller than a size of the flow path in the height direction.

22. A flow meter according to claim 9, wherein:
the fluid flows through the flow path both in a forward direction from an upstream position to a downstream position and a rearward direction from a downstream position to an upstream position, and
the asymmetric flow promotion section includes:
a forward asymmetric flow promotion section for deviating, in the height direction, the equal flow speed area of the fluid flowing in the forward direction, and
a rearward asymmetric flow promotion section for deviating, in the height direction, the equal flow speed area of the fluid flowing in the rearward direction.

23. A flow meter according to claim 22, wherein the forward asymmetric flow promotion section and the rearward asymmetric flow promotion section deviate the equal flow speed area in an identical direction.

24. A flow meter according to claim 23, wherein:

the asymmetric flow promotion section includes an upstream curved section provided upstream with respect to the pair of transceivers for curving the flow path so that the flow path rises in the height direction, and a downstream curved section provided downstream with respect to the pair of transceivers for curving the flow path so that the flow path rises in the height direction, and the upstream curved section and the downstream curved section are curved in an identical direction.

25. A flow meter according to claim 23, wherein:

the asymmetric flow promotion section includes a step provided on a wall portion of the flow path upstream with respect to the pair of transceivers and a step provided on a wall portion of the flow path downstream with respect to the pair of transceivers, and a different-shape section provided upstream with respect to the pair of transceivers and a different-shape section provided downstream with respect to the pair of transceivers, each of the different-shape sections including one end provided on one wall portion of the flow path and another end provided on another wall portion of the flow path, the ends having different shapes from each other, and the wall portions facing each other across the height direction, the wall portions having the steps upstream and downstream with respect to the pair of transceivers are on the same side as each other, and the wall portions having the one ends of the different-shape sections upstream and downstream with respect to the pair of transceivers are on the same side as each other, and the wall portions having the another ends of the different-shape sections upstream and downstream with respect to the pair of transceivers are on the same side as each other.

26. A flow meter according to claim 1, wherein:

the flow path is defined by a wall having a pair of openings respectively for exposing the pair of transceivers to the flow path, and the flow path further includes a pair of open-hole rectifiers respectively provided between the pair of openings and the flow path for reducing an amount of the fluid flowing into the pair of openings and for alleviating a disturbance of the flow of the fluid through the flow path.

27. A flow meter according to claim 26, wherein a flow deviation restriction section including fine passage openings is provided at least one of upstream or downstream with respect to the pair of transceivers.

28. A flow meter according to claim 26, wherein:

the pair of open-hole rectifiers each have fine ultrasonic openings, and the fine ultrasonic openings in the open-hole rectifier provided upstream with respect to the pair of transceivers and the fine ultrasonic openings in the open-hole rectifier provided downstream with respect to the pair of transceivers have different opening sizes or shapes from each other.

29. A flow meter according to claim 26, wherein the fine ultrasonic openings in the open-hole rectifier provided upstream with respect to the pair of transceivers have a larger size than a size of the fine ultrasonic openings in the open-hole rectifier provided downstream with respect to the pair of transceivers.

* * * * *